(12) United States Patent
Nakano et al.

(10) Patent No.: US 7,693,025 B2
(45) Date of Patent: Apr. 6, 2010

(54) OPTICAL PICKUP AND OPTICAL INFORMATION APPARATUS

(75) Inventors: Fumiaki Nakano, Tokyo (JP); Noriaki Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 11/619,841

(22) Filed: Jan. 4, 2007

(65) Prior Publication Data

US 2007/0164241 A1 Jul. 19, 2007

(30) Foreign Application Priority Data

Jan. 12, 2006 (JP) .............................. 2006-005413
Apr. 21, 2006 (JP) .............................. 2006-118371

(51) Int. Cl.
*G11B 7/00* (2006.01)

(52) U.S. Cl. .......................... 369/112.02; 369/112.04; 369/120; 369/112.03; 369/112.15; 369/44.26

(58) Field of Classification Search ........................ None
See application file for complete search history.

(56) References Cited

U.S. PATENT DOCUMENTS

| 5,159,589 | A | 10/1992 | Ohsato |
| 6,937,554 | B2 * | 8/2005 | Ohuchida .............. 369/112.15 |
| 7,110,180 | B2 * | 9/2006 | Kawasaki et al. ........... 359/569 |
| 7,541,564 | B2 * | 6/2009 | Knittel et al. ............. 250/201.5 |
| 2005/0002014 | A1 | 1/2005 | Kobayashi |
| 2005/0199778 | A1 | 9/2005 | Kadowaki et al. |
| 2006/0002247 | A1 * | 1/2006 | Kim et al. ................. 369/44.11 |
| 2006/0274417 | A1 * | 12/2006 | Kanazawa et al. .......... 359/566 |

FOREIGN PATENT DOCUMENTS

| JP | 3-5927 | 1/1991 |
| JP | 9-237433 | 9/1997 |
| JP | 10-143902 | 5/1998 |
| JP | 10-319318 | 12/1998 |
| JP | 11-73658 | 3/1999 |
| JP | 2002-260272 | 9/2002 |
| JP | 2003-187469 | 7/2003 |
| JP | 2004-87072 | 3/2004 |
| JP | 2004-273024 | 9/2004 |
| JP | 2004-281026 | 10/2004 |
| JP | 2004-288227 | 10/2004 |
| JP | 2005-71573 | 3/2005 |
| JP | 2005-108279 | 4/2005 |

\* cited by examiner

*Primary Examiner*—Joseph Feild
*Assistant Examiner*—Joseph Haley
(74) *Attorney, Agent, or Firm*—Oblon, Spivak, McClelland, Maier & Neustadt, L.L.P.

(57) ABSTRACT

An optical pickup includes a detector, a plurality of light guiding units, and a switching controller. The detector detects, using a plurality of detection areas, a reflected light beam that is emitted from a predetermined light source and is reflected off an optical recording medium. Each of the light guiding units has a specific light guide pattern and inputs a predetermined part of the reflected light beam to a predetermined detection area in accordance with the light guide pattern. The switching controller switches and selects the light guiding unit that acts on the reflected light beam from among the plurality of light guiding units according to a predetermined switching condition.

15 Claims, 40 Drawing Sheets

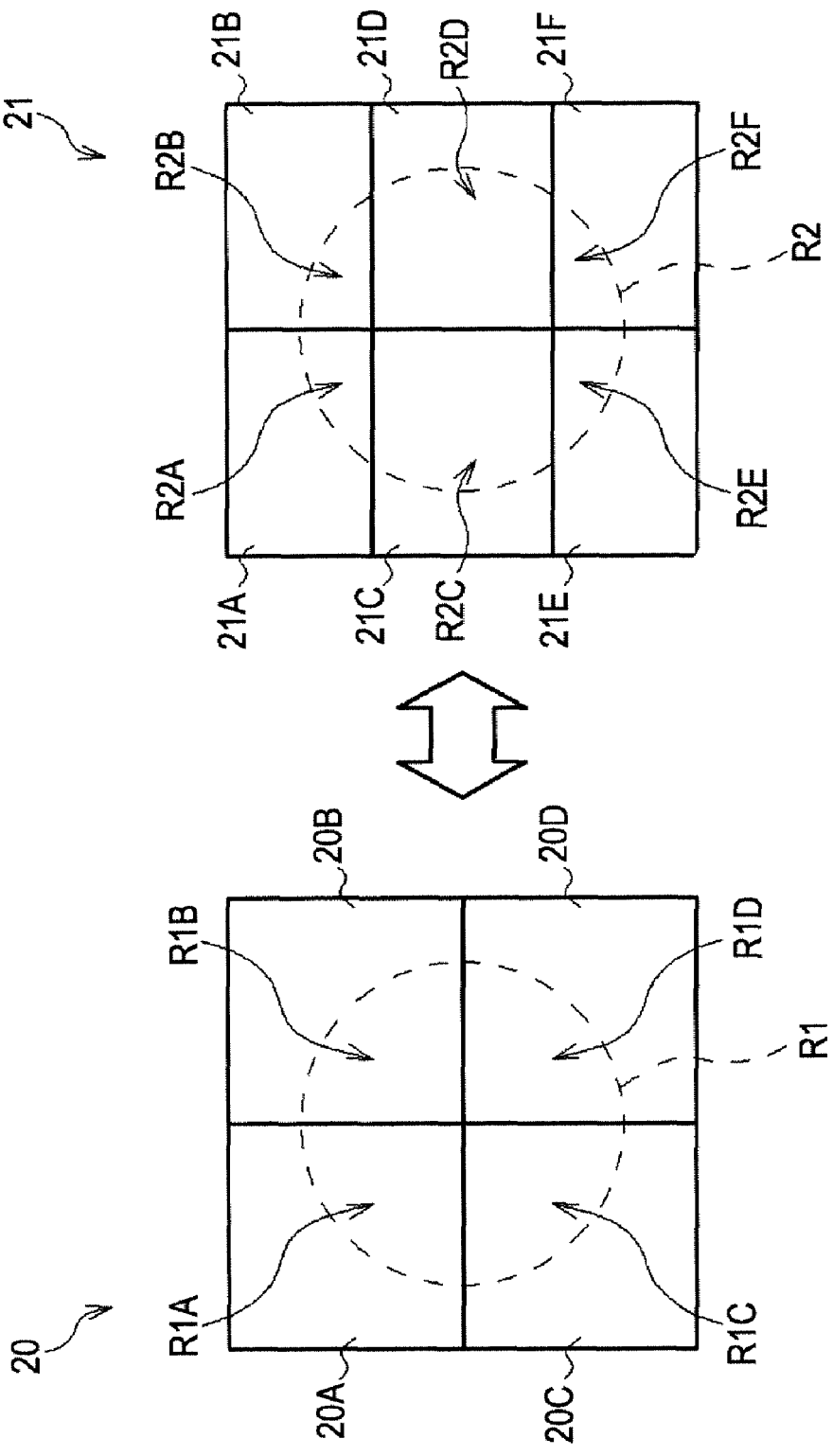

FIG. 5
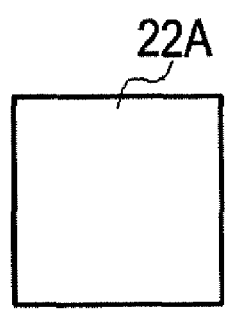
22A
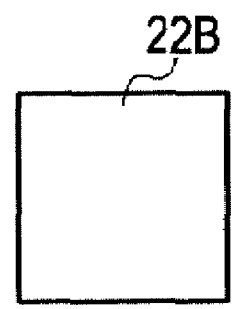
22B
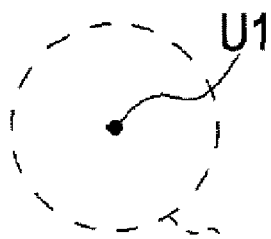
U1
P0
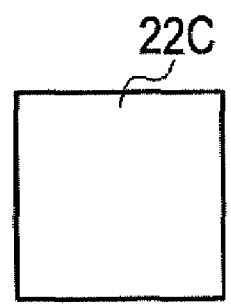
22C
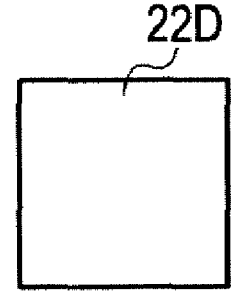
22D
22

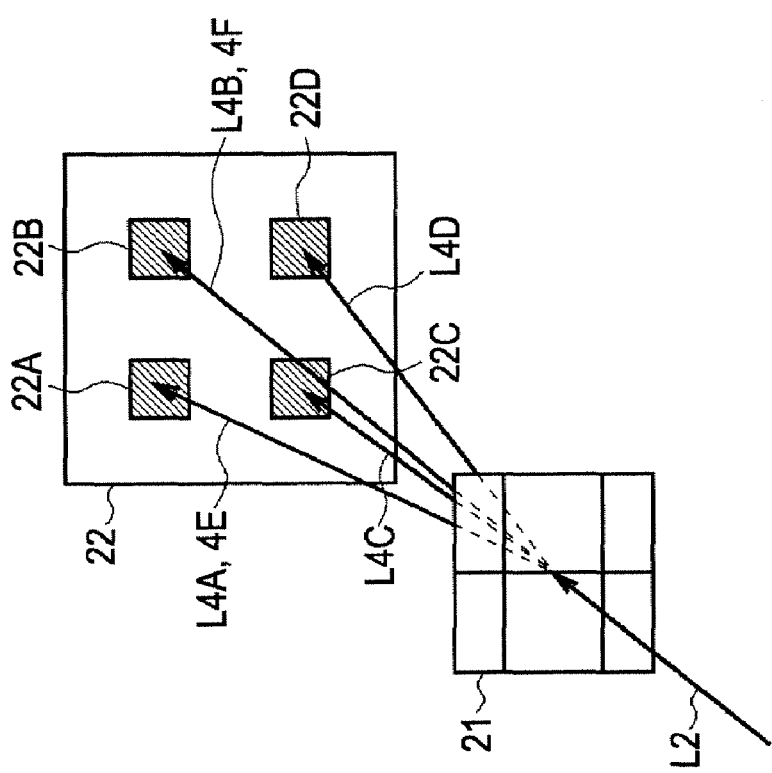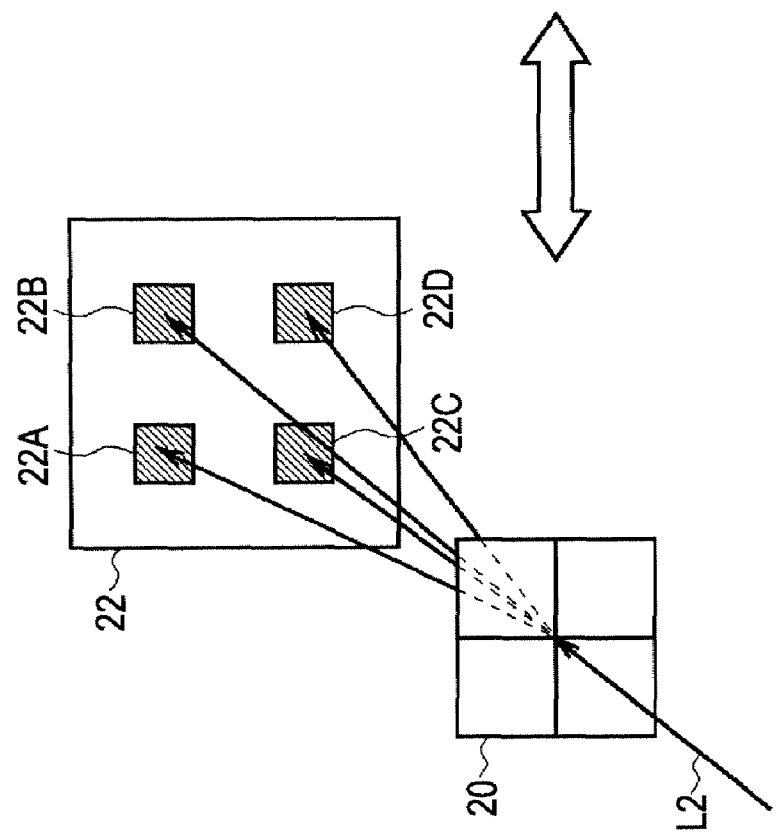

LEFT DIRECTION    RIGHT DIRECTION

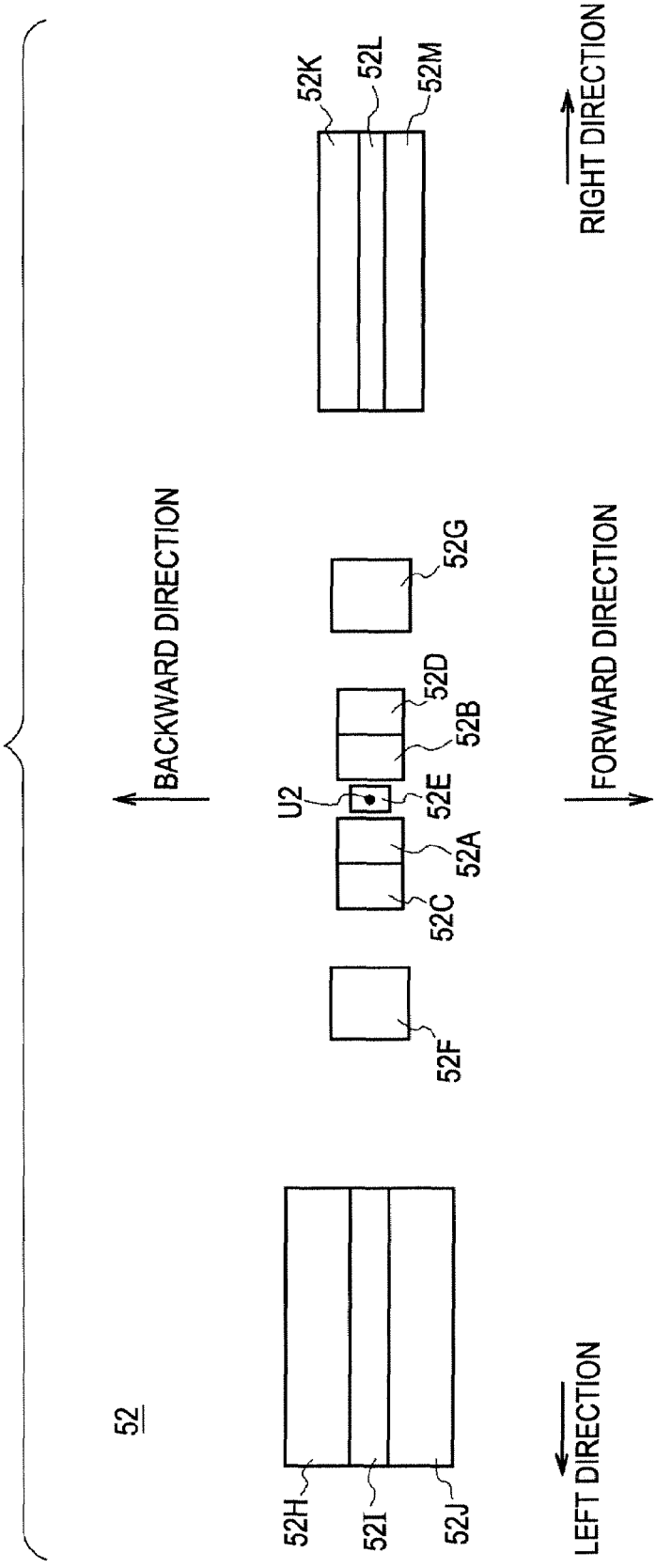

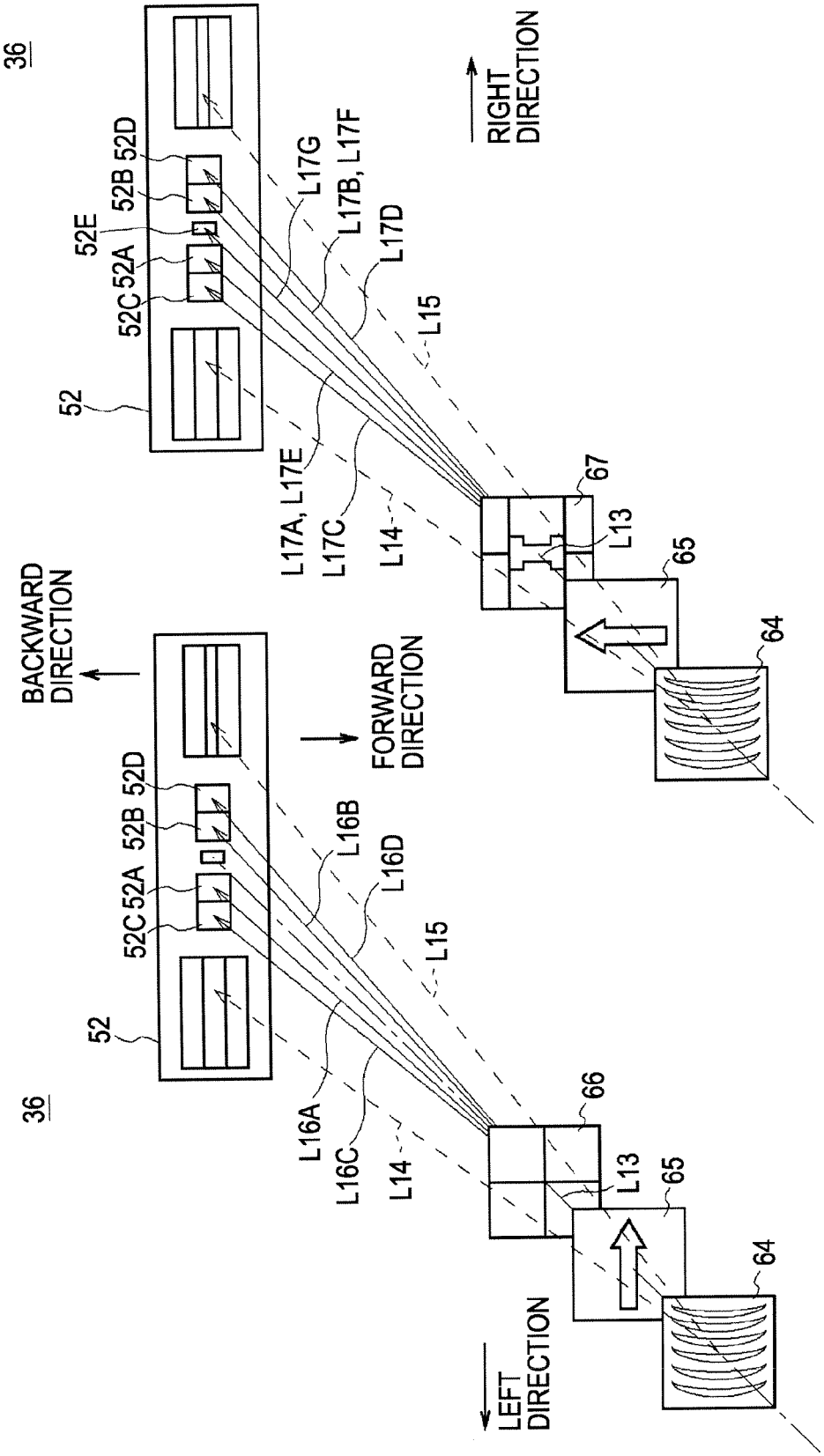

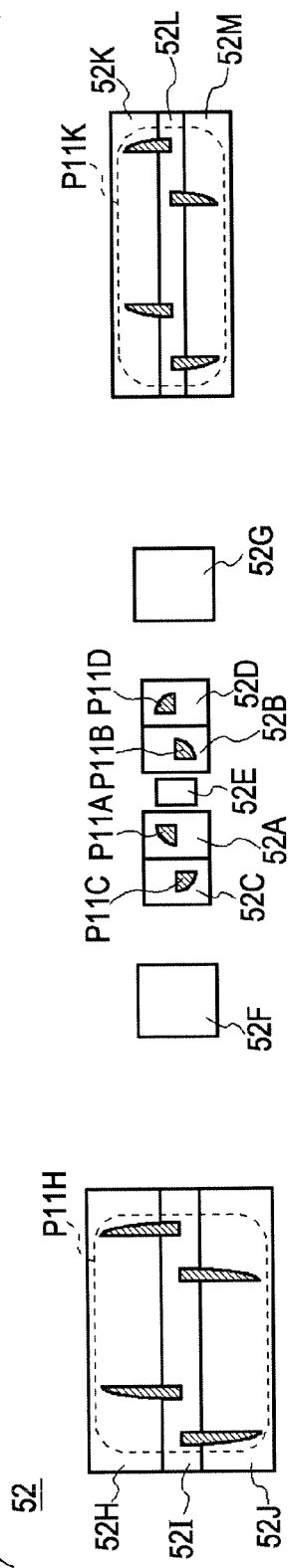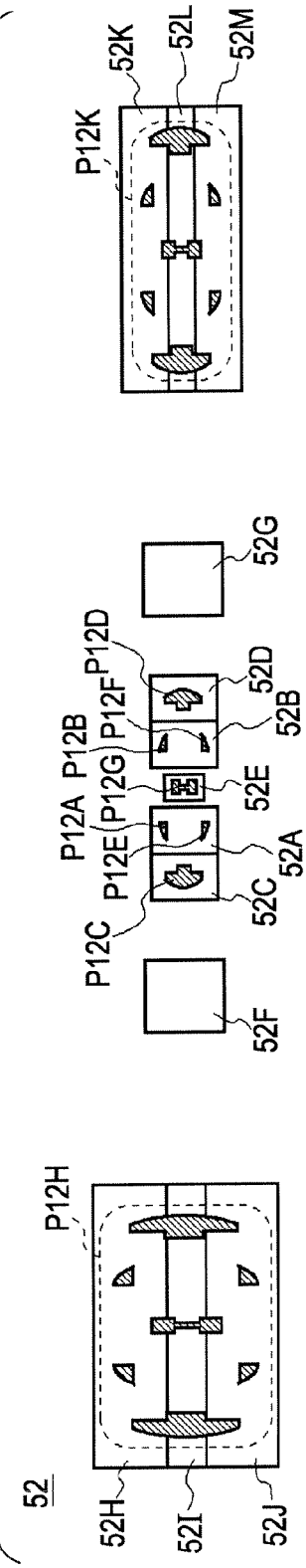

BACKWARD DIRECTION

OPTICAL PICKUP AND OPTICAL INFORMATION APPARATUS

CROSS REFERENCES TO RELATED APPLICATIONS

The present invention contains subject matter related to Japanese Patent Application JP 2006-005413 filed in the Japanese Patent Office on Jan. 12, 2006, and Japanese Patent Application JP 2006-118371 filed in the Japanese Patent Office on Apr. 21, 2006, the entire contents of which are incorporated herein by reference.

BACKGROUND OF THE INVENTION

1. Field of the Invention

The present invention relates to an optical pickup and an optical information apparatus that are suitably applied to an optical disc apparatus for processing different types of optical disc, such as a digital versatile disc-read only memory (DVD-ROM) and a digital versatile disc-recordable (DVD-R).

2. Description of the Related Art

In recent years, the use of optical disc apparatuses has been widespread that record information, such as music content, video content, or a variety of data, on an optical disc serving as a recording medium and play back the information read out of the optical disc.

In practice, the optical disc apparatus emits a write light beam onto concentric tracks or a spiral track formed on a signal recording layer of an optical disc so as to generate a pit having a predetermined shape and record information. In addition, the optical disc apparatus emits a read light beam onto the track and reads out the reflected light beam so as to play back the information.

At that time, the optical disc apparatus detects the partial light beam reflected off the optical disc and carries out predetermined signal processing on the partial light beam. The optical disc apparatus then generates a tracking error signal that varies in accordance with the amount of deviation of the irradiation position from the position of the desired track. Thereafter, the optical disc apparatus carries out tracking control, that is, the optical disc apparatus controls the irradiation position of the light beam on the basis of the tracking error signal to reduce the amount of deviation.

A recordable optical disc, such as a DVD-R or a DVD-RW (digital versatile disk-rewritable) has a groove that serves as a guide groove formed along the track in order to identify the recording position of information on the optical disc. In contrast, a read-only optical disc, such as a DVD-ROM, has no grooves along the track.

Accordingly, the format book of a DVD describes that the tracking error signal is generated using a differential phase detection (DPD) method for a read-only DVD-ROM and is generated using a differential push-pull (DPP) method or a one-beam push-pull (PP) method that uses a push-pull signal for a recordable DVD-R and a DVD-RW.

Additionally, the optical disc apparatuses generate a focus error signal used for accurately focusing the light beam on the signal recording layer of an optical disc on the basis of the partial reflected light beam and generate an RF signal used for reading out information recorded on the optical disc on the basis of the partial reflected light beam.

To perform these methods, an optical disc apparatus is proposed in which a detection area of a photodetector for detecting the light beam reflected off an optical disc is partitioned into a plurality of sub-areas and detection signals detected in the sub-areas are appropriately computed so that a tracking error signal, a focus error signal, and an RF signal that are used for both DPD method and one-beam PP method are generated (refer to, for example, Japanese Unexamined Patent Application Publication No. 2004-281026, in particular, page 71 and FIG. 23, and Japanese Unexamined Patent Application Publication No. 3-5927, in particular, page 9 and FIG. 4).

SUMMARY OF THE INVENTION

In the optical apparatuses that generate a tracking error signal using the DPD method, a detection area 1 of a photodetector is separated into four detection sub-areas 1A to 1D, as shown in FIG. 41A. In contrast, in the optical apparatuses that generate a tracking error signal using the one-beam PP method, the detection area 1 of the photodetector is separated into six detection sub-areas 2A to 2F, as shown in FIG. 41B.

Accordingly, the optical apparatuses can generate a tracking error signal used for both the DPD method and one-beam PP method by partitioning a detection area 3 of the photodetector into a plurality of detection sub-areas (e.g., eight subdetection areas 3A to 3H shown in FIG. 41C), generating detection signals for the detection sub-areas on the basis of the intensities of the reflected light beams made incident on the detection sub-areas and, subsequently, appropriately summing these generated detection signals.

In addition, the photodetector of the optical apparatuses generates the detection signals in accordance with the amounts of the reflected light beams by performing photoelectrical conversion and amplifies the generated detection signals using an amplifier. By appropriately performing a computation on these amplified detection signals, the optical apparatuses can generate a tracking error signal. By summing these amplified detection signals, the optical apparatuses can generate an RF signal for reading out the recorded information.

For the optical disc apparatuses that support a BD-RE (Blu-Ray Disk™-Rewritable), the wavelength of a light beam for reading out information is shorter that that for optical disc apparatuses that support a DVD. Accordingly, since the NA (the number of apertures) increases, the spot size of the light beam on the optical disc decreases. Thus, the energy density of the spot increases.

Therefore, in such optical disc apparatuses, the upper limit of the irradiation power of the read light beam on the optical disc is determined so that the durability or reliability of a readout operation of the recorded signal does not deteriorate. As a result, the intensity of the light beam reflected off the optical disc becomes very small.

Furthermore, in such optical disc apparatuses, as the power of a laser diode used as a light source of the light beam is decreased, the noise of the laser diode increases. Accordingly, this laser noise is superimposed onto the detection signals. At that time, since the photodetectors of the optical disc apparatuses amplify the weak detection signals using an amplifier, the photodetectors amplify further amplify the amplifier noise in addition to the laser noise with respect to the RF signal.

That is, since the optical disc apparatuses and, in particular, the optical disc apparatuses having a photodetector formed of a plurality of detection sub-areas generate the RF signal by adding a plurality of detection signals including the noise, the RF signal includes more noise than that generated by a photodetector partitioned into fewer sub-areas. Therefore, the readout performance of the RF signal is disadvantageously decreased.

Accordingly, the present invention provides an optical pickup and an optical information apparatus capable of supporting a plurality of control methods and generating a high-precision signal.

According to an embodiment of the present invention, an optical pickup includes a detector for detecting, using a plurality of detection sub-areas, a reflected light beam that is emitted from a predetermined light source and is reflected off an optical recording medium, a plurality of light guiding means, where each of the light guiding means has a specific light guide pattern and inputs a predetermined part of the reflected light beam to a predetermined detection sub-area in accordance with the light guide pattern, and a switching controller that switches and selects the light guiding means that acts on the reflected light beam from among the plurality of light guiding means according to a predetermined switching condition.

In such a structure, even when the light guide patterns are switched, the optical pickup can detect the predetermined area of the reflected light beam using the detection sub-areas formed on the photodetector at the predetermined positions in advance in accordance with the switched light guide pattern.

According to another embodiment of the present invention, an optical information apparatus includes a detector for detecting, using a plurality of detection sub-areas, a reflected light beam that is emitted from a predetermined light source and is reflected off an optical recording medium, a plurality of light guiding means, where each of the light guiding means has a specific light guide pattern and inputs a predetermined part of the reflected light beam onto a predetermined detection sub-area in accordance with the light guide pattern, a switching controller that switches and selects the light guiding means applied to the reflected light beam from among the plurality of light guiding means, and an integrated controller that controls the switching controller to switch and select the light guiding means that acts on the reflected light beam according to a predetermined switching condition.

In such a structure, even when the light guide patterns are switched, the optical pickup can detect the predetermined area of the reflected light beam using the detection sub-areas formed on the photodetector at the predetermined positions in advance in accordance with the switched light guide pattern.

That is, according to the embodiments of the present invention, even when the light guide patterns are switched, the optical pickup can detect the predetermined area of the reflected light beam using the detection sub-areas formed on the photodetector at the predetermined positions in advance in accordance with the switched light guide pattern. Accordingly, an optical pickup and an optical information apparatus capable of supporting a plurality of control methods and generating a high-precision signal can be achieved.

BRIEF DESCRIPTION OF THE DRAWINGS

FIGS. 3A and 3B are schematic illustrations of the structure of a beam splitting light guide;

FIG. 5 is a schematic illustration of the arrangement of detection sub-areas of a photodetector;

FIGS. 6A and 6B are schematic illustrations of the separation of a reflected light beam by the beam splitting light guide;

FIG. 14 is a schematic illustration of the arrangement of detection sub-areas of the photodetector;

FIGS. 15A and 15B are schematic illustrations of the separation and light guiding of a reflected light beam;

FIGS. 16A and 16B are schematic illustrations of beam spots formed on detection sub-areas of the photodetector;

DESCRIPTION OF THE PREFERRED EMBODIMENTS

Embodiments of the present invention are described in detail below with reference to the accompanying drawings.

1. Basic Principle of Present Invention 1-1. Structure of Optical Disk Apparatus As shown in FIG. 1, an optical disc apparatus 10 records information, such as music content, video content, or a variety of data items, on an optical disc 100 serving as a recording medium (e.g., a BD-RE and a BD-ROM (Blu-Ray Disc™-read only memory)) and plays back the information on the optical disc 100.

The optical disc apparatus 10 emits a write light beam onto concentric tracks or a spiral track formed on a signal recording layer (not shown) of the optical disc 100 so as to generate a pit having a predetermined shape and record information. In addition, the optical disc apparatus 100 emits a read light beam onto the track and reads out a light beam reflected off the track so as to play back the information.

Figure 1:
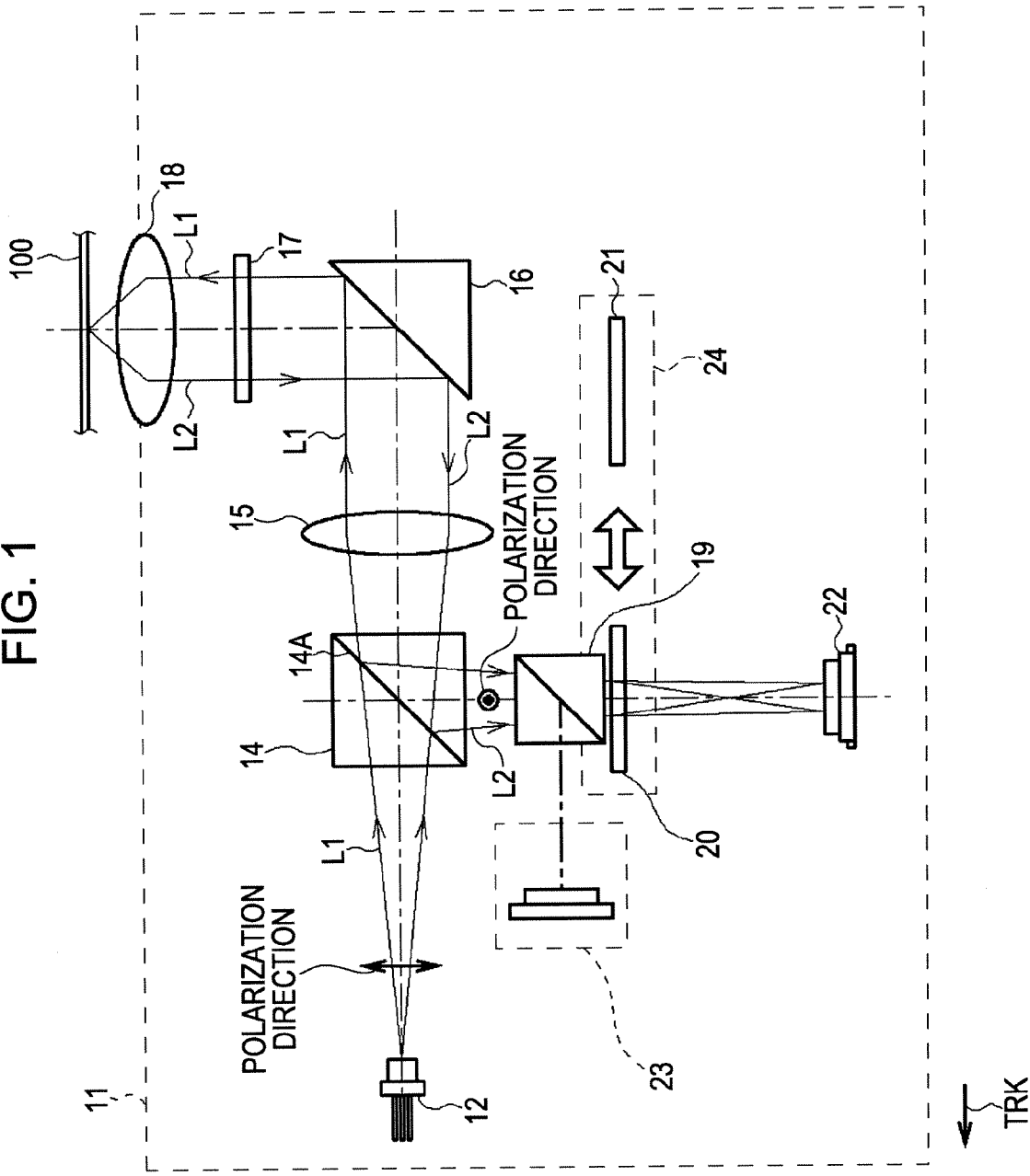
FIG. 1 is a block diagram of an optical disc apparatus based on the principal of an embodiment of the present invention.

In practical applications, an optical pickup 11 of the optical disc apparatus 10 controls a laser diode 12 to emit an output light beam L1 having a plane of polarization parallel to the plane of FIG. 1. The output light beam L1 passes through a polarization film 14A of a polarizing beam splitter 14.

Subsequently, the collimator lens 15 of the optical pickup 11 transforms the output light beam L1 transmitted by the polarizing beam splitter 14 from a diverging light beam to a parallel light beam. The propagation direction of the parallel light beam is changed to the upward direction towards the optical disc 100 by a mirror 16. The parallel light beam is then changed from a linearly polarized light beam to a circularly polarized light beam by a ¼ wavelength plate 17. Thereafter, the circularly polarized light beam is changed to a converging light beam, which is focused on the desired track on a signal recording surface of the optical disc 100 by a field lens 18.

Additionally, the optical pickup 11 leads a reflected light beam L2 of the output light beam L1 reflected off the signal recording surface of the optical disc 100 to enter the field lens 18 so as to transform the reflected light beam L2 from a diverging light beam to a parallel light beam. The parallel light beam is changed from a circularly polarized light beam to a linearly polarized light beam having a polarization by the ¼ wavelength plate 17. The propagation direction of the linearly polarized light beam is changed to a horizontal direction towards the laser diode 12 by the mirror 16. Thereafter, the collimator lens 15 transforms the reflected light beam L2 to a converging light beam, which is input to the polarizing beam splitter 14.

In this case, in the optical pickup 11, the polarization film 14A of the polarizing beam splitter 14 reflects the reflected light beam L2 due to a relationship between the polarization film 14A and the plane of polarization of the reflected light beam L2. Thereafter, a half mirror 19 partially reflects the reflected light beam L2. The partially reflected light beam L2 is made incident on a focus-error signal detection system 23.

Here, the focus-error signal detection system 23 can operate in accordance with the spot size detection (SSD) method, the astigmatism method, or a Fourcault method. Note that the focus-error signal detection system 23 may be disposed on an optical path from the polarizing beam splitter 14 to a photodetector 22.

A beam splitting light guide 20 or 21 of the optical pickup 11 separates a partial light beam of the reflected light beam L2 transmitted by the half mirror 19 into a plurality of light beams, which are input to the photodetector 22. The details of this process are described below.

Furthermore, a beam splitting light guide pattern switcher 24 of the optical pickup 11 mechanically selects the beam splitting light guide 20 or 21 to switch a separation pattern for the reflected light beam L2. The details of this process are described below.

1-2. Structure of Beam Splitting Light Guide

When the optical disc 100 is a BD-ROM, the optical disc apparatus 10 performs tracking control by a differential phase detection (DPD) method, since the BD-ROM disc has a pit string on a track without a groove structure.

Figure 2A:
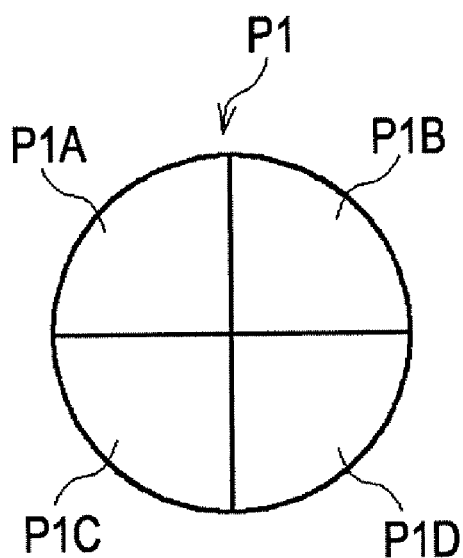
FIG. 2 is a schematic illustration of the principal of generating a tracking error signal.

To perform tracking control by the DPD method, the optical pickup 11, as shown in FIG. 2A, separates a circular beam spot P1 formed on the photodetector 22 by the reflected light beam L2, if the beam splitting light guides 20 and 21 are not present, into four beam spots P1A to P1D. Thereafter, the optical pickup 11 detects the intensity of each of the beam spots P1A to P1D.

At that time, the optical disc apparatus 10 computes a tracking error signal STE1 using phase differences among detection signals G1A to G1D generated by the photodetector 22 in accordance with the intensities of the beam spots P1A to P1D. The optical disc apparatus 10 then performs tracking control on the basis of the tracking error signal STE1.

In practice, as shown in FIG. 3A which corresponds to FIG. 2A, the area of the beam splitting light guide 20 of the optical pickup 11 is partitioned into four light guide segments 20A to 20D. Thus, the cross section R1 of the reflected light beam L2 (see FIG. 1) formed when the reflected light beam L2 passes through the beam splitting light guide 20 is separated into four sub-cross sections R1A to R1D. Hereinafter, light beams that are separated from the reflected light beam L2 by the four light guide segments 20A to 20D and that have the sub-cross sections R1A to R1D are referred to as "separate light beams L3A to L3D", respectively.

Figure 4A:
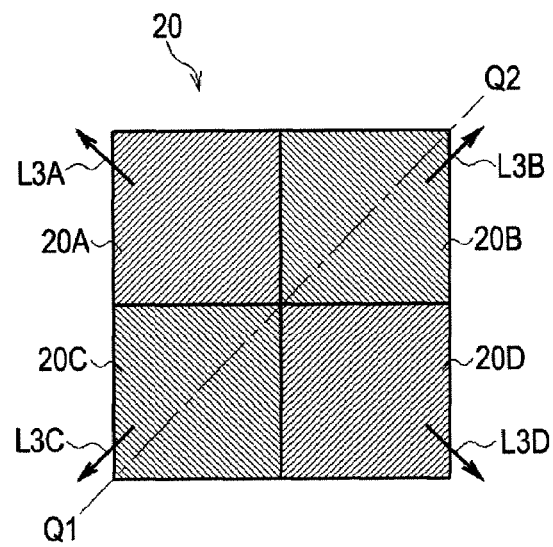
FIGS. 4A-4C are schematic illustrations of the diffraction directions of the beam splitting light guide.

As shown in FIG. 4A, a hologram composed of a blazed HOE (holographic optical element) is formed in each of the four light guide segments 20A to 20D on a surface of the beam splitting light guide 20. The holograms diffract the separate light beams L3A to L3D of the reflected light beam L2 (see FIG. 1) to the upper left, upper right, lower left, and lower right directions in FIG. 4A, respectively. Note that FIGS. 4A to 4C are top views of the beam splitting light guide 20.

Figure 4B:
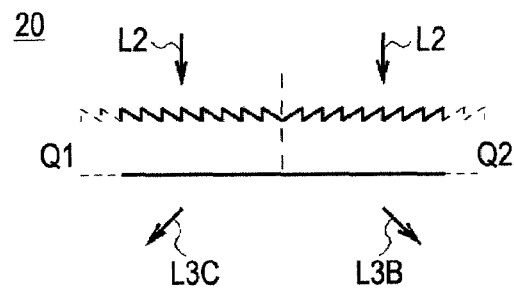
Figure 4C:
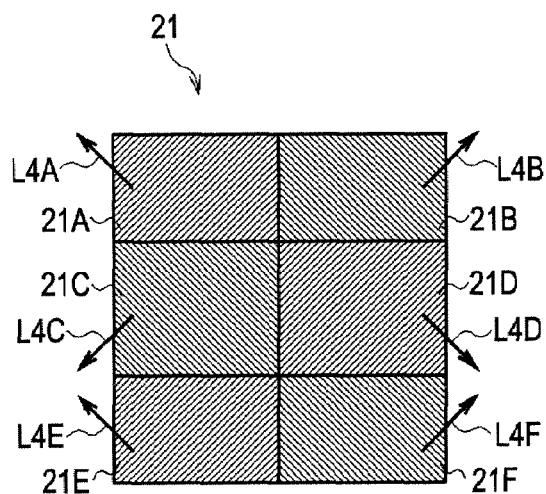

FIG. 4B is a cross-sectional view of the beam splitting light guide 20 taken along points Q1-Q2 in FIG. 4A. The beam splitting light guide 20 has a substantially uniform sawtooth cross section in each of the light guide segments 20B and 20C. This cross section allows the hologram to operate as a blazed HOE.

In practice, the light guide segments 20B and 20C of the beam splitting light guide 20 diffract partial light beams corresponding to the cross-sectional sub-areas R1B and R1C of the reflected light beam L2 input from the upper side of FIG. 4B in the lower left and the lower right directions to generate the separate light beams L3B and L3C, respectively.

In contrast, when the optical disc 100 represents a BD-RE disc, the optical disc apparatus 10 performs tracking control by the one-beam PP (push-pull) method, since the BD-ROM disc has a track with a groove structure.

Figure 2B:
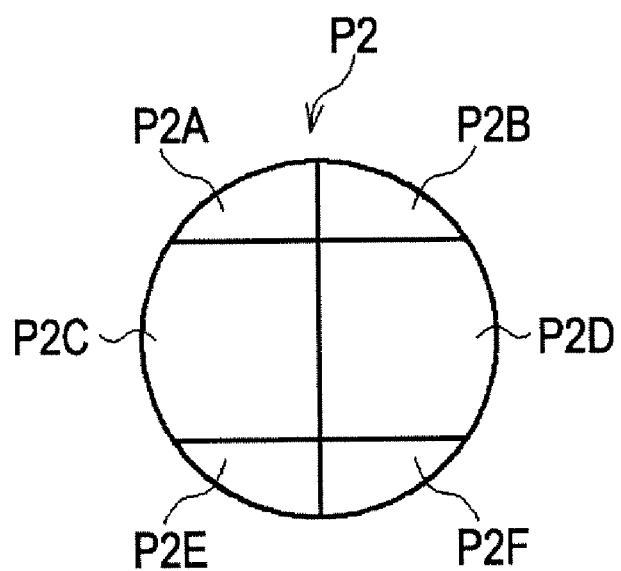

To perform tracking control according to the one-beam PP method, the optical pickup 11, as shown in FIG. 2B, separates a circular beam spot P2 formed on the photodetector 22 by the reflected light beam L2 if the beam splitting light guides 20 and 21 are not present into six beam spots P2A to P2F. Thereafter, the optical pickup 11 detects the intensity of each of the beam spots P2A to P2F.

At that time, the optical disc apparatus 10 computes a tracking error signal STE2 from detection signals G2A to G2F in accordance with the intensities of the beam spots P2A to P2F and a predetermined coefficient K using the following equation:

$$STE2=(G2D-G2C)-K\{(G2B+G2F)-(G2A+G2E)\} \quad (1)$$

The optical disc apparatus 10 then performs tracking control on the basis of the tracking error signal STE2.

In practice, the beam splitting light guide 21 of the optical pickup 11 has a separation pattern different from that of the beam splitting light guide 20. As shown in FIG. 3B which corresponds to FIG. 2B, the area of the beam splitting light guide 21 is separated into six light guide segments 21A to 21F. Thus, the cross section R2 of the reflected light beam L2 (see FIG. 1) formed when the reflected light beam L2 passes through the beam splitting light guide 21 is separated into six cross-sectional sub-areas R2A to R2F. Hereinafter, light beams that are separated from the reflected light beam L2 by the six light guide segments 21A to 21F and that have the cross-sectional sub-areas R2A to R2F are referred to as "separate light beams L4A to L4F", respectively.

Like the beam splitting light guide 20, as shown in FIG. 4C, a hologram composed of a blazed HOE is formed in each of the six light guide segments 21A to 21F on a surface of the beam splitting light guide 21. The holograms diffract the separate light beams L4A to L4F of the reflected light beam L2 (see FIG. 1) to the upper left, upper right, lower left, lower right, upper left, and upper right directions in FIG. 4C, respectively.

In this case, the light guide segments 21A and 21E of the beam splitting light guide 21 diffract the separate light beams L4A and L4E in the same direction (the upper left direction in FIG. 4C) and the light guide segments 21B and 21F diffracts the separate light beams L4B and L4F in the same direction (the upper right direction in FIG. 4C).

As noted above, the beam splitting light guides 20 and 21 have the four light guide segments 20A to 20D and the six light guide segments 21A to 21F, respectively. The hologram is formed on each of the light guide segments. The diffraction directions of the light guide segments 20A to 20D and 21A to 21F are set to predetermined directions. Thus, the reflected light beam L2 is separated into the four separate light beams L3A to L3D or the six separate light beams L4A to L4F.

1-3. Structure of Photodetector

As shown in FIG. 5, the photodetector 22 has rectangular detection sub-areas 22A to 22D on the surface thereof, onto which the separate light beams L3A to L3D or the separate light beams L4A to L4D are emitted.

The detection sub-areas 22A to 22D are located on the upper left, upper right, lower left, and lower right sides of a center point U1 of the top surface of the photodetector 22, respectively. The center point U1 is coincident with the optical axis of the reflected light beam L2 that reaches the photodetector 22 unless the beam splitting light guides 20 and 21 are present.

Each of the detection sub-areas 22A to 22D of the photodetector 22 is sufficiently larger than a beam spot P0 formed by the reflected light beam L2 unless the beam splitting light guides 20 and 21 are present. Consequently, the photodetector 22 can reliably detect the intensity of a beam spot having the same size as the beam spot P0.

The photodetector 22 performs photoelectrical conversion in accordance with the intensity of each of the beam spots formed in the detection sub-areas 22A to 22D to generate electrical signals. Thereafter, the photodetector 22 amplifies the generated electrical signals using amplifiers (not shown) to generates four detection signals.

1-4. Detection of Reflected Light Beam

In practice, when the optical disc 100 (see FIG. 1) is a BD-ROM, the optical pickup 11 of the optical disc apparatus 10 selects the beam splitting light guide 20 using the beam splitting light guide pattern switcher 24, as shown in FIG. 6A.

At that time, the optical pickup 11 separates the reflected light beam L2 into the separate light beams L3A to L3D using the beam splitting light guide 20. The separate light beams L3A to L3D are input to the detection sub-areas 22A to 22D of the photodetector 22, respectively.

Figure 7A:
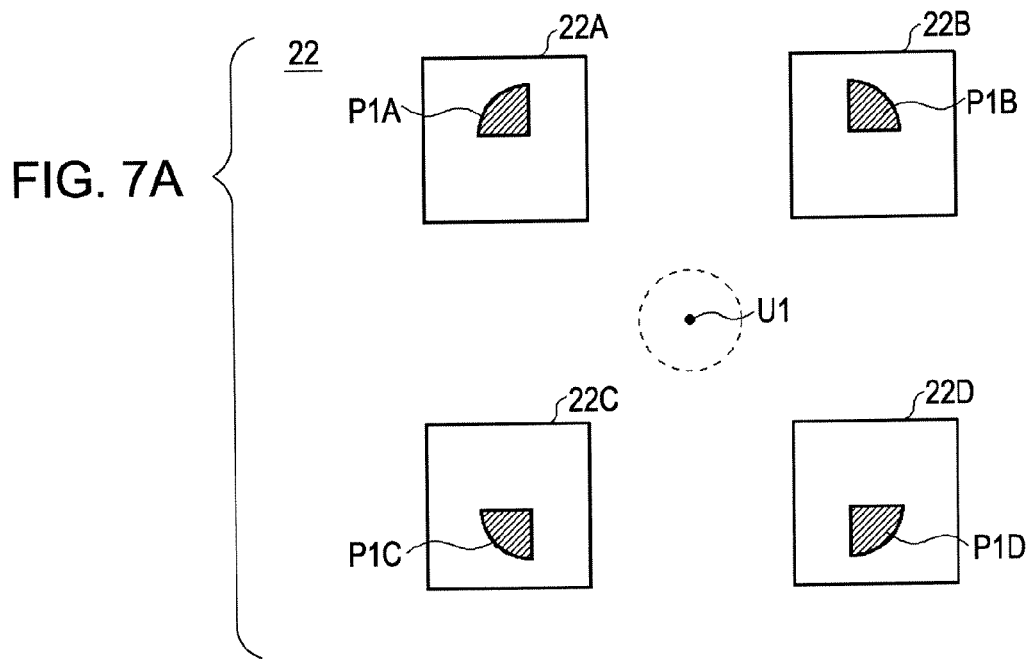
FIGS. 7A and 7B are schematic illustrations of beam spots formed on detection sub-areas of the photodetector.

As a result, as shown in FIG. 7A, the beam spots P1A to P1D having the shapes substantially similar to the cross-sectional sub-areas R1A to R1D (see FIG. 3A) are formed in the detection sub-areas 22A to 22D of the photodetector 22, respectively. Thus, the photodetector 22 generates the four detection signals (i.e., the detection signals S1A to S1D) in accordance with the intensities of the beam spots P1A to P1D.

Subsequently, the optical disc apparatus 10 (see FIG. 1) computes the tracking error signal STE1 using phase differences among the detection signals S1A to S1D. Thereafter, the optical disc apparatus 10 performs tracking control by the DPD method suitable for the BD-ROM optical disc 100 on the basis of the tracking error signal STE1.

In contrast, when the optical disc 100 represents a BD-RE disc, the optical pickup 11 of the optical disc apparatus 10 selects the beam splitting light guide 21 using the beam splitting light guide pattern switcher 24, as shown in FIG. 6B.

At that time, the optical pickup 11 separates the reflected light beam L2 into the separate light beams L4A to L4F using the beam splitting light guide 21. The separate light beams L4A to L4F are input to the detection sub-areas 22A to 22D of the photodetector 22, respectively.

Figure 7B:
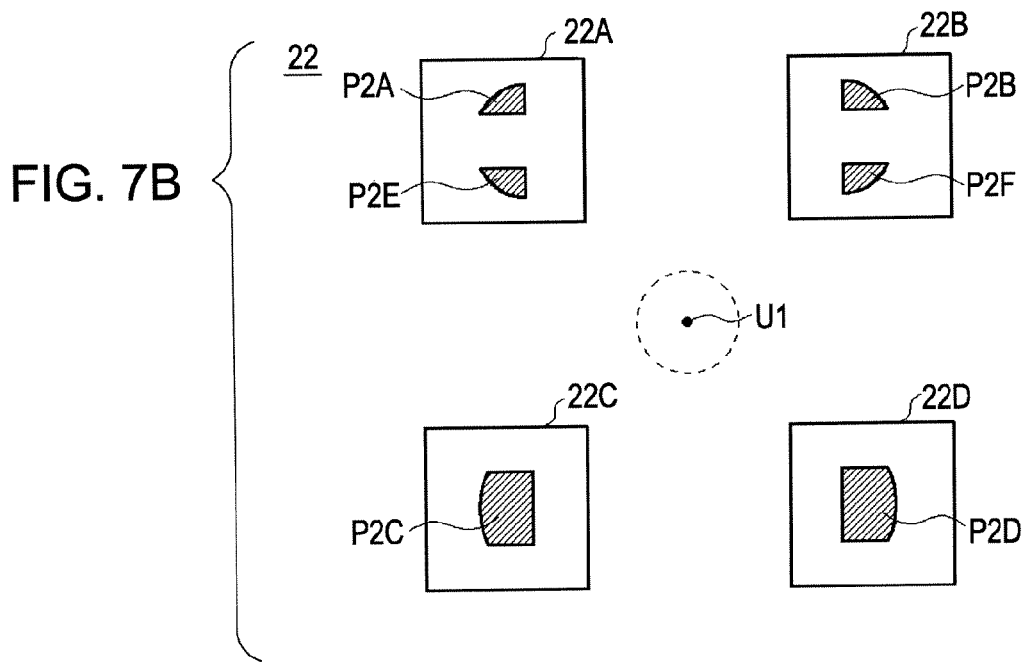

As a result, as shown in FIG. 7B, the beam spots P2A to P2F having the shapes substantially similar to the cross-sectional sub-areas R2A to R2F (see FIG. 3B) are formed in the detection sub-areas 22A to 22D of the photodetector 22.

In this case, since the light guide segments 21A and 21E of the beam splitting light guide 21 diffract the separate light beams L4A and L4E in the same direction, the beam spot P2A caused by the separate light beam L4A and the beam spot P2E caused by the separate light beam L4E are formed in the detection sub-area 22A of the photodetector 22. Similarly, since the light guide segments 21B and 21F diffract the separate light beams L4B and L4F in the same direction, the beam spot P2B caused by the separate light beam L4B and the beam spot P2F caused by the separate light beam L4F are formed in the detection sub-area 22B of the photodetector 22.

Additionally, the beam spot P2C caused by the separate light beam L4C and the beam spot P2D caused by the separate light beam L4D are formed in the detection sub-areas 22C and 22D of the photodetector 22, respectively.

Accordingly, the photodetector 22 generates four detections signal S2A to S2D, which correspond to the intensities of the beam spots (P2A+P2E), (P2B+P2F), P2C, and P2D, respectively. Subsequently, the optical disc apparatus 10 generates a tracking error signal STE2 from the detection signals S2A to S2D using the following equation (2) corresponding to equation (1):

$$STE2=(S2D-S2C)-K(S2B-S2A) \qquad (2)$$

The optical disc apparatus 10 then performs tracking control for the BD-RE optical disc 100 (see FIG. 1) on the basis of the tracking error signal STE2.

That is, the optical pickup 11 of the optical disc apparatus 10 can select the beam splitting light guide 20 or 21 using the beam splitting light guide pattern switcher 24 so as to select one of a separation pattern that separates the reflected light beam L2 into the separate light beams L3A to L3D and a separation pattern that separates the reflected light beam L2 into the separate light beams L4A to L4F.

At that time, the optical pickup 11 diffracts the separate light beams L3A to L3D or the separate light beams L4A to L4F in the predetermined directions using the holograms formed on the beam splitting light guide 20 or 21. Thus, the optical pickup 11 inputs the beam spots P1A, P1B, P1C, and P1D to the detection sub-areas 22A, 22B, 22C, and 22D of the photodetector 22, respectively. Alternatively, the optical pickup 11 inputs the beam spots (P2A+P2E), (P2B+P2F), P2C, and P2D to the detection sub-areas 22A, 22B, 22C, and 22D of the photodetector 22, respectively.

As a result, by simply performing photoelectric conversion for the four detection sub-areas 22A to 22D and amplifying the converted electric signals, the photodetector 22 can directly generate the four detection signals S1A to S1D that are necessary for generating the tracking error signal STE1 used in the DPD method or the four detection signals S2A to S2D that are necessary for generating the tracking error signal STE2 used in the one-beam PP method.

Thereafter, the optical disc apparatus 10 moves the optical pickup 11 or the field lens 18 (see FIG. 1) in a direction indicated by an arrow "TRK" or the opposite direction thereof so as to perform tracking control.

2. First Embodiment

2-1. Architecture of Optical Disc Apparatus

Figure 8:
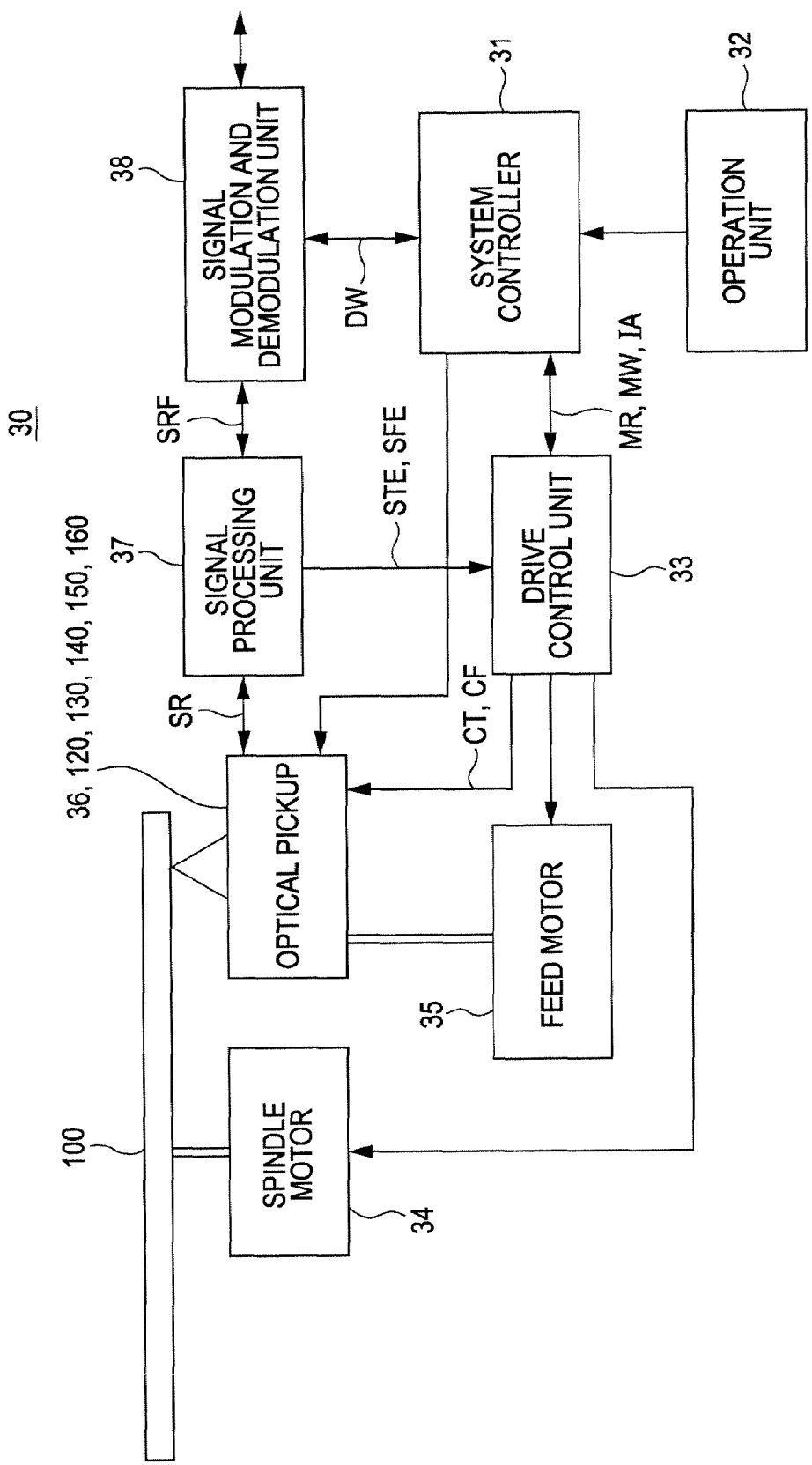
FIG. 8 is a block diagram of an exemplary configuration of the optical disc apparatus.

As shown in FIG. 8, an optical disc apparatus 30 corresponding to the optical disc apparatus 10 (see FIG. 1) records information, such as music content, video content, or a variety of data items, on the optical disc 100 (e.g., a BD-RE and a BD-ROM) and plays back the information on the optical disc 100.

A system controller 31 performs overall control of the optical disc apparatus 30. Upon receiving, from an external apparatus (not shown), a command instructing playback of information on the optical disc 100 loaded on the optical disc apparatus 30, the system controller 31 transmits address information IA for identifying the information recorded in the signal recording layer of the optical disc 100 and an information-readout command MR to a drive control unit 33.

The drive control unit 33 controls a spindle motor 34 to rotate the optical disc 100 at a predetermined rotation speed in response to the information-readout command MR received from the system controller 31. In addition, the drive control unit 33 controls a feed motor 35 on the basis of the information readout command MR and the address information IA to move an optical pickup 36, which corresponds to the optical pickup 11 (see FIG. 1), in a radial direction of the optical disc 100. Thus, a light beam is focused on a track (hereinafter referred to as a "desired track") corresponding to the address information IA on the signal recording layer of the optical disc 100.

At that time, the optical pickup 36 receives a reflected beam of the light beam made incident on the optical disc 100 to detect the intensity of the reflected beam. The optical pickup 36 then generates a detection signal and transmits the detection signal to a signal processing unit 37. The signal processing unit 37 generates a tracking error signal STE in accordance with a deviation of the light beam irradiation point from the desired track and a focus error signal SFE in accordance with a deviation of the light beam focal point from the signal recording layer of the optical disc 100. The signal processing unit 37 then transmits the tracking error signal STE and the focus error signal SFE to the drive control unit 33. Additionally, the signal processing unit 37 generates a reproduction RF signal SRF on the basis of the detection signal and transmits the reproduction RF signal SRF to a signal modulation and demodulation unit 38.

A drive control unit 4 generates a tracking control signal CT and a focus control signal CF on the basis of the tracking error signal STE and the focus error signal SFE and transmits these generated signals to the optical pickup 36. The optical pickup 36 performs tracking control and focus control in response to the transmitted signals so as to align the focal point of the light beam to the desired track of the optical disc 100.

The signal modulation and demodulation unit 38 performs predetermined demodulation processing and decoding processing on the reproduction RF signal SRF to play back the information. Thereafter, the signal modulation and demodulation unit 38 transmits the playback information to an external apparatus (not shown).

In addition, the optical disc apparatus 30 performs predetermined modulation processing on a recording signal input to the signal modulation and demodulation unit 38 and, subsequently, converts the demodulated recording signal to an output recording signal using the signal processing unit 37. Thereafter, the optical disc apparatus 30 controls the optical pickup 36 to output a write beam in accordance with the output recording signal. Thus, information is recorded on the optical disc 100 in accordance with the recording signal.

As noted above, the optical disc apparatus 30 emits a light beam that is focused on the desired track in the signal recording layer of the optical disc 100 from the optical pickup 36 so that the desired information can be played back or recorded.

2-2. Structure of Optical Pickup

Figure 9:
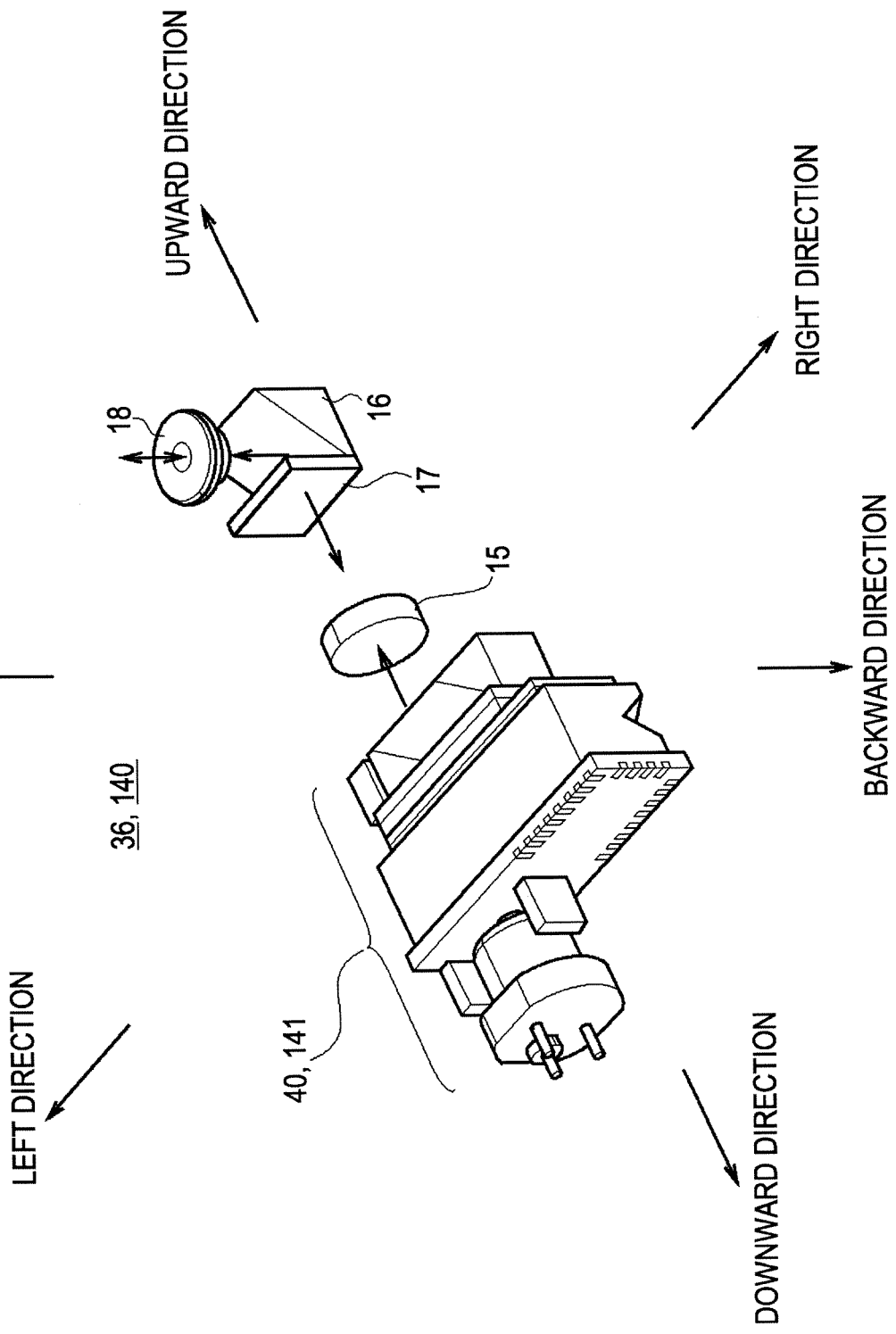
FIG. 9 is a schematic perspective view illustrating an exemplary structure of an optical pickup.

In FIG. 9, similar elements to those illustrated and described in relation to FIG. 1 are designated by similar reference numerals. As shown in FIG. 9, the optical pickup 36 converts an output beam L11 emitted from the interior of an optical integrated element 40 to a parallel beam using the collimator lens 15. The parallel light beam is then changed from a linearly polarized light beam to a circularly polarized light beam by the ¼ wavelength plate 17. The propagation direction of the parallel light beam is changed towards the optical disc 100 (not shown) in the forward direction by the mirror 16. Thereafter, the field lens 18 converts the output beam L11 to a converging light beam and focuses the converging light beam on the desired track formed on the signal recording surface of the optical disc 100.

Additionally, the optical pickup 36 leads a reflected light beam L12 of the output light beam L11 reflected off the signal recording surface of the optical disc 100 to enter the field lens 18 so as to transform the reflected light beam L12 from a diverging light beam to a parallel light beam. The propagation direction of the parallel light beam is changed to a downward direction towards the optical integrated element 40 by a mirror 16. The parallel light beam is then changed from a circularly polarized light beam to a linearly polarized light beam having a polarization by the ¼ wavelength plate 17. Thereafter, the collimator lens 15 transforms the linearly polarized light beam to a converging light beam, which is input to the optical integrated element 40.

The optical integrated element 40 includes the laser diode 12 of the optical pickup 11 (see FIG. 1), the polarizing beam splitter 14, the half mirror 19, the beam splitting light guides 20 and 21, the photodetector 22, and the beam splitting light guide pattern switcher 24 in an integrated fashion.

2-2-1. Optical Path of Output Beam in Optical Integrated Element

Figure 10A:
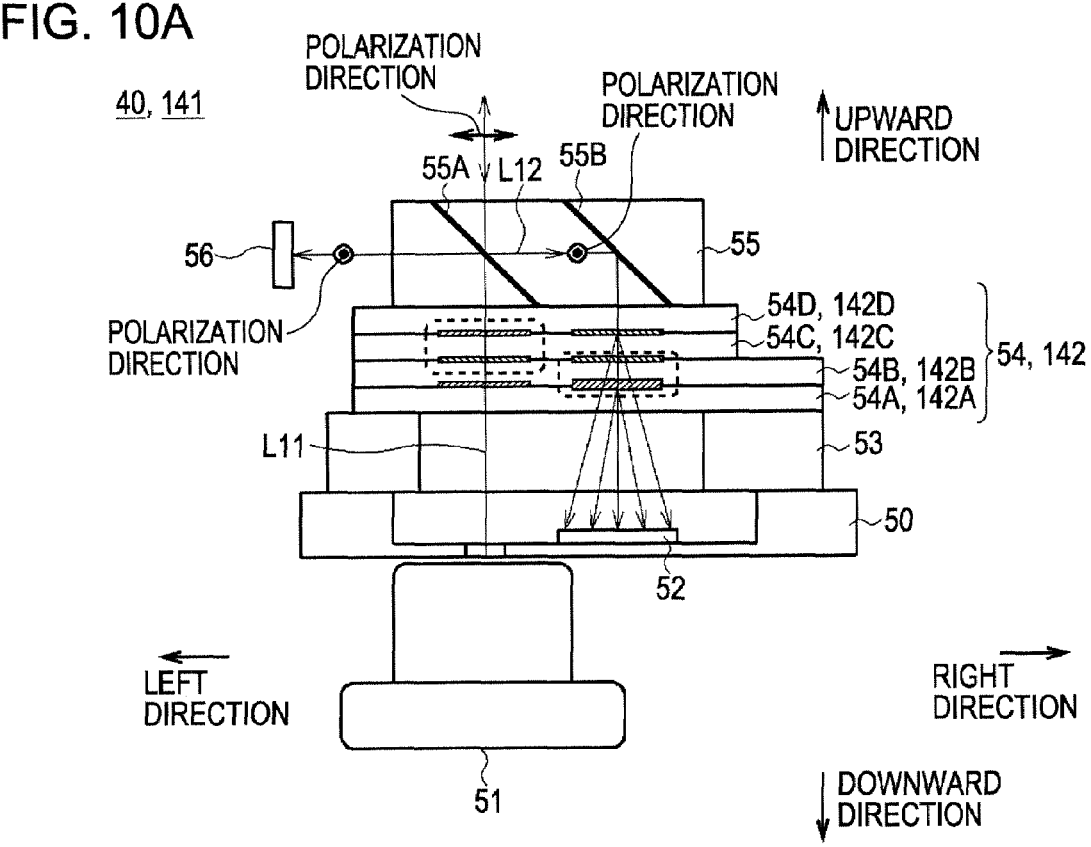
FIGS. 10A and 10B are schematic illustrations of an optical integrated element.

In practice, as shown in FIG. 10A, the optical integrated element 40 includes a base 50 at the center. A laser diode 51, which corresponds to the laser diode 12 shown in FIG. 1, is mounted on the lower surface of the base 50.

A photodetector 52, which corresponds to the photodetector 22 shown in FIG. 1, is mounted on the upper surface of the base 50. In addition, a spacer 53 is mounted on the upper surface of the base 50. A polarization filter 54 including laminated thin plate members 54A to 54D is mounted on the spacer 53. Furthermore, a polarization prism 55, which corresponds to the polarizing beam splitter 14 shown in FIG. 1, is mounted on the polarization filter 54.

Figure 10B:
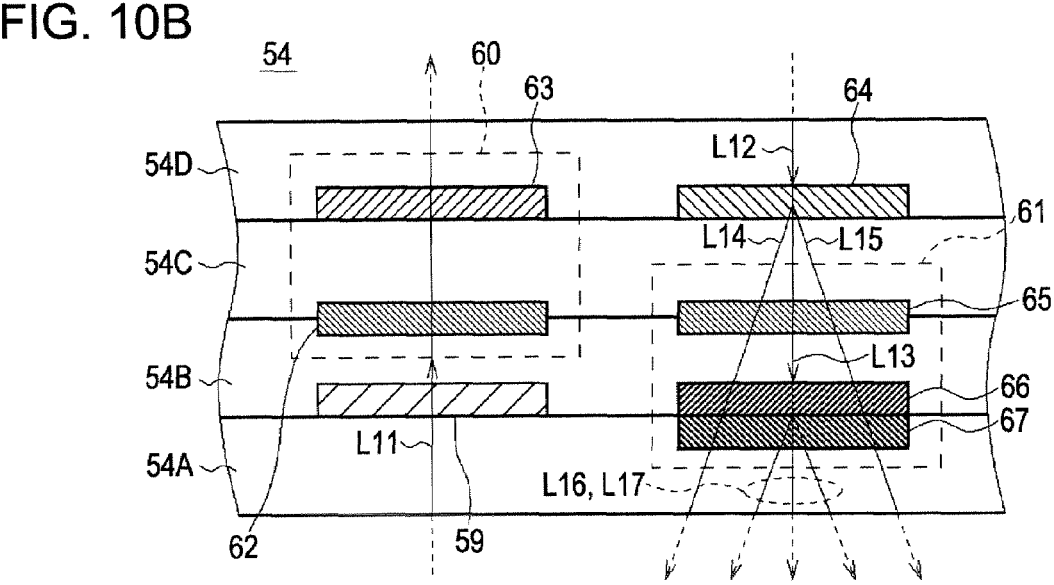

As shown in FIG. 10B, a variety of holograms and wavelength plates are formed on the plate members 54A to 54D of the polarization filter 54. By combining the variety of holograms and wavelength plates, a ½ wavelength plate 59, an attenuator 60, and a beam splitting light guide pattern switcher 61 are achieved in the polarization filter 54. The attenuator 60 has a function of attenuating the intensity of the output beam L11 and correcting the intensity distribution of the output beam L11 using the method described in Japanese Unexamined Patent Application Publication No. 2002-260272. The beam splitting light guide pattern switcher 61 switches a beam splitting light guide pattern for the reflected light beam L12.

In the optical integrated element 40, the laser diode 51 emits the output beam L11 in the upward direction under the control of the system controller 31 (see FIG. 8). The output beam L11 passes through a through-hole formed in the base 50 in the vertical direction and a cavity formed in the spacer 53. The output beam L11 then enters the polarization filter 54.

At that time, the plate member 54A of the polarization filter 54 directly transmits the output beam L11. The ½ wavelength plate 59 disposed in the plate member 54B rotates the plane of polarization of the output beam L11 by a predetermined angle so that the polarization direction is changed to the left-right direction in FIG. 10A. Thereafter, the output beam L11 enters an active wavelength plate 62 disposed between the plate members 54B and 54C.

The active wavelength plate 62 is composed of a liquid crystal element. The active wavelength plate 62 rotates, by a predetermined angle, the plane of polarization in a circular area at the center of which is the axis of the output beam L11 and which has a predetermined radius under the control of the system controller 31 (see FIG. 8). Thereafter, the output beam L11 enters a polarization hologram 63 of the plate member 54D. The polarization hologram 63 diffracts a light beam that is a polarization component of the output beam L11 in a specific direction and inputs the light beam to the polarization prism 55.

Here, when recording a signal on the optical disc 100, the optical integrated element 40 adjusts a relative rotation of the plane of polarization of the output beam L11 passing through the circular area of the active wavelength plate 62 at the center of which is the axis of the output beam L11 and which has a predetermined radius so that the relative rotation is substantially zero degrees (i.e., a polarization direction is parallel to the left-right directions in FIG. 10A). Accordingly, the optical integrated element 40 allows most of the output beam L11 to pass through a polarization film 55A of the polarization prism 55 without the occurrence of diffraction caused by the polarization hologram 63 and outputs the output beam L11 in a direction towards the collimator lens 15 (see FIG. 8) disposed above the optical integrated element 40. Thus, the optical integrated element 40 can efficiently use the laser power when recording the signal on the optical disc 100.

In contrast, when reading out a signal recorded on the optical disc 100, the optical integrated element 40 provides a relative angle to the plane of polarization of the output beam L11 passing through a circular area of the active wavelength plate 62 at the center of which is the axis of the output beam L11 and which has a predetermined radius. Accordingly, the polarization hologram 63 of the optical integrated element 40 selectively diffracts only the center portion of the output beam L11 having a strong intensity. The polarization film 55A of the polarization prism 55 reflects the diffracted light beam so that the diffracted light beam is made incident on a photodetector 56 disposed on the left side of FIG. 10A. The photodetector 56 is for monitoring the operation of the attenuator 60. In addition, the optical integrated element 40 allows the center portion of the output beam L11 with a decreased intensity to pass through the polarization film 55A of the polarization prism 55. The optical integrated element 40 then outputs the passing light beam in a direction towards the collimator lens 15 (see FIG. 8) disposed above the optical integrated element 40.

In this way, when reading a signal recorded on the optical disc 100, the optical integrated element 40 can increase the output power of the laser diode 51 without increasing the readout power generated on the recording surface of the optical disc 100. Thus, the optical integrated element 40 can relatively reduce laser noise. In addition, the optical integrated element 40 can uniform the intensity distribution of the output light beam so that the converging performance of the light beam spot on the recording surface of the optical disc 100 can be improved.

Furthermore, the system controller 31 (see FIG. 8) detects the intensity of the light beam input to the photodetector 56 for monitoring the operation of the attenuator 60 so as to check the operation of the active wavelength plate 62. Thus, the system controller 31 can prevent the output light beam L11 having a recording power from being emitted onto the optical disc 100 although the intensity of the output light beam is attenuated by the attenuator 60. Thus, the emission of the output light beam having a power that exceeds the rated power of the laser diode 51 can be prevented.

2-2-2. Optical Path of Reflected Light Beam in Optical Integrated Element

Additionally, as shown in FIG. 10A, each of the polarization film 55A and a reflecting surface 55B of the optical integrated element 40 reflects the reflected light beam L12 that is made incident on the optical integrated element 40 from the upper side. Thus, the reflected light beam L12 is made incident on a focus servo hologram 64 disposed in the plate member 54D.

As shown in FIG. 10B, the focus servo hologram 64 is disposed on the lower surface of the plate member 54D together with the polarization hologram 63. The focus servo hologram 64 separates the reflected light beam L12 into a zeroth-order reflected light beam L13, a plus-first-order reflected light beam L14 having a negative power, and a minus-first-order reflected light beam L15 having a positive power, which are input to the plate member 54C.

An active wavelength plate 65 composed of a liquid crystal element is disposed between the plate members 54B and 54C together with the active wavelength plate 62. The active wavelength plate 65 changes a voltage applied to a liquid crystal cell under the control of the system controller 31 (see FIG. 8) so as to rotate the planes of polarization of the reflected light beams L13 to L15 appropriately. Thereafter, the reflected light beams L13 to L15 are input to the plate member 54B.

That is, the active wavelength plate 65 determines according to the voltage applied to the liquid crystal cell whether it transmits the reflected light beams L13 to L15 polarized in the left-right directions of FIG. 10B or the reflected light beams L13 to L15 polarized in the forward-backward direction (i.e., a direction perpendicular to the plane of FIG. 10B).

A beam splitting light guide 66 formed from a polarization hologram is disposed on the lower surface of the plate member 54B. A beam splitting light guide 67 formed from a polarization hologram is disposed on the upper surface of the plate member 54A. The beam splitting light guides 66 and 67 correspond to the beam splitting light guides 20 and 21 (see FIG. 1), respectively.

Figure 11B:
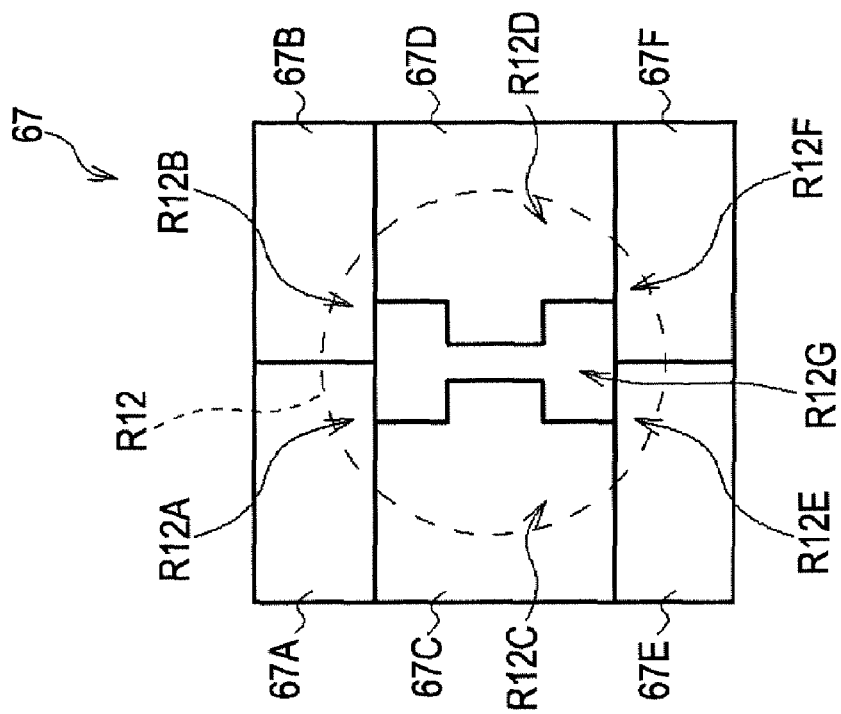
FIGS. 11A and 11B are schematic illustrations of a first structure of the beam splitting light guide.
Figure 11A:
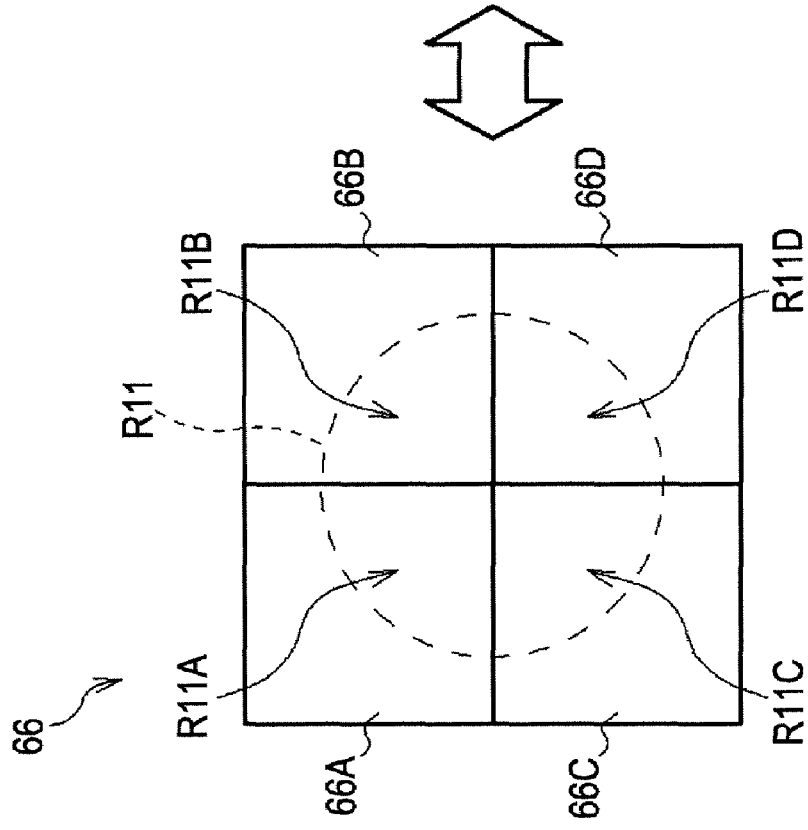

As shown in FIG. 11A which corresponds to FIG. 3A, like the beam splitting light guide 20, the beam splitting light guide 66 is partitioned into four light guide segments 66A to 66D. Therefore, when the reflected light beam L13 (see FIG. 10B) passes through the beam splitting light guide 66, the cross section R11 of the reflected light beam L13 is represented by a sum of four sub-cross sections R11A to R11D.

Figure 12A:
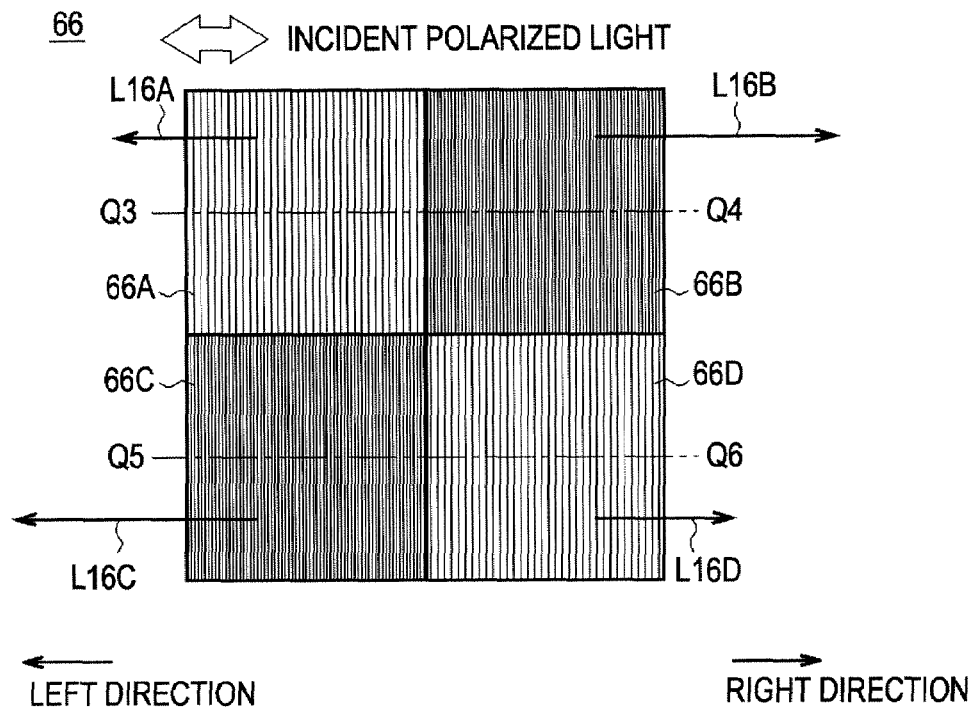
FIGS. 12A-12C are schematic illustrations of a second structure of the beam splitting light guide.

In practice, as shown in FIG. 12A which corresponds to FIG. 4A, a polarization hologram composed of a blazed HOE is formed in each of the four light guide segments 66A to 66D on a surface of the beam splitting light guide 66. The polarization holograms diffract separate light beams L16A to L16D of the reflected light beam L13 (see FIG. 10B) in the left or the right direction. For convenience of description, FIG. 12A is a top view of the beam splitting light guide 66 although the beam splitting light guide 66 is disposed on the lower surface of the plate member 54B.

Figure 12B:
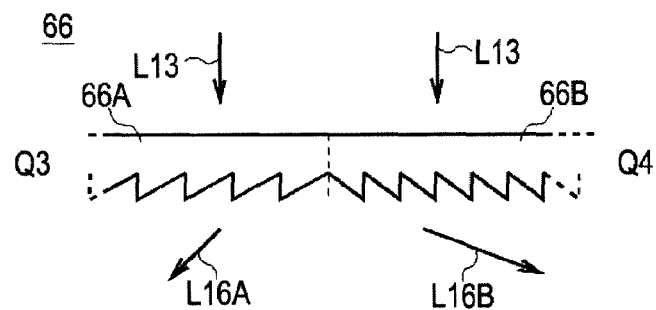
Figure 12C:
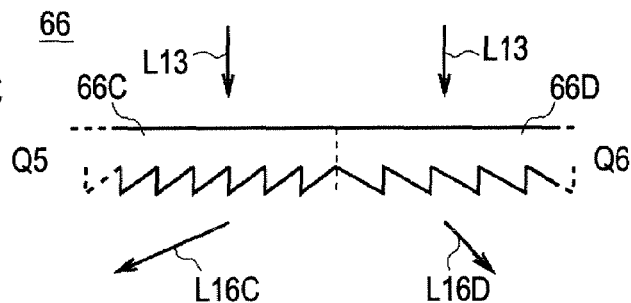

As shown by the cross sections in FIGS. 12B and 12C which correspond to FIG. 4B, the light guide segments 66A and 66D relatively weakly diffract partial light beams of the reflected light beam L13 corresponding to the sub-cross sections R11A and R11D (see FIG. 12A) to the left and the right, respectively. Thus, the light guide segments 66A and 66D generate the separate light beams L16A and L16D which are deflected in the left and the right directions and travel near the center of the beam splitting light guide 66, respectively.

In contrast, the light guide segments 66B and 66C relatively strongly diffract partial light beams of the reflected light beam L13 corresponding to the sub-cross sections R11B and R11C (see FIG. 12A) to the left and the right, respectively. Thus, the light guide segments 66B and 66C generate the separate light beams L16B and L16C which are deflected in the left and the right directions and travel relatively far from the center of the beam splitting light guide 66, respectively.

As shown in FIG. 11B which corresponds to FIG. 3B, the beam splitting light guide 67 is partitioned into seven light guide segments 67A to 67G. The arrangement pattern of the seven light guide segments 67A to 67G is partially different from that of the beam splitting light guide 20. Therefore, when the reflected light beam L13 (see FIG. 10B) passes through the beam splitting light guide 67, the cross section R12 of the reflected light beam L13 is represented by a sum of seven sub-cross sections R12A to R12G.

Figure 13A:
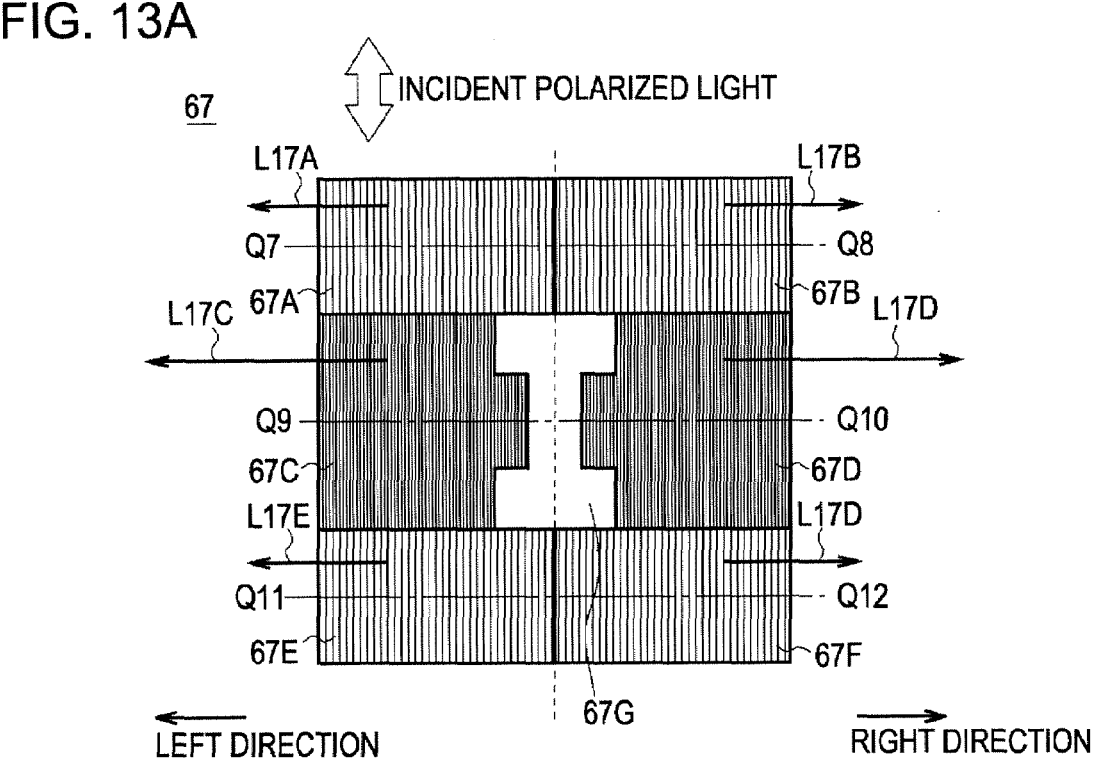
FIGS. 13A-13C are schematic illustrations of a third structure of the beam splitting light guide.

In practice, as shown in FIG. 13A which corresponds to FIG. 4C, a polarization hologram composed of a blazed HOE is formed in each of the six light guide segments 67A to 67F except for the light guide segment 67G on the upper surface of the beam splitting light guide 67. The polarization holograms diffract separate light beams L17A to L17F of the reflected light beam L13 (see FIG. 10B) towards the left or right direction. A separate light beam L17G that has passed through the light guide segment 67G travels in the center direction.

Figure 13B:
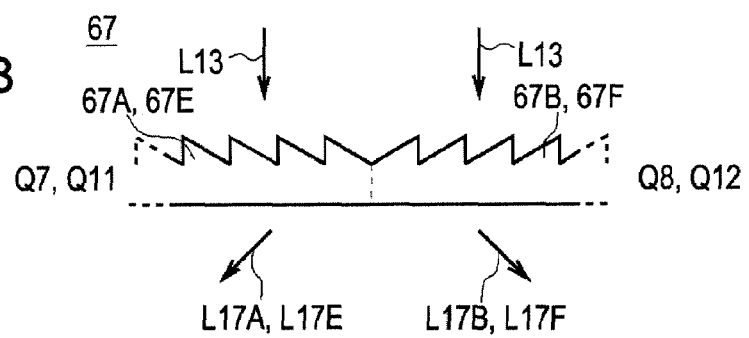
Figure 13C:
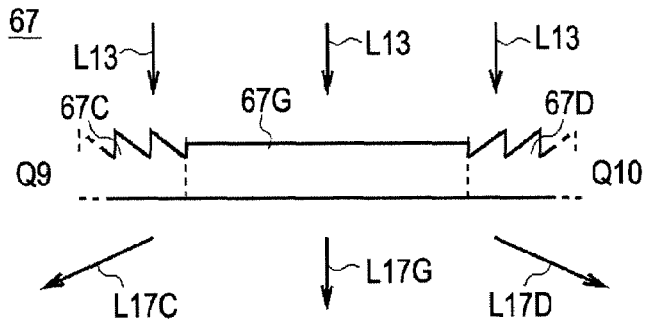

As shown by the cross sections in FIGS. 13B and 13C which correspond to FIG. 4B, the light guide segments 67A, 67E, 67B, and 67F relatively weakly diffract partial light beams of the reflected light beam L13 corresponding to the sub-cross sections R12A, R12E, R12B, and R12F (see FIG. 11B) towards the left or right direction. Thus, the light guide segments 67A, 67E, 67B, and 67F generate the separate light beams L17A, L17E, L17B, and L17F which are deflected in the left or the right directions and travel near the center of the beam splitting light guide 67.

In contrast, the light guide segments 67C and 67D relatively strongly diffract partial light beams of the reflected light beam L13 corresponding to the sub-cross sections R12C and R12D (see FIG. 11B) towards the left and the right directions, respectively. Thus, the light guide segments 67C and 67D generate the separate light beams L17C and L17D which are deflected in the left and the right directions and travel relatively far from the center of the beam splitting light guide 67, respectively.

The beam splitting light guides 66 and 67 are formed of a birefringent material. In addition, the indices of refraction of each of the reflected light beams L13 to L15 in polarization directions in the birefringence mode are different. That is, in the birefringence mode, the direction of the fast axis is different from the direction of the slow axis.

Accordingly, for example, when the reflected light beam L13 polarized in the left-right directions of FIG. 10B is made incident on the beam splitting light guide 66 formed in the plate member 54B, the beam splitting light guide 66 diffracts the reflected light beam L13. However, the beam splitting light guide 67 formed in the plate member 54A does not diffract the reflected light beam L13 so as to allow the separate light beams L16A to L16D to pass therethrough directly.

In contrast, when the reflected light beam L13 polarized in the forward-backward direction of FIG. 10B (i.e., in the direction perpendicular to the plane of FIG. 10B) is made incident on the beam splitting light guide 66 formed in the plate member 54B, the beam splitting light guide 66 allows the reflected light beam L13 to pass therethrough without diffracting the reflected light beam L13. However, the beam splitting light guide 67 formed in the plate member 54A diffracts the reflected light beam L13 so as to separate the reflected light beam L13 into the separate light beams L17A to L17G.

Accordingly, by changing a voltage applied to the liquid crystal cell of the active wavelength plate 65 and switching the polarization direction of the reflected light beam L13, the beam splitting light guide pattern switcher 61 (see FIG. 10B) of the optical pickup 36 can select whether the reflected light beam L13 is diffracted by the beam splitting light guide 66 or the beam splitting light guide 67.

That is, the beam splitting light guide pattern switcher 61 of the optical pickup 36 changes a voltage applied to the liquid crystal cell of the active wavelength plate 65 under the control of the system controller 31 so as to switch between two separation patterns of the reflected light beam L13 like the optical disc apparatus 10 (see FIG. 1) that mechanically switches between the beam splitting light guides 20 and 21. In one of the separation patterns, the reflected light beam L13 is separated into the separate light beams L16A to L16D. In the other, the reflected light beam L13 is separated into the separate light beams L17A to L17G.

In addition, since the beam splitting light guide pattern switcher 61 of the optical pickup 36 does not require a space for the switching operation compared with the case in which the optical disc apparatus 10 (see FIG. 1) mechanically switches the beam splitting light guides 20 and 21. Consequently, the significantly compact optical pickup 36 can be produced.

2-2-3. Structure of Photodetector

As shown in FIG. 14, rectangular detection sub-areas 52A to 52M are provided on the upper surface of the photodetector 52, onto which the separate light beams L16A to L16D or the separate light beams L17A to L17G are emitted.

The detection sub-area 52E is located so that the center point of the detection sub-area 52E is coincident with a center point U2 of the photodetector 52. The center point U2 is coincident with the optical axis of the reflected light beam L13 that reaches the photodetector 52 unless the beam splitting light guides 66 and 67 are present. The detection sub-areas 52A and 52B are located on the left side and the right side of the detection sub-area 52E, respectively. The detection sub-areas 52C and 52D are located on the left side of the detection sub-areas 52A and on the right side of the detection sub-area 52B, respectively.

The detection sub-areas 52F and 52G are provided in order to detect interlayer stray light, which is described in more detail below. The detection sub-area 52F is located at a position on the left side of the detection sub-area 52C and separated towards the outside of the photodetector 52. The detection sub-areas 52G is located at a position on the right side of the detection sub-area 52D and separated towards the outside of the photodetector 52.

The detection sub-areas 52H to 52M are provided in order to generate the focus error signal SFE by the spot size detection (SSD) method. A rectangular region is partitioned into three in the forward-backward direction to generate the detection sub-areas 52H, 52I, and 52J. The detection sub-areas 52H, 52I, and 52J are located at a position on the left side of the detection sub-area 52F and separated towards the outside of the photodetector 52. Similarly, a rectangular region is partitioned into three in the forward-backward direction to generate the detection sub-areas 52K, 52L, and 52M. The detection sub-areas 52K, 52L, and 52M are located at a position on the right side of the detection sub-area 52G and separated towards the outside of the photodetector 52.

In the SSD method, when the width of the detection sub-areas 52H, 52I, and 52J of the photodetector 52 in the forward-backward direction is the same as the width of the detection sub-areas 52K, 52L, and 52M of the photodetector 52 in the forward-backward direction, the generated focus error signal SFE becomes asymmetric due to the difference between the magnification factors of the plus-first-order light and the minus-first-order light (refer to, for example, Japanese Unexamined Patent Application Publication No. 2003-187469, in particular, p. 9 and FIG. 3). Accordingly, it is determined that the width of the detection sub-areas 52H, 52I, and 52J in the forward-backward direction is greater than the width of the detection sub-areas 52K, 52L, and 52M in the forward-backward directions. Thus, the photodetector 52 can improve the symmetric property of the generated focus error signal SFE.

The photodetector 52 performs photoelectric conversion in accordance with the intensities of beam spots formed on the detection sub-areas 52A to 52M to generate electrical signals. Thereafter, the photodetector 52 amplifies the generated electrical signals using amplifiers (not shown) to generate thirteen types of detection signal.

2-3. Detection of Reflected Light Beam 2-3-1. Generation of Tracking Error Signal by DPD Method In practical applications, when the optical disc 100 is a BD-ROM, the optical pickup 36 (see FIG. 8) of the optical disc apparatus 30 changes a voltage applied to a liquid crystal cell of the active wavelength plate 65, as shown in FIG. 15A which corresponds to FIG. 6A, so as to transmit the reflected light beams L13 to L15 whose polarization directions are changed to the left-right directions.

At that time, the beam splitting light guide 66 of the optical pickup 36 separates the reflected light beam L13 into the separate light beams L16A to L16D. Thereafter, the optical pickup 36 inputs the separate light beams L16A to L16D to the detection sub-areas 52A to 52D of the photodetector 52, respectively.

As a result, as shown in FIG. 16A which corresponds to FIG. 7A, beam spots P11A to P11D having the shapes substantially similar to the cross section R11A to R11D (see FIG. 11A) are formed on the detection sub-areas 52A to 52D of the photodetector 52, respectively. Thus, detection signals S11A to S11D are generated in accordance with the intensities of the beam spots P11A to P11D.

Subsequently, the optical disc apparatus 30 (see FIG. 8) computes a tracking error signal STE11 using phase differences among the detection signals S11A to S11D. Thus, the optical disc apparatus 30 performs tracking control on the basis of the tracking error signal STE11 by the DPD method corresponding to the BD-ROM optical disc 100 (see FIG. 8).

Additionally, beam spots P11H and P11K based on the reflected light beams L14 and L15 are formed in the detection sub-areas 52H to 52J and 52K to 52M. Thus, detection signals S11H to S11J and S11K to S11M corresponding to the detection sub-areas 52H to 52J and 52K to 52M are generated.

Subsequently, the optical disc apparatus 30 (see FIG. 8) generates the focus error signal SFE using the following equation including the detection signals S11H to S11J and S11K to S11M and a predetermined constant α:

$$SFE=\{S11I+\alpha(S11K+S11M)\}-\{S11L+\alpha(S11H+S11J)\} \quad (3)$$

Thus, the optical disc apparatus 30 performs focus control on the basis of the focus error signal SFE.

In addition, the optical disc apparatus 30 generates a reproduction RF signal SRF using the following equation including the detection signals S11A to S11D:

$$SRF=S11A+S11B+S11C+S11D \quad (4)$$

2-3-2. Generation of Tracking Error Signal by One-Beam PP Method

In contrast, when the optical disc 100 represents a BD-RE disc, the optical pickup 36 (see FIG. 8) of the optical disc apparatus 30 changes a voltage applied to a liquid crystal cell of the active wavelength plate 65, as shown in FIG. 15B which corresponds to FIG. 6B, so as to transmit the reflected light beams L13 to L15 whose polarization directions are changed to the forward-backward direction.

At that time, the beam splitting light guide 67 of the optical pickup 36 separates the reflected light beam L13 into the separate light beams L17A to L17G. Thereafter, the optical pickup 36 inputs the separate light beams L17A to L17G to the detection sub-areas 52A to 52E of the photodetector 52, respectively.

As a result, as shown in FIG. 16B which corresponds to FIG. 7B, beam spots P12A to P12G having the shapes substantially similar to the cross section R12A to R12G (see FIG. 11B) are formed on the detection sub-areas 52A to 52E of the photodetector 52, respectively.

In this case, the separate light beams L17A and L17E are diffracted by the light guide segments 67A and 67E of the beam splitting light guide 67 (see FIG. 13A) in the same direction. Therefore, a beam spot P12A based on the separate light beam L17A and a beam spot P12E based on separate light beam L17E are formed in the detection sub-areas 52A of the photodetector 52. Similarly, the separate light beams L17B and L17F are diffracted by the light guide segments 67B and 67F (see FIG. 13A) in the same direction. Therefore, a beam spot P12B based on the separate light beam L17B and a beam spot P12F based on separate light beam L17F are formed in the detection sub-areas 52B of the photodetector 52.

In addition, beam spots P12C, P12D, and P12G based on the separate light beams L17C, L17D, and L17G are formed in the detection sub-areas 52C, 52D, and 52E of the photodetector 52, respectively.

Thus, the detection sub-areas 52A and 52D of the photodetector 52 generate four detection signals S12A to S12D in accordance with the intensities of the beam spots (P12A+P12E), (P12B+P12F), P12C, and P12D.

Subsequently, the optical disc apparatus 30 (see FIG. 8) generates a tracking error signal STE12 from the detection signals S12A to S12D using the following equation (5) corresponding to equation (1):

$$STE12=(S12D-S12C)-K(S12B-S12A) \quad (5)$$

The optical disc apparatus 30 then performs tracking control on the basis of the tracking error signal STE12 by the one-beam PP method corresponding to the BD-RE optical disc 100 (see FIG. 8).

In addition, the optical disc apparatus 30 generates a wobble signal SWB that indicates the detection state of a wobble of a groove structure of a track on the basis of the detection signals S12C and S12D using the following equation (6):

$$SWB=S12D-S12C \quad (6)$$

Thus, the optical disc apparatus 30 reads out address information of the BD-RE optical disc 100 (see FIG. 8).

Furthermore, like the BD-RE optical disc 100, the beam spots P12H and P12K based on the reflected light beams L14 and L15 are formed in the detection sub-areas 52H to 52J and 52K to 52M of the photodetector 52. Thus, detection signals S12H to S12J and S12K to S12M corresponding to the detection sub-areas 52H to 52J and 52K to 52M are generated.

Subsequently, the optical disc apparatus 30 (see FIG. 8) generates the focus error signal SFE using the following equation (7) similar to equation (3) that uses the detection signals S12H to S12J and S12K to S12M and a predetermined constant α:

$$SFE=\{S12I+\alpha(S12K+S12M)\}-\{S12L+\alpha(S12H+S12J)\} \quad (7)$$

Thus, the optical disc apparatus 30 performs focus control on the basis of the focus error signal SFE.

In addition, the optical disc apparatus 30 generates a reproduction RF signal SRF using the following equation including the detection signals S12A to S12E:

$$SRF=S12A+S12B+S12C+S12D+S12E \quad (8)$$

2-4. Reduction of Effect caused by Interlayer Stray Light

Some optical discs 100 have two signal recording layers (hereinafter referred to as "dual-layer discs"). When playing back this dual-layer optical disc 100, the optical disc apparatus 30 focuses the output beam L11 on a signal recording layer on which the desired data is recorded (hereinafter referred to as a "target recording layer"). Thus, the data is read out of the target recording layer.

Figure 17:
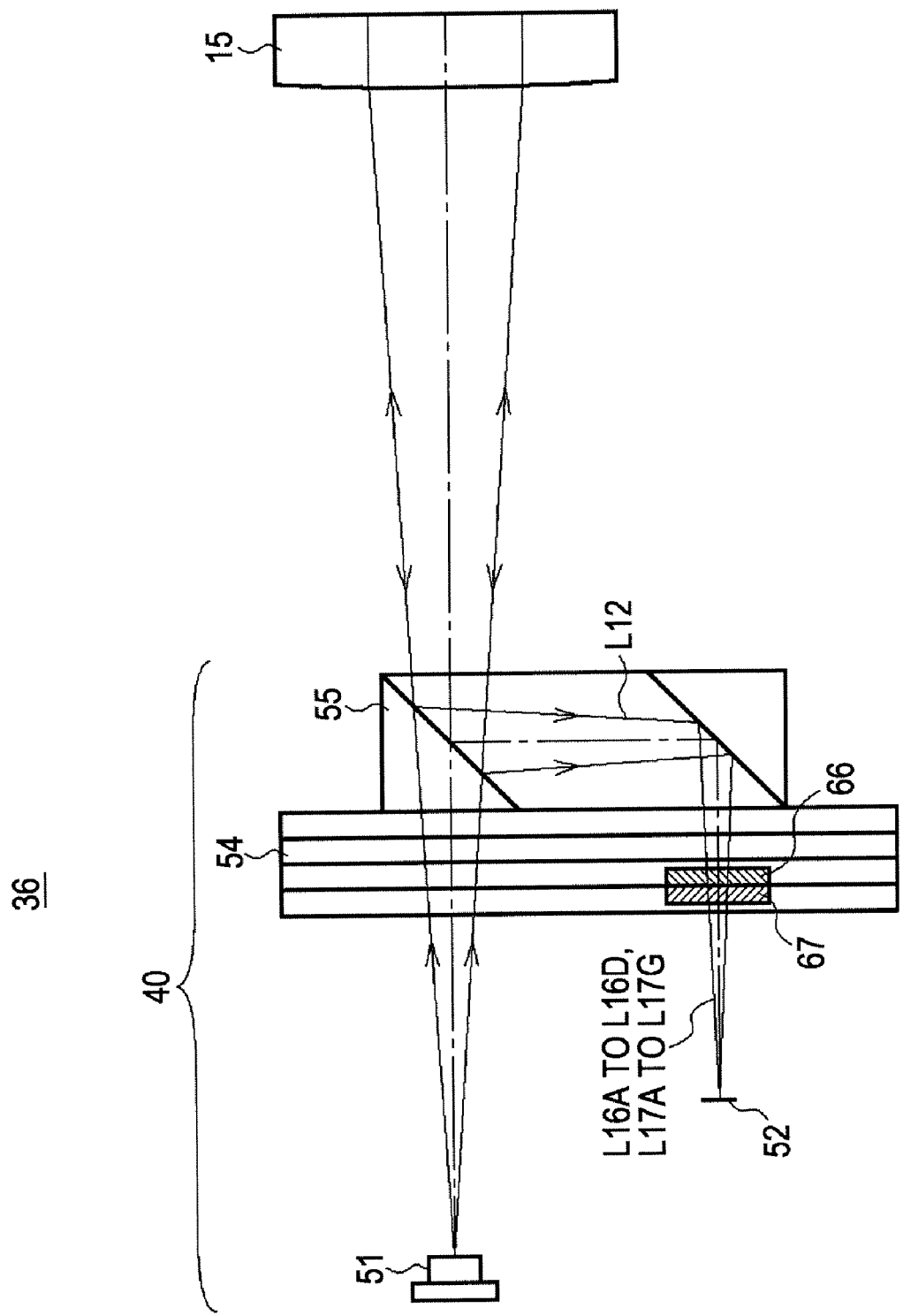
FIG. 17 is a schematic illustration of a first optical path in the optical pickup.

At that time, as shown by a schematic illustration in FIG. 17, the optical disc apparatus 30 focuses the separate light beams L16A to L16D or the separate light beams L17A to L17G of the reflected light beam L13 on the upper surface of the photodetector 52 in the optical pickup 36.

However, in the optical disc apparatus 30, a partial light beam of the output beam L11 is reflected off a signal recording layer different from the target recording layer (hereinafter referred to as a "non-target recording layer). This partial light beam reaches the photodetector 52 in addition to the output beam L11.

Figure 18:
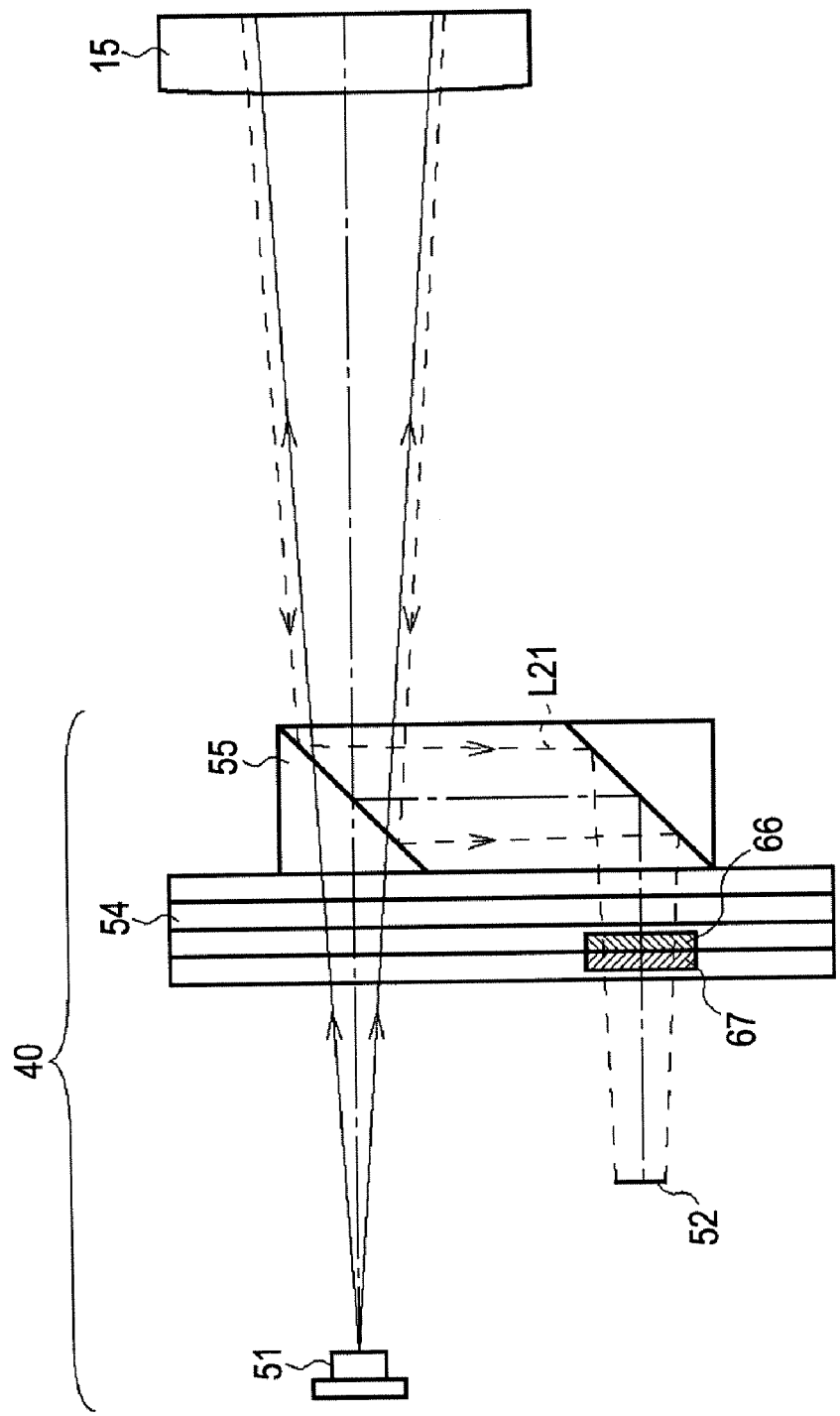
FIG. 18 is a schematic illustration of a second optical path in the optical pickup.

For example, when a target recording layer is a lower layer of the optical disc 100 (i.e., an L0 layer), a stray light beam L21 generated by the non-target recording layer L1 is made incident on the beam splitting light guides 66 and 67 in the form of a converging light beam, as shown in FIG. 18 which corresponds to FIG. 17.

Figure 19:
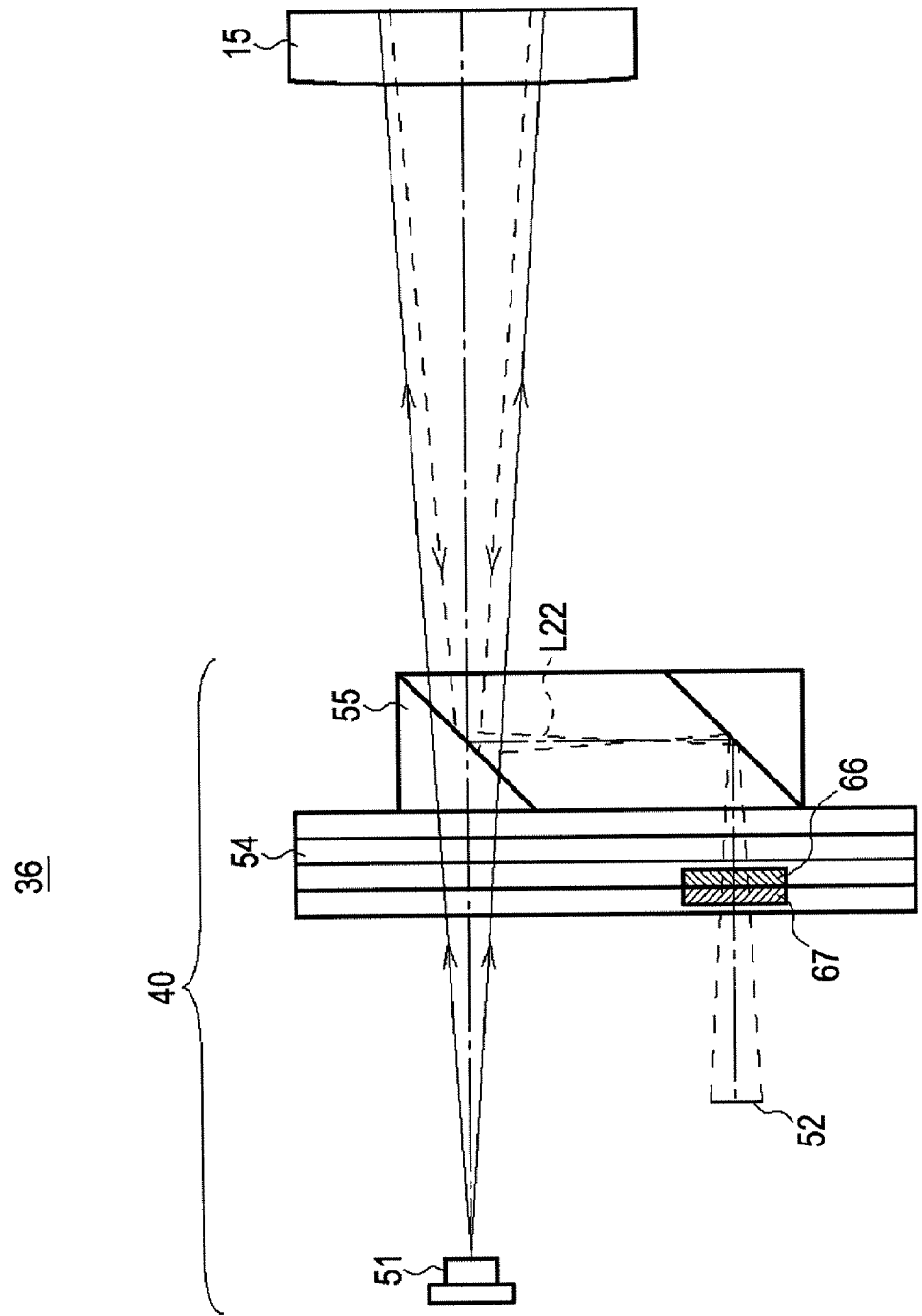
FIG. 19 is a schematic illustration of a third optical path in the optical pickup.

In contrast, when a target recording layer is the L1 layer of the optical disc 100, a stray light beam L22 generated by the non-target recording layer L0 is made incident on the beam splitting light guides 66 and 67 in the form of a diverging light beam, as shown in FIG. 19 which corresponds to FIG. 17.

Figure 20:
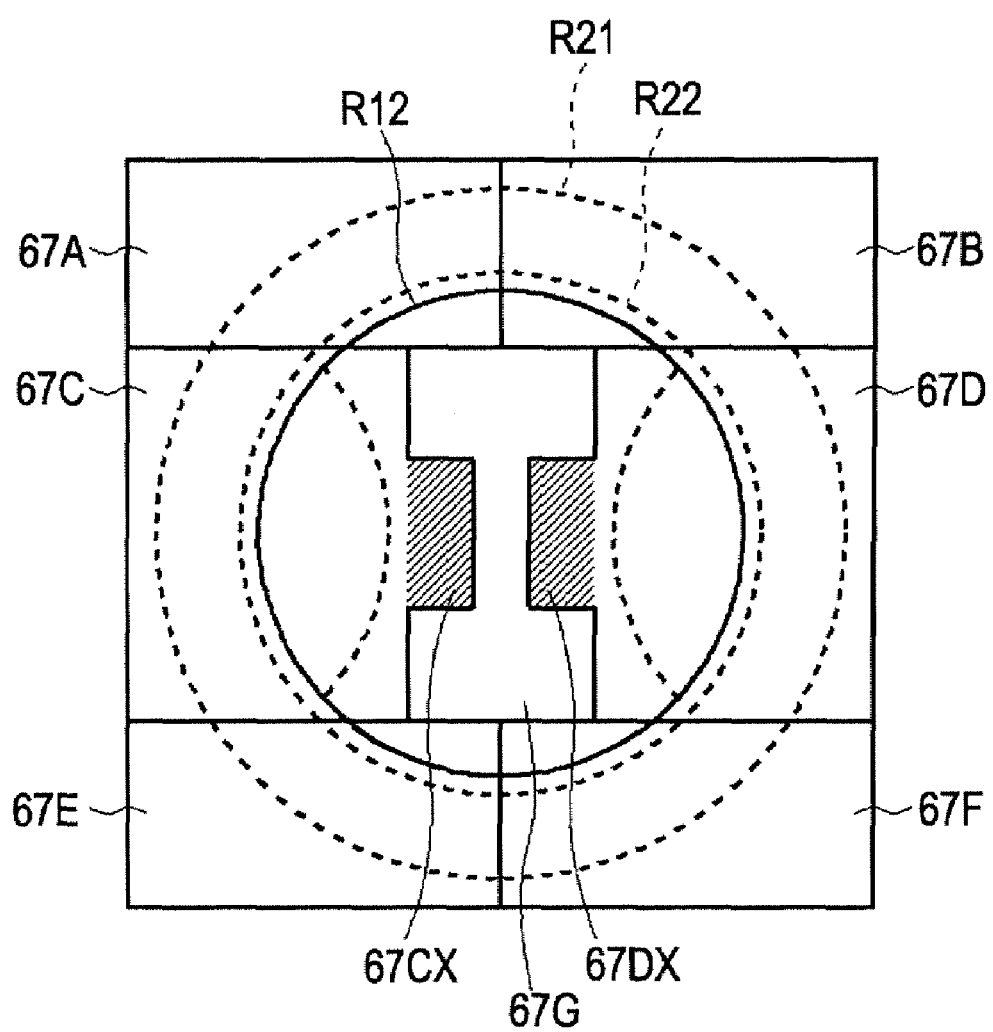
FIG. 20 is a schematic illustration of a stray light beam in the beam splitting light guide.

Here, as shown in FIG. 20 which corresponds to FIG. 13A, the beam splitting light guide 67 of the optical pickup 36 is partitioned so that partial areas of the light guide segments 67C and 67D on the center side extend towards the center side to form protrusion segments 67CX and 67DX (shown by cross-hatchings).

In FIG. 20, a cross section R21 formed when the stray light beam L21 (see FIG. 18) passes through the beam splitting light guide 67 and a cross section R22 formed when the stray light beam L22 (see FIG. 19) passes through the beam splitting light guide 67 are shown in addition to the cross section R12 formed when the reflected light beam L13 passes through the beam splitting light guide 67.

Furthermore, as shown in FIG. 16B, the beam splitting light guide 67 emits the beam spots P12A, P12B, P12E, and P12F corresponding to the sub-cross sections R12A, R12B, R12E, and R12F, respectively, which are the upper and lower portions of the cross section R12 (see FIG. 11B) onto the detection sub-areas 52A and 52B near the center point U2 (see FIG. 14). In addition, the beam splitting light guide 67 emits the beam spots P12C and P12D corresponding to the sub-cross sections R12C and R12D, respectively, which are the middle portions of the cross section R12 onto the detection sub-areas 52C and 52D located in an outer area of the beam splitting light guide 67.

Figure 21A:
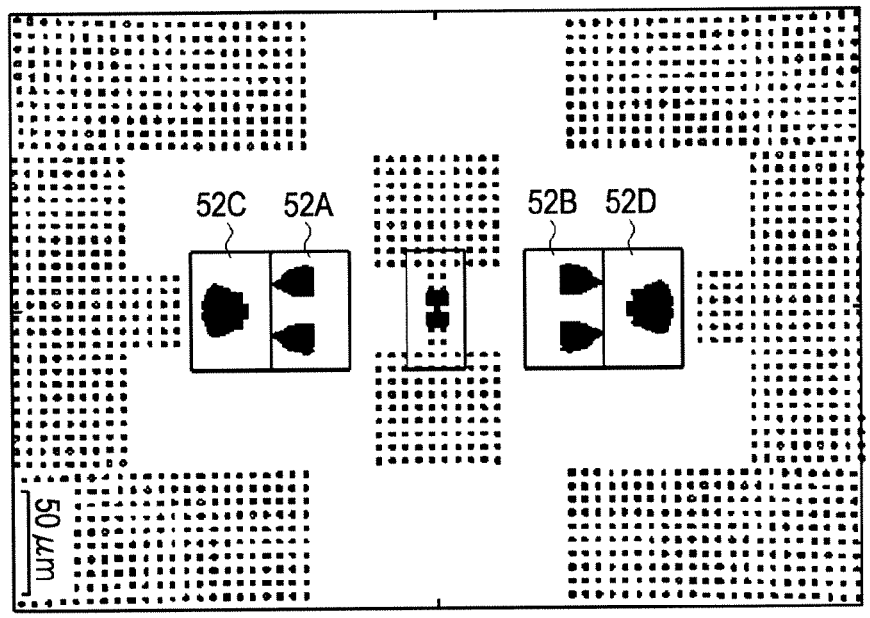
FIGS. 21A and 21B are schematic illustrations of a first irradiation pattern of the interlayer stray light beam.
Figure 21B:
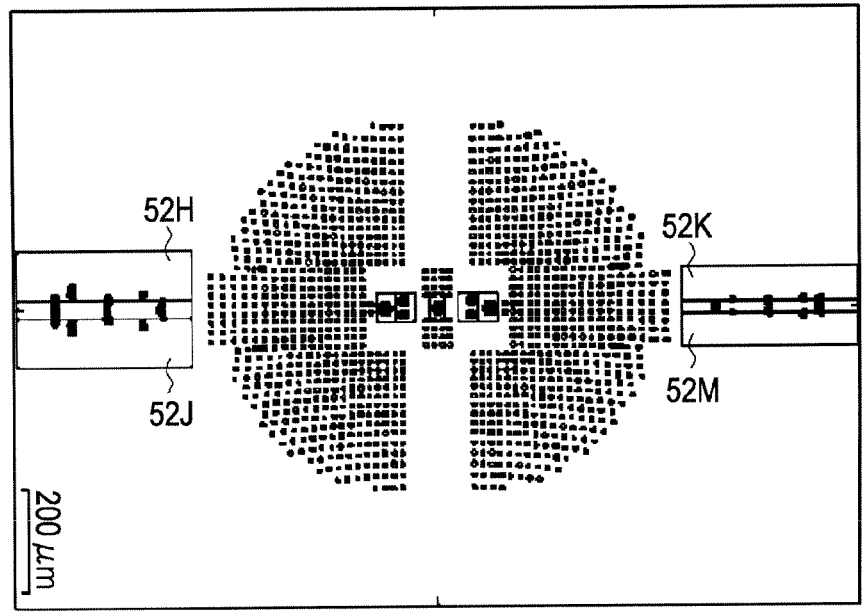

In this way, for example, when the target recording layer is the L0 layer of the optical disc 100, no interlayer stray light generated by the L1 layer is made incident on the detection sub-areas 52A to 52D, as shown in FIGS. 21A and 21B. Therefore, the interlayer stray light does not affect a tracking error signal STE12.

Figure 22A:
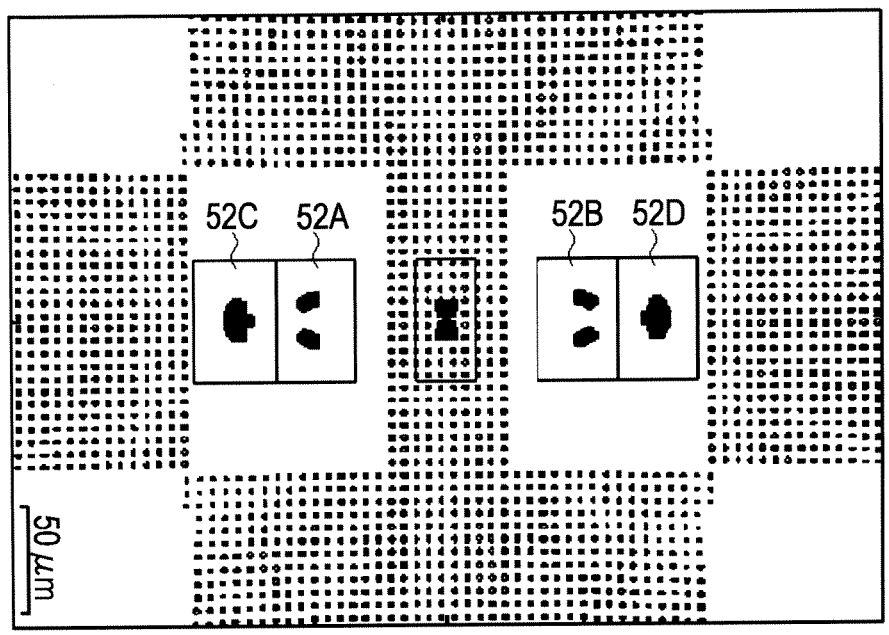
FIGS. 22A and 22B are schematic illustration of a second irradiation pattern of the interlayer stray light beam.
Figure 22B:
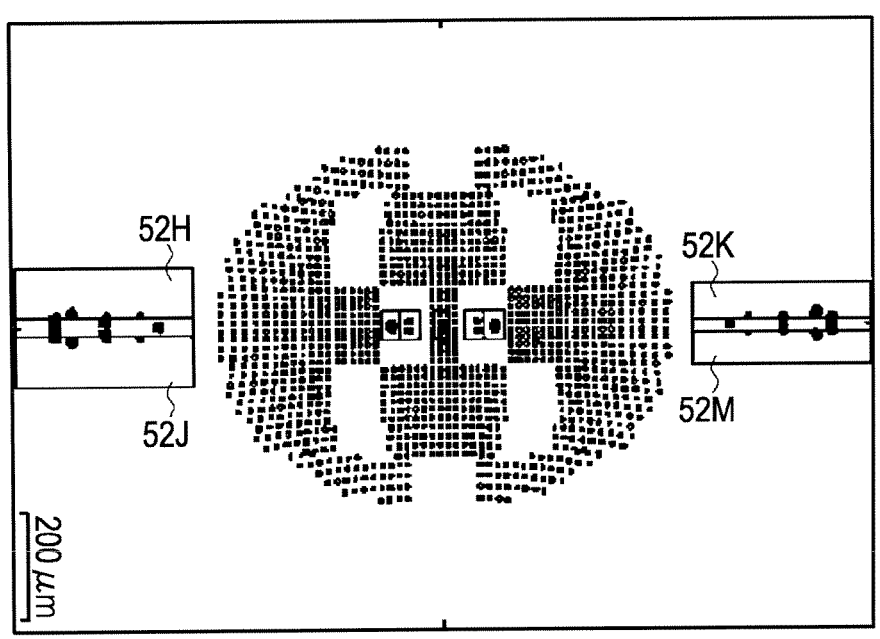

In addition, in the optical pickup 36, for example, when the target recording layer is the L1 layer of the optical disc 100, no interlayer stray light generated by the L0 layer is made incident on the detection sub-areas 52A to 52D of the photodetector 52, as shown in FIGS. 22A and 22B and as in the case where the target recording layer is the L0 layer of the optical disc 100. Therefore, the interlayer stray light does not affect the tracking error signal STE12.

Furthermore, in the optical pickup 36, as shown in FIGS. 21B and 22B, the detection sub-areas 52H to 52J and 52K to 52M of the photodetector 52 are arranged so that the interlayer stray light generated by either of the L1 and L0 layers does not enter the detection sub-areas 52H to 52J and 52K to 52M.

As noted above, in the optical pickup 36, the shapes of the light guide segments 67C and 67D of the beam splitting light guide 67 and the arrangement of the detection sub-areas 52A to 52M are determined so that the interlayer stray light generated by the L0 layer or the interlayer stray light generated by the L1 layer does not affect the tracking error signal STE12.

Additionally, some optical discs 100 include three or more signal recording layers (hereinafter referred to as "multi-layer disks"). Since the shapes of the light guide segments 67C and 67D of the beam splitting light guide 67 and the arrangement of the detection sub-areas 52A to 52M are determined so as to be optimal for the multi-layer disks, the optical pickup 36 can minimize interlayer stray light generated by a recording layer other than the target recording layer.

In addition, in the optical pickup 36, the intensities of the separate light beams L17A to L17G are sufficiently stronger than the intensity of the interlayer stray light. Accordingly, even when the interlayer stray light generated in a multi-layer disk is made incident on the detection sub-areas 52A to 52M, the optical pickup 36 can minimize the affect of the interlayer stray light compared with the DPP method in which the interlayer stray light of a main beam is made incident on a detection area that detects a weak signal beam.

Furthermore, when computing a tracking error signal, the optical pickup 36 does not use the separate light beam L17G that has passed through the light guide segment 67G of the beam splitting light guide 67. Accordingly, the optical pickup 36 can minimize the offset of the tracking error signal caused by the difference in state between a recorded signal recording layer and an unrecorded signal recording layer of the optical disc 100.

Still furthermore, in terms of the wobble signal SWB included in the groove structure of a track, the optical pickup 36 uses only the separate light beams L17C and L17D separated by the light guide segments 67C and 67D of the beam splitting light guide 67. Accordingly, the optical pickup 36 can minimize a beat component of the wobble signal SWB caused by the affect of the neighboring track as described in, for example, Japanese Unexamined Patent Application Publication No. 2004-273024. As a result, the optical pickup 36 can increase the accuracy of the wobble signal SWB and increase the readout performance of address information.

2-5. Operations and Advantages

In the above-described structure according to the first embodiment, the optical pickup 36 of the optical disc apparatus 30 changes the voltage applied to the liquid crystal cell of the active wavelength plate 65 of the beam splitting light guide pattern switcher 61 (see FIG. 10B) according to whether the type of the optical disc 100 is a BD-ROM or a BD-RE under the control of the system controller 31. In this way, the optical pickup 36 can change the polarization direction of the reflected light beam L13. Thereafter, the beam splitting light guide 66 or 67 is activated in accordance with the polarization direction of the reflected light beam L13 so that the reflected light beam L13 is separated into the separate light beams L16A to L16D or the separate light beams L17A to L17G. These separate light beams are then input to the photodetector 52.

When the beam splitting light guide 66 is activated, the beam spots P11A to P11D (see FIG. 16A) are formed in the detection sub-areas 52C and 52D of the photodetector 52. In contrast, when the beam splitting light guide 67 is activated, the beam spots P12A and P12E, the beam spots P12B and P12F, the beam spot P12C, and the beam spot P12D are formed in the detection sub-areas 52A to 52D, respectively.

Accordingly, by switching between the separation pattern that separates the reflected light beam L13 into the separate light beams L16A to L16D and the separation pattern that separates the reflected light beam L13 into the separate light beams L17A to L17G, the optical pickup 36 of the optical disc apparatus 30 can directly generate the detection signals S11A to S11D for generating the tracking error signal STE11 used for the DPD method or the detection signals S12A to S12D for generating the tracking error signal STE12 used for the one-beam PP method in the detection sub-areas 52A to 52D of the photodetector 52.

Figure 41A:
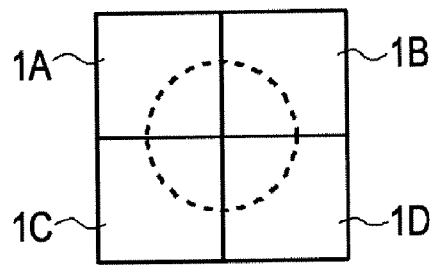
FIGS. 41A-41C are schematic illustrations of exemplary separation patterns of a light detection area of a known photodetector.
Figure 41B:
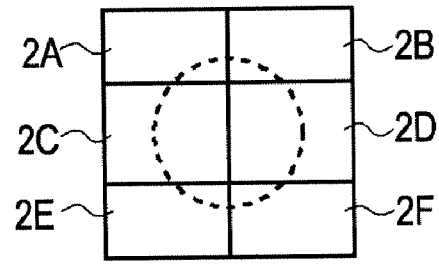
Figure 41C:
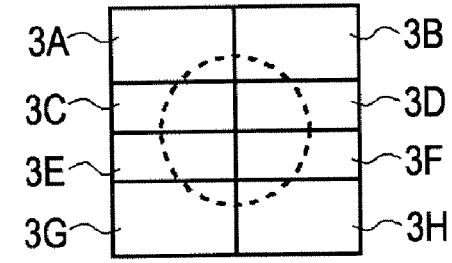

Consequently, the photodetector 52 can support both the tracking error signals STE11 and STE12 using four detection sub-areas, such as the detection sub-areas 52A to 52D. In addition, only four amplifiers are required for amplifying the detection signals. Accordingly, the number of amplifiers can be reduced compared with a known photodetector having eight detection sub-areas (see FIG. 41C). Thus, the deterioration of the RF signal due to amplifier noise can be decreased. In addition, the surface-mounted area of components of the amplifier in the photodetector 52 can be reduced, thereby reducing the size of the photodetector 52.

In addition, since polarization holograms composed of blazed holograms are formed in the beam splitting light guides 66 and 67, the diffraction directions can be the same direction. Therefore, the number of the beam spots P11A to P11D and P12A to P12F can be minimized.

Furthermore, the sizes of the detection sub-areas 52C and 52D of the photodetector 52 are determined so that some margins are provided around the beam spots P11A to P11D and P12A to P12F. Accordingly, even when the irradiation positions of the beam spots P11A to P11D and P12A to P12F are slightly shifted, the photodetector 52 can detect the entire beam spots P11A to P11D and P12A to P12F. Known photodetectors provided with eight detection sub-areas (see FIG. 41C) have a problem that the detection signals vary due to the shifts of the irradiation positions of the light beams on the photodetector, and therefore, the accuracy of the detection signals is decreased. However, the photodetector 52 can principally prevent such a problem.

Still furthermore, in the optical integrated element 40, the plate member 54D of the polarization filter 54 includes the polarization hologram 63 for the output beam L11 and the focus servo hologram 64 for the reflected light beam L12. The plate member 54C of the polarization filter 54 includes the active wavelength plate 62 for the output beam L11 and the active wavelength plate 65 for the reflected light beam L13. Accordingly, the structure of the optical integrated element 40 can be simplified and the size of the optical integrated element 40 can be reduced compared with the structure in which the above-described components are separately provided. As a result, the optical pickup 36 having a compact size can be achieved.

Yet still furthermore, in the photodetector 52, the beam spots P11A to P11D or P12A to P12F are emitted to inside the detection sub-areas 52A to 52D. Accordingly, the deterioration of the detection signals caused by the irradiation of the beam spots P11A to P11D or P12A to P12F on the borders between the detection sub-areas 52A to 52D can be prevented.

Yet still furthermore, in the photodetector 52, the detection sub-areas 52A to 52M are arranged in substantially a line at the center of which is the center point U2 (see FIG. 14). Accordingly, the photodetector 52 can generate the focus error signal SFE for the SSD method on the basis of the detection signals S11H to S11M or S12H to S12M detected in the detection sub-areas 52H to 52J and 52K to 52M.

Yet still furthermore, in the optical pickup 36, by changing the voltage applied to the liquid crystal cell of the active wavelength plate 65 with the polarization filter 54 being fixed, the beam splitting light guide pattern switcher 61 can change the polarization direction of the reflected light beam L13 and select whether the beam splitting light guide 66 or 67 is activated in accordance with the polarization direction of the reflected light beam L13. Accordingly, the reliability of the switching operation can be significantly increased compared with the mechanical switching between the beam splitting light guides 20 and 21 as shown in FIG. 1, since a moving part is not present. In addition, the size of the optical pickup 36 can be significantly reduced.

In known optical disc apparatuses having a plurality of separate detection sub-areas of a photodetector, the number of amplifiers increases in accordance with the number of the detection sub-areas, and therefore, the power consumption increases.

In DVDs, even when the detection area of the photodetector is separated into a plurality of sub-areas used for both the DPD method and one-beam PP method, this problem is not critical. However, in the case of playback of a BD-RE disc, the reception sensitivity of a photodetector in the wavelength range of a BD light source is decreased to about two third of the reception sensitivity in the wavelength range of a DVD light source. In addition, the transfer rate of a BD readout signal is about three times the transfer rate of a DVD readout signal when compared at a 1× speed. Accordingly, it is desirable that the noise of the photodetector is further reduced.

Therefore, the known optical disc apparatuses in which the detection area of a photodetector is separated into a plurality of sub-detection areas cannot employ the one-beam PP method due to the noise and the power consumption when playing back a BD-RE disc.

To support both the DPD method and DPP method as another tracking error signal detection method, the detection area of the photodetector is configured as described in Japanese Unexamined Patent Application Publication No. 3-5927.

In the DPP method, an RF signal is generated by adding signals from four separate photodetectors at the center. Thus, in terms of noise and power consumption, the DPP method is advantageous over the one-beam PP method. However, since a light beam output from a light source is separated into one main beam and two or more side beams, the light use efficiency of the light source is disadvantageously decreased. Accordingly, it is difficult for the optical disc apparatus for a BD having a low rated power of a laser diode to achieve high-speed disc driving.

In contrast, the optical disc apparatus 30 can generate a tracking error signal by using only the four detection signals S11A to S11D generated in the detection sub-areas 52A to 52D of the photodetector 52. Accordingly, the optical disc apparatus 30 can employ the one-beam PP method without any problems. In addition, the optical disc apparatus 30 can reduce the noise and the power consumption.

As is well known to those skilled in the art, when the known optical disc apparatuses play back and record information on a dual-layer or multi-layer BD-RE disk, a stray light beam (an interlayer stray light beam) of the main beam having a strong intensity from a layer other than the desired layer is made incident on the photodetector so as to overlap a side beam having a weak intensity. Thus, the quality of the side beam deteriorates, and therefore, the tracking error signal significantly deteriorates. Accordingly, it is difficult to apply the DPP method to the playback of a BD-RE disc in terms of the light use efficiency and the deterioration of the quality of the side beam due to the interlayer stray light.

In contrast, the beam splitting light guide 67 (see FIG. 20) of the optical pickup 36 is partitioned so that partial areas of the light guide segments 67C and 67D on the center side extend towards the center side to form protrusion segments 67CX and 67DX. In this way, when the dual-layer optical disc 100 is played back, no interlayer stray light generated by the L1 layer and the L0 layer is made incident on the detection sub-areas 52A to 52D of the photodetector 52 (see FIGS. 21A, 21B, 22A, and 22B).

In addition, since the optical pickup 36 does not use the separate light beam L17G that has passed through the light guide segment 67G of the beam splitting light guide 67 for the computation of the tracking error signal, the optical pickup 36 can minimize the offset of the tracking error signal caused by the difference in state between a recorded signal recording layer and an unrecorded signal recording layer of the optical disc 100.

Furthermore, in terms of the wobble signal SWB included in the groove structure of a track, since the optical pickup 36 uses only the separate light beams L17C and L17D separated by the light guide segments 67C and 67D of the beam splitting light guide 67, the optical pickup 36 can minimize a beat component of the wobble signal SWB due to the affect of the neighboring track. As a result, the optical pickup 36 can increase the accuracy of the wobble signal SWB and increase the readout performance of address information.

The optical pickup 36 of the optical disc apparatus 30 having such a structure can change the polarization direction of the reflected light beam L13 using the active wavelength plate 65 of the beam splitting light guide pattern switcher 61 according to the type of the optical disc 100. Thus, the optical pickup 36 activates the beam splitting light guide 66 or 67 according to the polarization direction of the reflected light beam L13. Accordingly, the optical pickup 36 can select whether the reflected light beam L13 is separated into the separate light beams L16A to L16D or the separate light beams L17A to L17G. Thus, the optical pickup 36 can directly generate the detection signals S11A to S11D for generating the tracking error signal STE11 for the DPD method. Alternatively, the optical pickup 36 can directly generate the detection signals S12A to S12D for generating the tracking error signal STE12 for the one-beam PP method.

3. Second Embodiment 3-1. Structure of Optical Pickup

Figure 23:
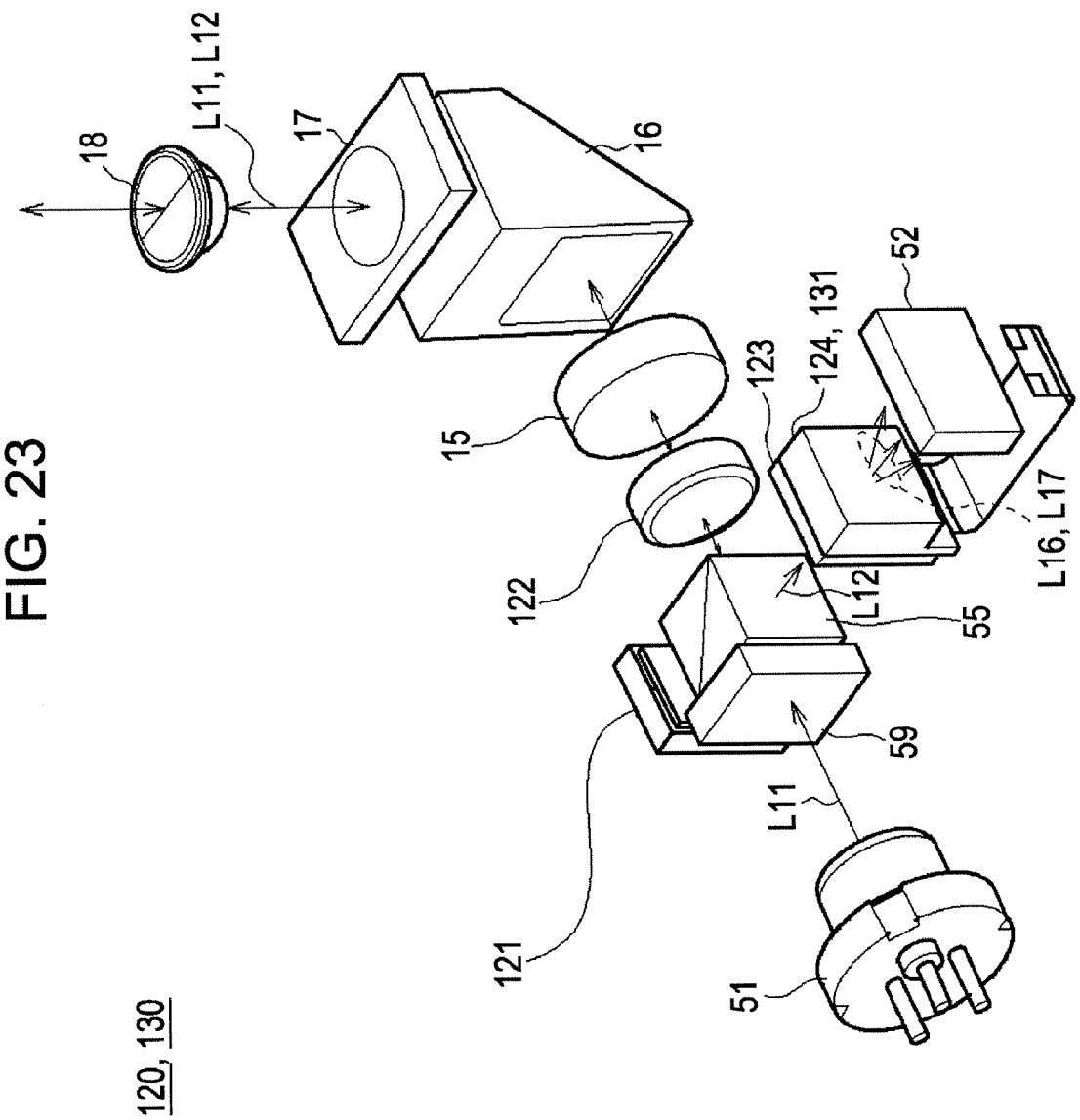
FIG. 23 is a schematic perspective view of an optical pickup.

As shown in FIG. 23, in which the same reference numerals are used to identify the same elements and blocks in FIGS. 9 and 10, the structure of an optical pickup 120 according to a second embodiment is partially different from that of the optical pickup 36 according to the first embodiment. Unlike the optical pickup 36, in the optical pickup 120, main optical elements of the optical integrated element 40 are independently provided.

Under the control of the system controller 31 (see FIG. 8), the optical pickup 120 controls the laser diode 51 to emit the output beam L11. The optical pickup 120 then rotates the plane of polarization of the output beam L11 by a predetermined angle using the ½ wavelength plate 59 and inputs the output beam L11 to the polarization prism 55.

The polarization film 55A of the polarization prism 55 allows most of the output beam L11 to pass therethrough and outputs most of the output beam L11 towards the collimator lens 15. At the same time, the polarization prism 55 partially reflects the output beam L11 and inputs the reflected output beam L11 to a laser intensity monitoring photodetector 121.

Subsequently, in the optical pickup 120, the output beam L11 passes through a coupling lens 122 and a collimator lens 15, is reflected by the mirror 16, and passes through the ¼ wavelength plate 17. Finally, the optical pickup 11 is focused on the desired track on the optical disc 100 (see FIG. 8) by the field lens 18.

Note that the coupling lens 122 prevents light intensity at the rim of the pupil of the collimator lens 15 from decreasing by increasing the focal length of the collimator lens 15.

At the same time, the system controller 31 (see FIG. 8) detects the intensity of the light beam incident on the laser intensity monitoring photodetector 121 and performs feedback control so as to adjust the intensity of the output beam L11 emitted from the laser diode 51 to be a desired intensity.

In addition, the output beam L11 is reflected off the signal recording surface of the optical disc 100 (see FIG. 8) to form a reflected light beam L12. The optical pickup 120 inputs this reflected light beam L12 to the polarization prism 55 via the field lens 18, the ¼ wavelength plate 17, the mirror 16, the collimator lens 15, and the coupling lens 122.

The polarization prism 55 reflects the reflected light beam L12 using the polarization film 55A and inputs the reflected light beam L12 to a focus servo hologram plate 123. The focus servo hologram plate 123 includes a hologram similar to the focus servo hologram 64 (see FIG. 10B). The focus servo hologram plate 123 separates the reflected light beam L12 into a zeroth-order reflected light beam L13, a plus-first-order reflected light beam L14, and a minus-first-order reflected light beam L15, which are input to a beam splitting light guide pattern switcher 124.

Figure 24:
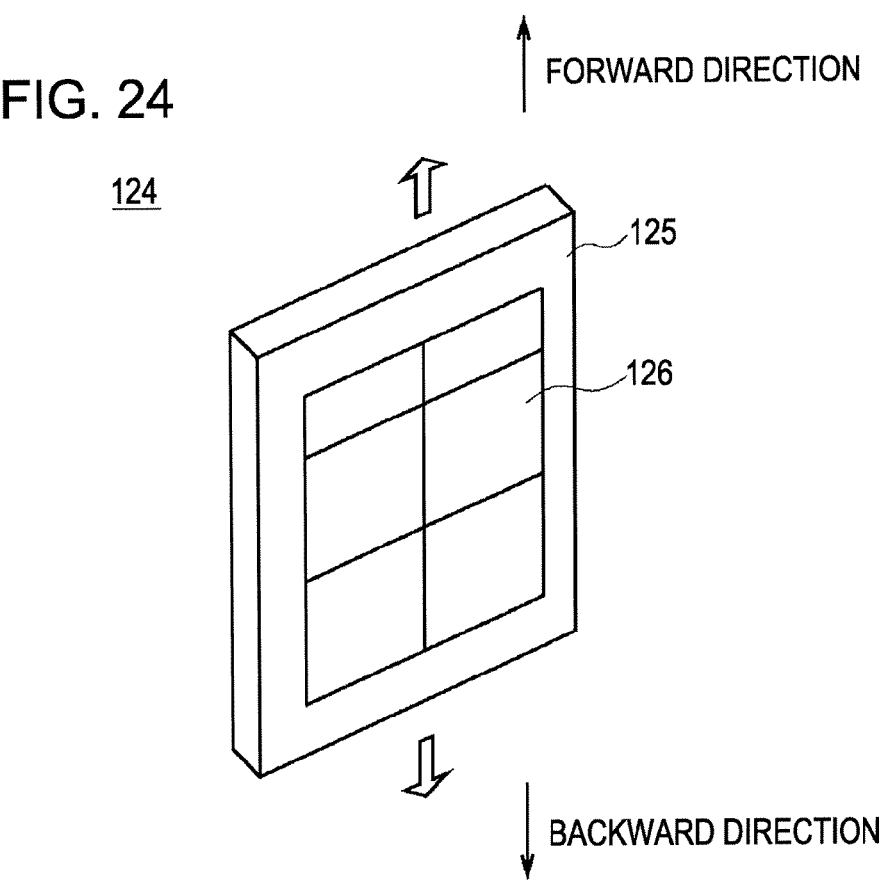
FIG. 24 is a schematic perspective view of a beam splitting light guide pattern switcher.

The beam splitting light guide pattern switcher 124 has a function similar to that of the beam splitting light guide pattern switcher 61 shown in FIG. 10B. However, the structure of the beam splitting light guide pattern switcher 124 is different from that of the beam splitting light guide pattern switcher 61. That is, as shown in FIG. 24, the beam splitting light guide pattern switcher 124 moves a slide plate 125 having a beam splitting light guide 126 formed thereon in the forward direction or the backward direction by means of an actuator (not shown).

Thus, the beam splitting light guide pattern switcher 124 can change the irradiation point of the reflected light beam L13 on the beam splitting light guide 126. As a result, the beam splitting light guide pattern switcher 124 can switch between separation patterns, which are described in more detail below, and input the separate reflected beams to the photodetector 52.

As described above, the optical pickup 120 changes the irradiation point of the reflected light beam L13 on the beam splitting light guide 126 by mechanically moving the slide plate 125 in the beam splitting light guide pattern switcher 124 so as to change the separation pattern of the reflected light beam L13.

3-2. Separation of Reflected Light Beam

The separation process of the reflected light beam L13 performed by the beam splitting light guide 126 in the beam splitting light guide pattern switcher 124 is described next.

3-2-1. Structure of Beam Splitting Light Guide

Figure 25:
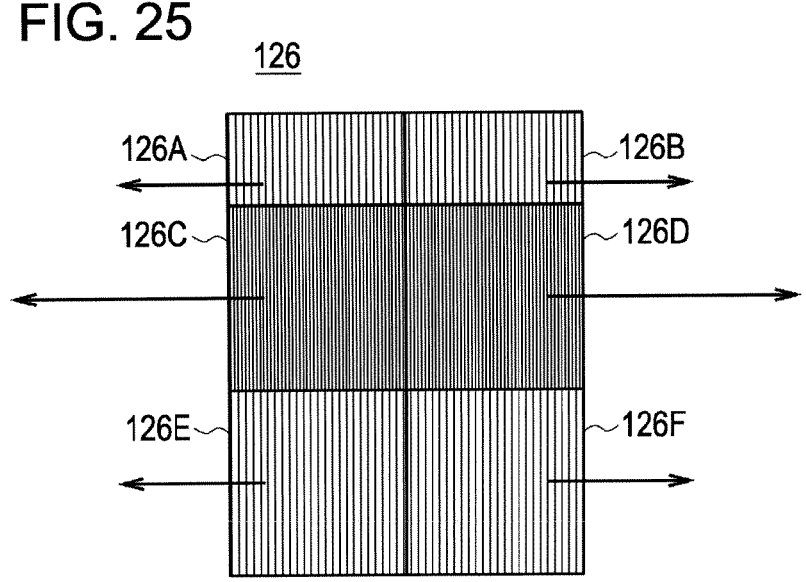
FIG. 25 is a schematic illustration of a structure of the beam splitting light guide.

As shown in FIG. 25, the beam splitting light guide 126 is significantly different from the beam splitting light guide 66 (see FIGS. 12A to 12C) and the beam splitting light guide 67 (see FIGS. 13A to 13C) in that the shape of the beam splitting light guide 126 is rectangular and the beam splitting light guide 126 is partitioned into six segments.

A hologram composed of a blazed HOE similar to the light guide segments 66A and 66D of the beam splitting light guide 66 is formed in light guide segments 126A, 126E, 126B, and 126F of the beam splitting light guide 126. The light guide segments 126A, 126E, 126B, and 126F relatively weakly diffract partial reflected light beam L13 in the left direction or the right direction. In addition, a hologram composed of a blazed HOE similar to the light guide segments 66B and 66C of the beam splitting light guide 66 is formed in light guide segments 126C and 126D of the beam splitting light guide 126. The light guide segments 126C and 126D relatively strongly diffract partial reflected light beam L13 in the left direction or the right direction.

3-2-2. Generation of Tracking Error Signal by DPD Method

Figure 26A:
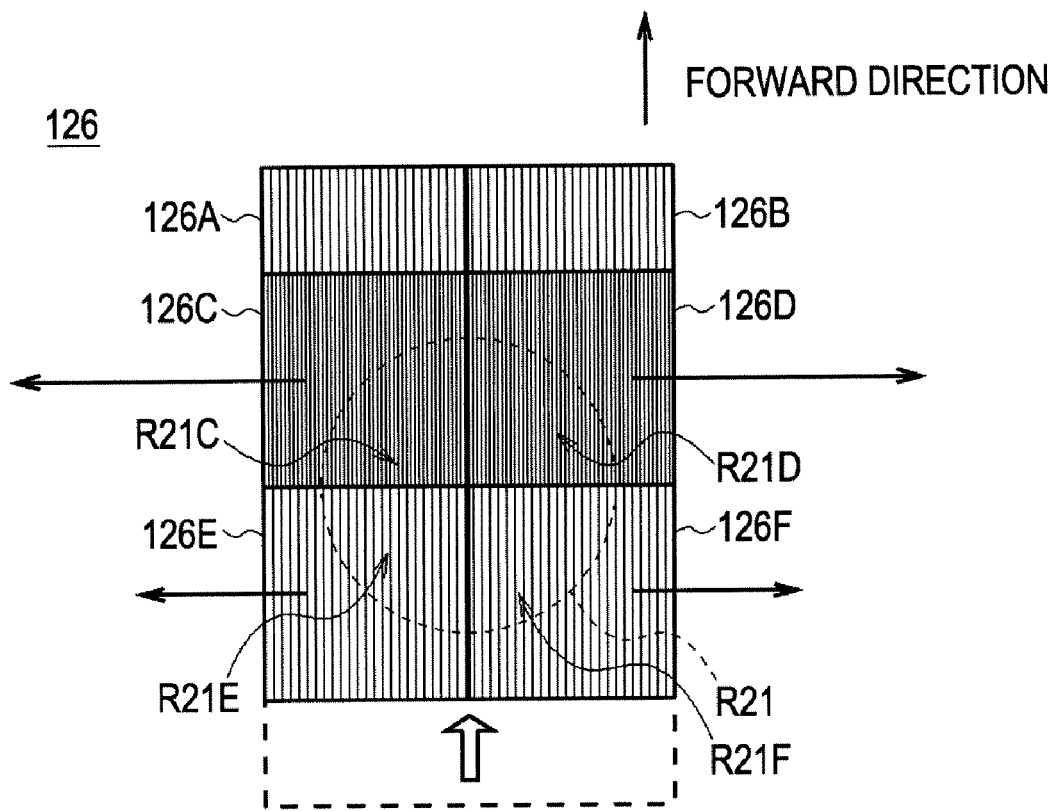
FIGS. 26A and 26B are schematic illustrations of a structure of a beam splitting light guide and beam spots formed by the beam splitting light guide according to a second embodiment.

In practical applications, when the optical disc 100 is a BD-ROM, the optical pickup 120 (see FIG. 23) moves the slide plate 125 in the forward direction using the beam splitting light guide pattern switcher 124 (see FIG. 24) so that, as shown in FIG. 26A, the center of a cross section R21 formed when the reflected light beam L13 passes through the beam splitting light guide 126 is made coincident with substantially the center of an area formed by the light guide segments 126C, 126D, 126E, and 126F.

Thus, the four light guide segments 126C to 126F of the beam splitting light guide 126 separates the reflected light beam L12 into four light beams having cross sections R21C to R21F, respectively, which are then input to the photodetector 52 (see FIG. 23).

Figure 26B:
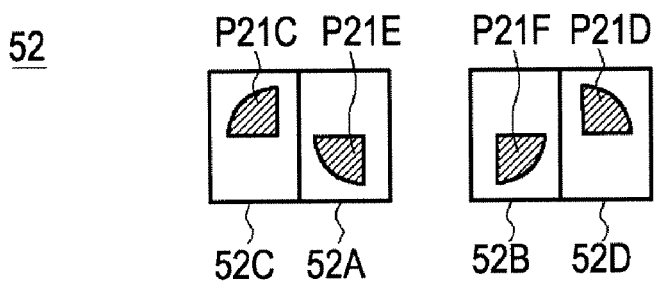

As a result, as shown in FIG. 26B, like the detection sub-areas 52A to 52D shown in FIG. 16A, beam spots P21A, P21B, P21C, and P21D having the shapes similar to the cross sections R21E, R21F, R21C, and R21D are formed in the detection sub-areas 52A to 52D of the photodetector 52, respectively. Subsequently, the photodetector 52 generates detection signals S21A to S21D in accordance with the intensities of the beam spots P21A to P21D.

Subsequently, the optical disc apparatus 120 (see FIG. 23) computes a tracking error signal STE21 using phase differences among the detection signals S21A to S21D. Thus, the optical disc apparatus 30 performs tracking control on the basis of the tracking error signal STE21 by the DPD method corresponding to the BD-ROM optical disc 100 (see FIG. 8).

In addition, like the first embodiment, the optical disc apparatus 120 generates the focus error signal SFE and the reproduction RF signal SRF.

Note that, in FIG. 26B, the positions at which the beam spots P21A and P21C are formed are reversed from the positions at which the beam spots P11A and P11C are formed in FIG. 16B. However, the optical disc apparatus 120 takes into account this information and computes the tracking error signal STE21, the focus error signal SFE, and the reproduction RF signal SRF.

3-2-3. Generation of Tracking Error Signal by One-Beam PP Method

Figure 27A:
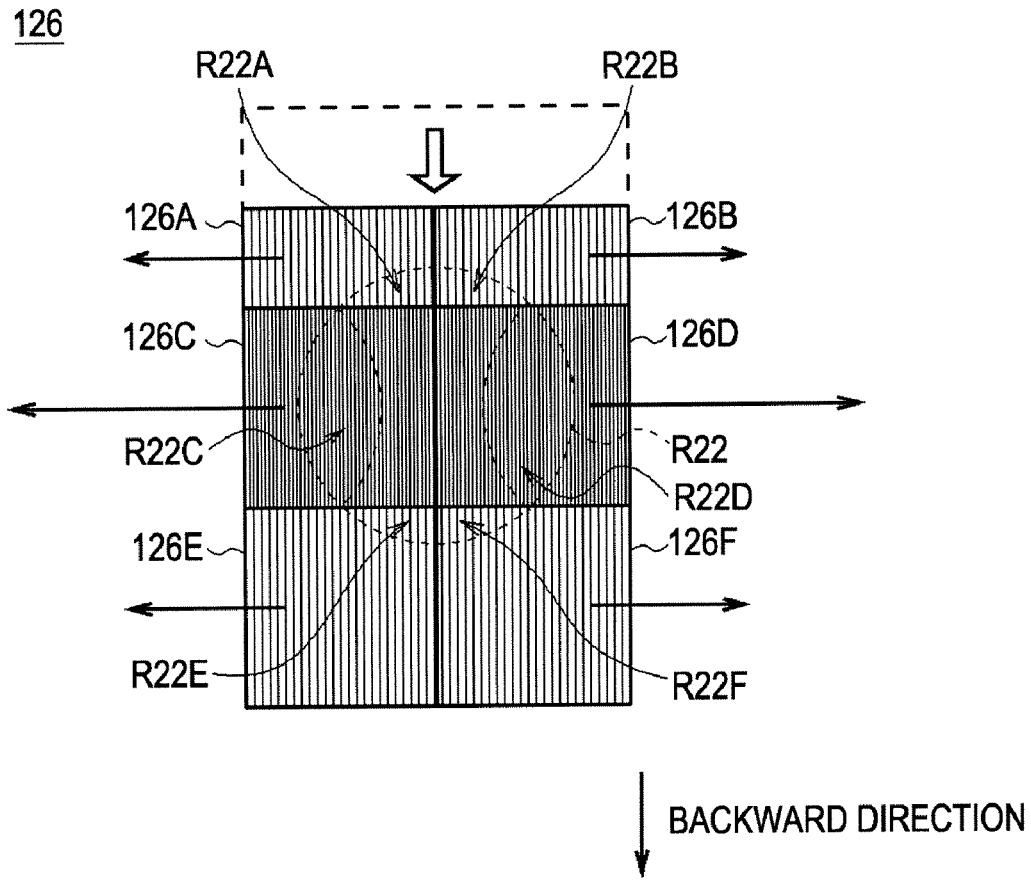
FIGS. 27A and 27B are schematic illustrations of a structure of a beam splitting light guide and beam spots formed by the beam splitting light guide according to the second embodiment.

In contrast, when the optical disc 100 is a BD-RE, the optical pickup 120 (see FIG. 23) moves the slide plate 125 in the backward direction using the beam splitting light guide pattern switcher 124 (see FIG. 24) so that, as shown in FIG. 27A, the center of a cross section R22 formed when the reflected light beam L13 passes through the beam splitting light guide 126 is made coincident with substantially the center of the border line between the light guide segments 126C and 126D.

Thus, the six light guide segments 126A to 126F of the beam splitting light guide 126 separates the reflected light beam L12 into six light beams having cross sections R22A to R22F, respectively, which are then input to the photodetector 52 (see FIG. 23).

Figure 27B:
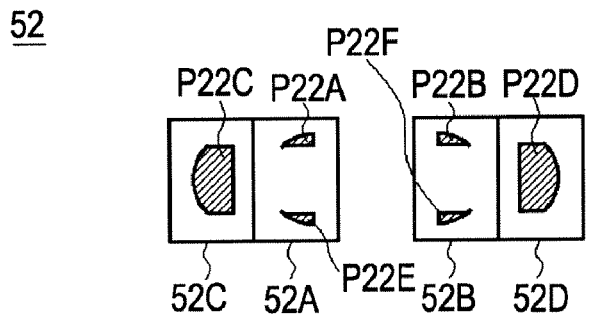

As a result, as shown in FIG. 27B, like the detection sub-areas 52A to 52D shown in FIG. 16B, beam spots P22A to P22F having the shapes substantially similar to the cross sections R22A to R22F are formed in the detection sub-areas 52A to 52D of the photodetector 52. Subsequently, the photodetector 52 generates four detection signals S22A, S22B, S22C, and S22D in accordance with the intensities of the beam spots (P22A+P22E), (P22B+P22F), P22C, and P22D.

Subsequently, the optical disc apparatus 120 (see FIG. 23) generates a tracking error signal STE22 from the detection signals S22A to S22D using the following equation (9) which corresponds to equation (5):

$$STE22=(S22D-S22C)-K(S22B-S22A) \qquad (9)$$

Thus, the optical disc apparatus 120 performs tracking control by the one-beam PP method corresponding to the BD-RE optical disc 100 (see FIG. 8).

In addition, like the first embodiment, the optical disc apparatus 120 generates the focus error signal SFE and the reproduction RF signal SRF.

As noted above, by moving the slide plate 125 in the forward or the backward direction using the beam splitting light guide pattern switcher 124, the optical pickup 120 can change the irradiation point of the reflected light beam L13 on the beam splitting light guide 126 so as to switch the separation patterns of the reflected light beam L13 according to the determined irradiation point.

3-3. Operation and Advantages

In the above-described structure according to the second embodiment, the optical pickup 120 moves the slide plate 125 of the beam splitting light guide pattern switcher 124 (see FIG. 24) according to whether the optical disc 100 is a BD-ROM or a BD-RE under the control of the system controller 31 so as to change the irradiation point of the reflected light beam L13 on the beam splitting light guide 126. Thus, the reflected light beam L13 is separated into four or six separate beams. The separate light beams of the reflected light beam L13 are made incident on the photodetector 52.

When the beam splitting light guide pattern switcher 124 moves the slide plate 125 in the forward direction (see FIG. 26A), the beam spots P21A to P21D (see FIG. 26B) are formed in the detection sub-areas 52A to 52D of the photodetector 52, respectively. In contrast, when the beam splitting light guide pattern switcher 124 moves the slide plate 125 in the backward direction, the beam spots P22A and P22E, the beam spots P22B and P22F, the beam spot P22C, and the beam spot P22D are formed in the detection sub-areas 52A, 52B, 52C, and 52D of the photodetector 52, respectively.

Accordingly, like the optical pickup 36 of the first embodiment, by switching between the separation pattern that separates the reflected light beam L13 into four separate beams and the separation pattern that separates the reflected light beam L13 into six separate beams, the optical pickup 120 can directly generate the detection signals S21A to S21D in the detection sub-areas 52A to 52D of the photodetector 52 so as to generate the tracking error signal STE21 for the DPD method. Alternatively, the optical pickup 120 can directly generate the detection signals S22A to S22D in the detection sub-areas 52A to 52D of the photodetector 52 so as to generate the tracking error signal STE22 for the one-beam PP method.

Consequently, the photodetector 52 can support both the tracking error signals STE21 and STE22 using four detection sub-areas such as the detection sub-areas 52A to 52D. In addition, only four amplifiers are required for amplifying the signals. Accordingly, the number of amplifiers can be reduced compared with a known photodetector having eight detection sub-areas (see FIG. 41C). Thus, deterioration of the RF signal due to amplifier noise can be decreased. In addition, the surface-mounted area of components of the amplifier in the photodetector 52 can be reduced, thereby reducing the size of the photodetector 52.

Furthermore, the beam splitting light guide pattern switcher 124 can switch the separation patterns of the reflected light beam L13 simply by slightly moving the slide plate 125. Accordingly, the number of components can be reduced compared with the beam splitting light guide pattern switcher 24 that completely switches between the beam splitting light guides 20 and 21, as shown in FIG. 1. Thus, a space required for moving the slide plate 125 can be minimized, and therefore, the size and the weight of the optical pickup 120 can be reduced. In addition, a time required for switching the separation patterns can be reduced.

In the above-described structure according to the second embodiment, the optical pickup 120 moves the slide plate 125 of the beam splitting light guide pattern switcher 124 according to the type of the optical disc 100 so as to change the irradiation point of the reflected light beam L13 on the beam splitting light guide 126. Accordingly, like the optical pickup 36 of the first embodiment, by switching between the separation patterns, the optical pickup 120 can directly generate the detection signals S21A to S21D in the detection sub-areas 52A to 52D of the photodetector 52 so as to generate the tracking error signal STE21 for the DPD method. Alternatively, the optical pickup 120 can directly generate the detection signals S22A to S22D in the detection sub-areas 52A to 52D of the photodetector 52 so as to generate the tracking error signal STE22 for the one-beam PP method.

4. Third Embodiment 4-1. Structure of Optical Pickup

According to a third embodiment, a beam splitting light guide pattern switcher 131 of an optical pickup 130 (see FIG.

23) is different from the beam splitting light guide pattern switcher 124 of the second embodiment. The other components are configured as in the optical pickup 120 of the second embodiment.

4-2. Structure of Beam Splitting Light Guide Pattern Switcher

Figure 28:
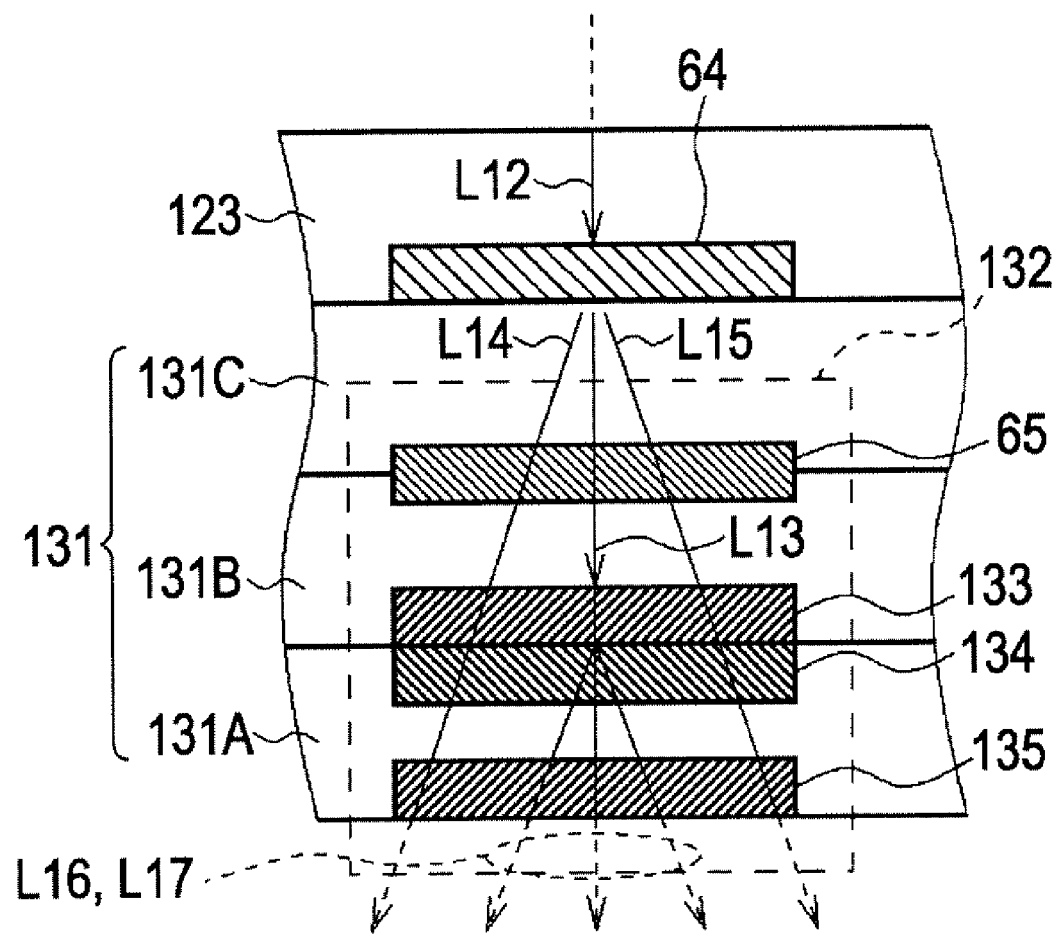
FIG. 28 is a schematic illustration of an exemplary structure of a beam splitting light guide pattern switcher according to a third embodiment.

Like the beam splitting light guide pattern switcher 61 of the first embodiment, the beam splitting light guide pattern switcher 131 switches the separation patterns of the reflected light beam L13 according to the polarization direction of the reflected light beam L13. As shown in FIG. 28, the beam splitting light guide pattern switcher 131 has a structure similar to part of the polarization filter 54 (see FIG. 10B) of the first embodiment. In the beam splitting light guide pattern switcher 131, three plate members 131A to 131C having a thin-plate shape are stacked.

Like the first embodiment, the active wavelength plate 65 is disposed between the plate members 131C and 131B. The focus servo hologram 64 formed on the focus servo hologram plate 123 separates the reflected light beam into a zeroth-order reflected light beam L13, a plus-first-order reflected light beam L14, and a minus-first-order reflected light beam L15. When the reflected light beams L13 to L15 are made incident on the active wavelength plate 65, the active wavelength plate 65 rotates the planes of polarization of the reflected light beams L13 to L15 by predetermined angles and inputs the reflected light beams L13 to L15 to the plate member 131B.

Beam splitting light guides 133 and 134 corresponding to the beam splitting light guides 66 and 67 are disposed on the lower surface of the plate member 131B and the upper surface of the plate member 131A, respectively. In addition, a beam splitting light guide 135 is disposed on the lower surface of the plate member 131A.

4-3. Structure of Beam Splitting Light Guide 4-3-1. Structure of Beam Splitting Light Guide 133

Figure 29A:
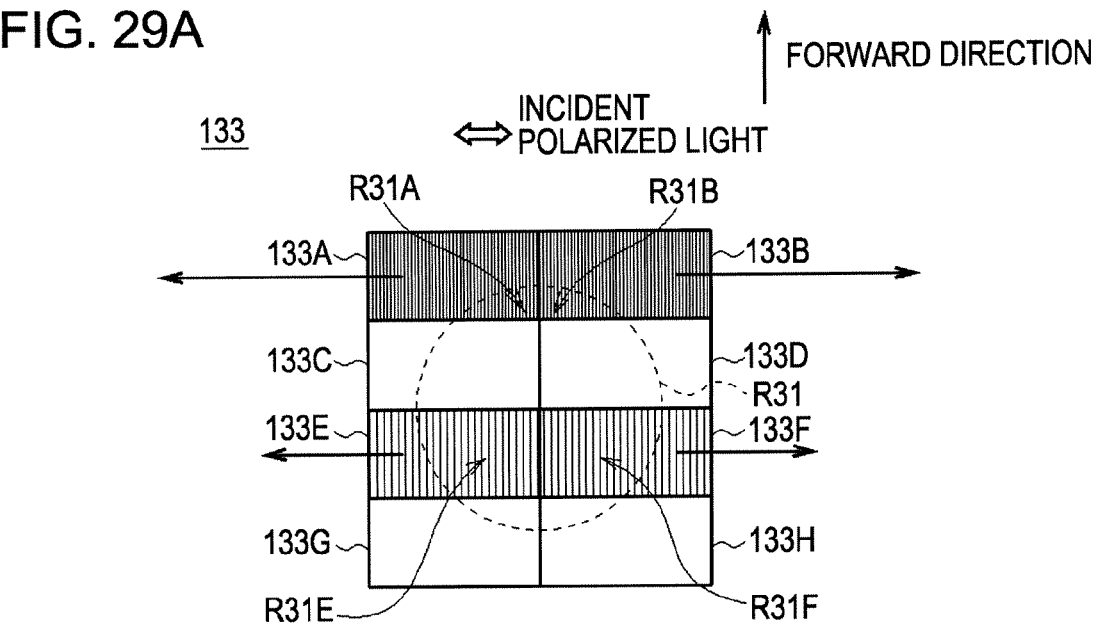
FIGS. 29A-29C are schematic illustrations of a structure of a beam splitting light guide and beam spots formed by the beam splitting light guide according to the third embodiment.

Like the beam splitting light guide 66 (see FIG. 12A), the beam splitting light guide 133 is formed of a birefringent material. However, as shown in FIG. 29A, the hologram pattern of the beam splitting light guide 133 is different from that of the beam splitting light guide 66. That is, in the beam splitting light guide 133, each of the light guide segments 66A to 66D is separated into two segments in the forward-backward direction. Thus, the beam splitting light guide 133 is separated into eight light guide segments 133A to 133H. A hologram composed of a blazed HOE is formed only in the light guide segments 133A, 133B, 133E, and 133F.

Like the light guide segments 66B and 66C (see FIG. 12A), the light guide segments 133A and 133B relatively strongly diffract partial reflected light beam L13 in the left direction or the right direction. In addition, like the light guide segments 66A and 66D (see FIG. 12A), the light guide segments 133E and 133F relatively weakly diffract partial reflected light beam L13 in the left direction or the right direction.

Accordingly, when, for example, the reflected light beam L13 is diffracted in the left-right directions in FIG. 29A and is made incident on the beam splitting light guide 133 while forming a cross section R31, the beam splitting light guide 133 separates the reflected light beam L13 into four separate light beams which pass through the light guide segments 133A, 133B, 133E, and 133F and which form cross sections R31A, R31B, R31E, and R31F, respectively. The four separate light beams are made incident on the photodetector 52 (see FIG. 23).

At that time, since a polarization hologram is not formed in the light guide segments 133C, 133D, 133G, and 133H, the light guide segments 133C, 133D, 133G, and 133H directly transmit the partial reflected light beam L13.

4-3-2. Structure of Beam Splitting Light Guide 134

Like the beam splitting light guide 133, the beam splitting light guide 134 is formed of a birefringent material. However, like the beam splitting light guide 67 for the beam splitting light guide 66, the beam splitting light guide 134 has an index of refraction different from that of the beam splitting light guide 133 in the polarization direction.

Figure 30A:
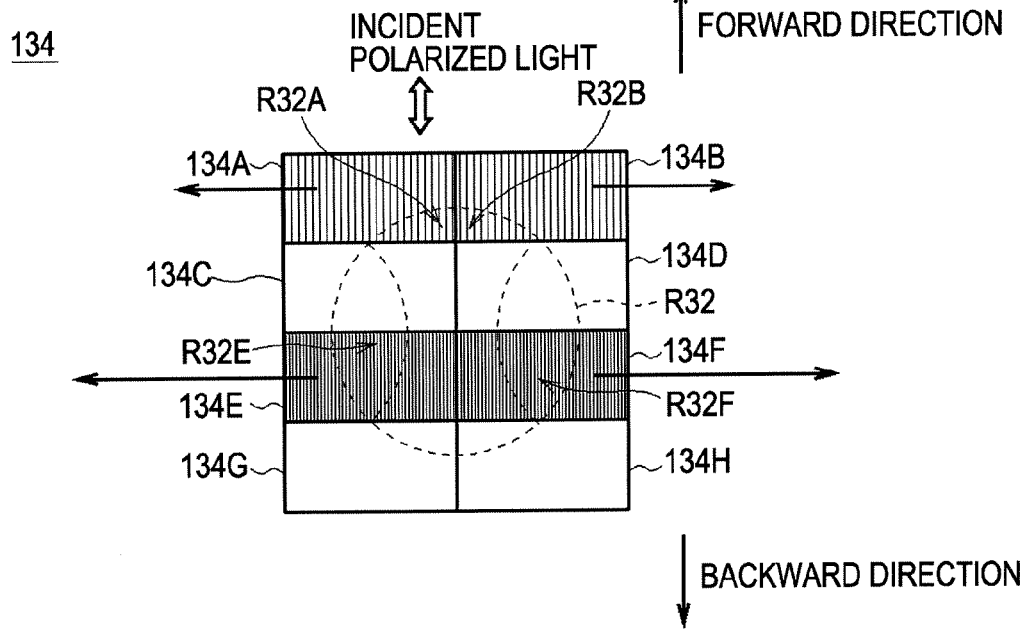
FIGS. 30A-30C are schematic illustrations of a structure of a beam splitting light guide and beam spots formed by the beam splitting light guide according to the third embodiment.
Figure 30B:
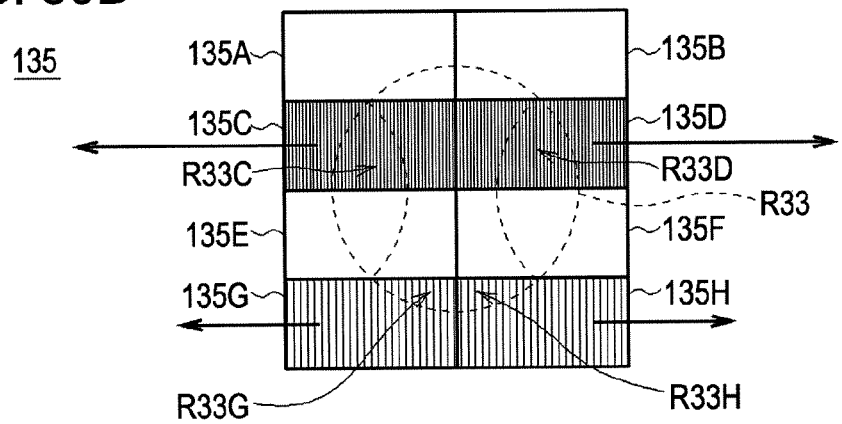

As shown in FIG. 30A, the beam splitting light guide 134 is partitioned into eight light guide segments 134A to 134H corresponding to the light guide segments 133A to 133H. However, the hologram pattern is different from that of the beam splitting light guide 133.

That is, the light guide segments 134A and 134B are formed from polarization holograms composed of the blazed HOE that are used for the light guide segments 133E and 133F (see FIG. 29A). The light guide segments 134A and 134B relatively strongly diffract partial reflected light beam L13 in the left direction or the right direction. In addition, the light guide segments 134E and 134F are formed from polarization holograms composed of the blazed HOE similar to that used for the light guide segments 133A and 133B (see FIG. 29A). The light guide segments 134E and 134F relatively weakly diffract partial reflected light beam L13 in the left direction or the right direction.

Accordingly, when, for example, the reflected light beam L13 is diffracted in the forward-backward direction in FIG. 30A and is made incident on the beam splitting light guide 134 while forming a cross section R32, the beam splitting light guide 134 separates the reflected light beam L13 into four light beams which pass through the light guide segments 134A, 134B, 134E, and 134F and which form cross sections R32A, R32B, R32E, and R32F, respectively. The four separate light beams are made incident on the photodetector 52 (see FIG. 23) in irradiation patterns different from those of the beam splitting light guide 133.

At that time, since a polarization hologram is not formed in the light guide segments 134C, 134D, 134G, and 134H, the light guide segments 134C, 134D, 134G, and 134H directly transmit the partial reflected light beam L13.

4-3-3. Structure of Beam Splitting Light Guide 135

Figure 29B:
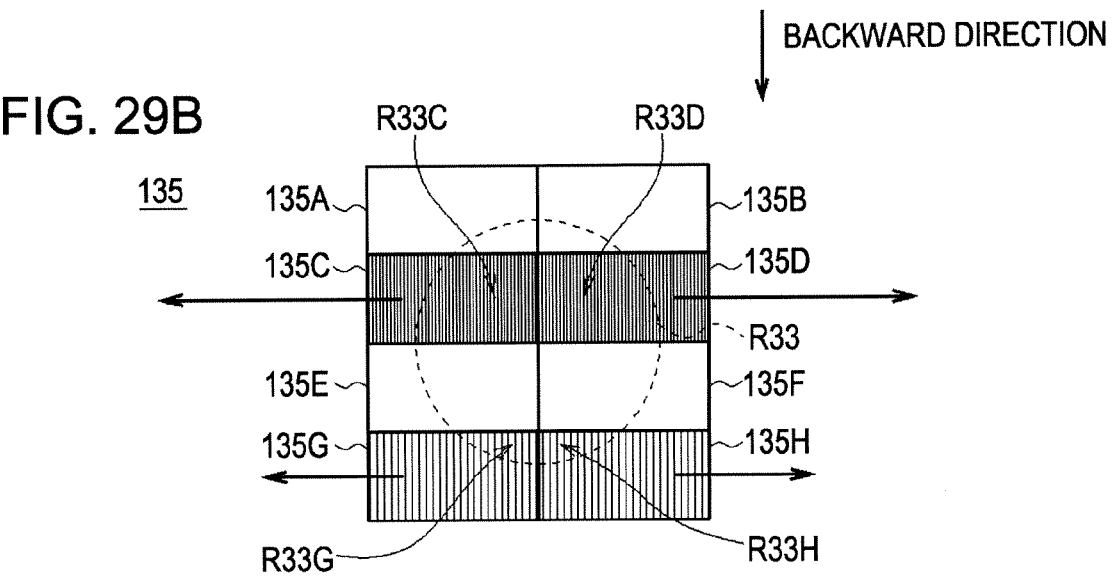

In contrast, like the beam splitting light guide 133, as shown in FIG. 29B, the beam splitting light guide 135 is partitioned into eight light guide segments 135A to 135H. In the beam splitting light guide 135, a non-polarization hologram is formed in the light guide segments 135C, 135D, 135G, and 135H which are located at complementary positions of the light guide segments having a hologram formed therein in the beam splitting light guides 133 and 134. No holograms are formed in the other light guide segments 135A, 135B, 135E, and 135F. In addition, the beam splitting light guide 135 is formed of a non-birefringent material.

Here, in the beam splitting light guide 135, the light guide segments 135C, 135D, 135G, and 135H having a hologram formed therein correspond to segments of the photodetector 52 which are irradiated with the partial diffracted reflected light beam L13 when a tracking error signal STE31 for the DPD method is generated and when a tracking error signal STE32 for the one-beam PP method is generated. Hereinafter, these segments 135C, 135D, 135G, and 135H are referred to as "common irradiation segments".

Like the light guide segments 133A and 133B, the light guide segments 135C and 135D relatively strongly diffract the partial reflected light beam L13 in the left or right direction regardless of the polarization direction of the reflected light beam L13. Like the light guide segments 133E and 133F, the light guide segments 135G and 135H relatively weakly diffract the partial reflected light beam L13 in the left or right direction regardless of the polarization direction of the reflected light beam L13.

In practical applications, when the optical disc 100 is a BD-ROM, the optical pickup 130 (see FIG. 23) changes a voltage applied to a liquid crystal cell of the active wavelength plate 65 so that the active wavelength plate 65 transmits the reflected light beams L13 to L15 having a left-right polarization direction.

In this way, when the reflected light beam L13 having a cross section R33 is input to the beam splitting light guide 135, the four light guide segments 135C, 135D, 135G, and 135H of the beam splitting light guide 135 form four light beams having cross sections R33C, R33D, R33G, and R33H. These four light beams are then made incident on the photodetector 52 (see FIG. 23).

At that time, since a polarization hologram is not formed in the light guide segments 135A, 135B, 135E, and 135F, the light guide segments 135A, 135B, 135E, and 135F directly transmit the partial reflected light beam L13.

As described above, the beam splitting light guide pattern switcher 131 includes the beam splitting light guides 133, 134, and 135. The beam splitting light guides 133 and 134 diffract a light beam according to the polarization direction of the light beam and have different indices of refraction with respect to the polarization direction. The beam splitting light guide 135 diffracts a light beam regardless of the polarization direction of the light beam.

4-4. Generation of Tracking Error Signal 4-4-1. Generation of Tracking Error Signal by DPD Method In practical applications, when the optical disc 100 is a BD-ROM, the optical pickup 130 changes a voltage applied to a liquid crystal cell of the active wavelength plate 65 so that the active wavelength plate 65 transmits the reflected light beams L13 to L15 having the left-right polarization directions in FIG. 29A.

In response to this operation, the beam splitting light guide pattern switcher 131 activates the beam splitting light guides 133 and 135 for the reflected light beam L13 so that the beam splitting light guides 133 and 135 separate the reflected light beam L13. The separate reflected light beams L13 are input to the photodetector 52.

Figure 29C:
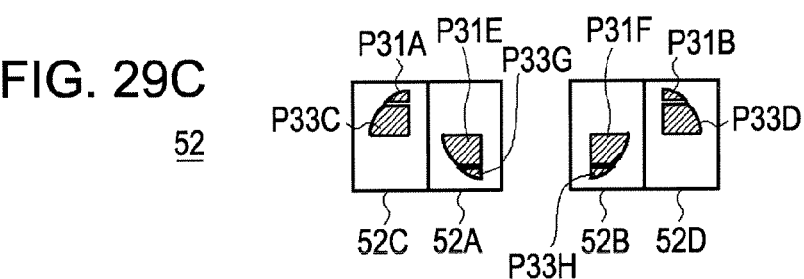

As a result, as shown in FIG. 29C, in the photodetector 52, beam spots P31E and P33G having the shapes substantially similar to the cross sections R31E and R33G are formed in the detection sub-area 52A whereas beam spots P31F and P33H having the shapes substantially similar to the cross sections R31F and R33H are formed in the detection sub-area 52B.

Similarly, in the photodetector 52, beam spots P31A and P33C having the shapes substantially similar to the cross sections R31A and R33C are formed in the detection sub-area 52C whereas beam spots P31B and P33D having the shapes substantially similar to the cross sections R31B and R33D are formed in the detection sub-area 52D.

Here, the beam spots P31E and P33G formed in the detection sub-area 52A have substantially the same shape as that of the beam spot P21A according to the second embodiment. Therefore, the detection sub-area 52A generates a detection signal S31A that is equivalent to the detection signal S21A according to the second embodiment.

In addition, in the other detection sub-areas 52B to 52D, the shape of the beam spots are substantially the same as the shapes of the beam spots P21B to P21D according to the second embodiment. Therefore, the detection sub-area 52B to 52D generate detection signals S31B to S31D that are the same as the detection signals S21B to S21D according to the second embodiment, respectively.

As a result, like the second embodiment, the optical disc apparatus 30 (see FIG. 8) can compute the tracking error signal STE31 using phase differences among the detection signals S31A to S31D, and therefore, the optical disc apparatus 30 can perform tracking control by the DPD method suitable for the BD-ROM optical disc 100 on the basis of the tracking error signal STE31.

4-4-2. Generation of Tracking Error Signal by One-Beam PP Method

In contrast, when the optical disc 100 represents a BD-RE disc, the optical pickup 130 changes a voltage applied to a liquid crystal cell of the active wavelength plate 65 so that the active wavelength plate 65 transmits the reflected light beams L13 to L15 having the forward-backward polarization direction in FIG. 30A.

In response to this operation, the beam splitting light guide pattern switcher 131 activates the beam splitting light guides 133 and 135 for the reflected light beam L13 so that the reflected light beam L13 is separated. The separate light beams are input to the photodetector 52.

Figure 30C:
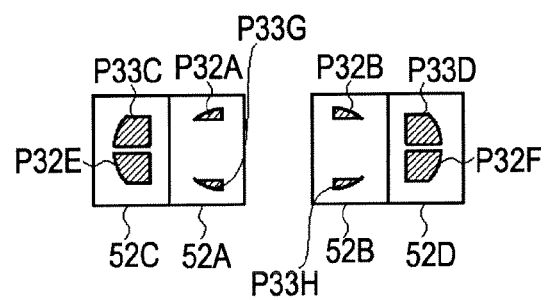

As a result, as shown in FIG. 30C, in the photodetector 52, beam spots P32A and P33G having the shapes substantially similar to the cross sections R32A and R33G are formed in the detection sub-area 52A whereas beam spots P32B and P33H having the shapes substantially similar to the cross sections R32B and R33H are formed in the detection sub-area 52B.

Similarly, in the photodetector 52, beam spots P33C and P32E having the shapes substantially similar to the cross sections R33C and R32E are formed in the detection sub-area 52C whereas beam spots P33D and P32F having the shapes substantially similar to the cross sections R33D and R32F are formed in the detection sub-area 52D.

Here, the beam spots P32A and P33G formed in the detection sub-area 52A have substantially the same shape as those of the beam spots P22A and P22E according to the second embodiment. Therefore, the detection sub-area 52A can generate a detection signal S32A that is equivalent to the detection signal S22A according to the second embodiment.

In addition, the shapes of the beam spots P33C and P32E formed in the detection sub-areas 52C are substantially the same as the shape of the beam spot P22C according to the second embodiment. Therefore, the detection sub-area 52A can generate detection signal S32C that is equivalent to the detection signals S22C according to the second embodiment.

In addition, like the detection sub-areas 52A and 52D, the other detection sub-areas 52B and 52D generate detection signals S32B and S32D that are equivalent to the detection signals S22B to S22D according to the second embodiment, respectively.

As a result, the optical disc apparatus 30 (see FIG. 8) can compute the tracking error signal STE32 from the detection signals S32A to S32D using the following equation (10), which corresponds to equation (5):

$$STE32 = (S32D - S32C) - K(S32B - S32A) \qquad (10)$$

Therefore, the optical disc apparatus 30 can perform tracking control by the one-beam PP method suitable for the BD-RE optical disc 100 on the basis of the tracking error signal STE32.

As noted above, the optical pickup 130 according to the third embodiment includes the beam splitting light guide 133 or 134 on which a polarization hologram is formed and the beam splitting light guide 135 on which a normal hologram is formed. Accordingly, like the beam splitting light guide 66 or 67 according to the first embodiment, the optical pickup 130 can separate the reflected light beam L13. The four separate light beams are input to the detection sub-areas 52A to 52D, respectively.

4-5. Operations and Advantages

In the above-described structure according to the third embodiment, like the optical pickup 36 according to the first embodiment, the optical pickup 130 changes a voltage applied to the liquid crystal cell of the active wavelength plate 65 of the beam splitting light guide pattern switcher 131 (see FIG. 28) according to whether the type of the optical disc 100 is a BD-ROM or a BD-RE. In this way, the optical pickup 130 changes the polarization direction of the reflected light beam L13.

In addition, the optical pickup 130 switches between the combination of the beam splitting light guides 133 and 135 and the combination of the beam splitting light guides 134 and 135 according to the polarization direction of the reflected light beam L13. Thereafter, the optical pickup 130 diffracts the reflected light beam L13 part by part so as to separate the reflected light beam L13 into four light beams and input the four light beams to the detection sub-areas 52A to 52D.

As shown in FIG. 29C, when the beam splitting light guides 133 and 135 are activated, the beam spots P31E and P33G, the beam spots P31F and P33H, the beam spots P31A and P33C, and beam spots P31B and P33D are formed in the detection sub-areas 52A to 52D of the photodetector 52, respectively. The shapes of the beam spots P31E and P33G, the beam spots P31F and P33H, the beam spots P31A and P33C, and beam spots P31B and P33D are substantially the same as the shapes of the beam spots P21A, P21B, P21C, and P21D (see FIG. 26B), respectively.

In contrast, as shown in FIG. 30C, when the beam splitting light guides 134 and 135 are activated, the beam spots P32A and P33G, the beam spots P32B and P33H, the beam spots P33C and P32E, and the beam spots P33D and P32F are formed in the detection sub-areas 52A to 52D of the photodetector 52, respectively. The shapes of the beam spots P32A and P33G, the beam spots P32B and P33H, the beam spots P33C and P32E, and the beam spots P33D and P32F are substantially the same as the shapes of the beam spots P22A and P22E, the beam spots P22B and P22F, the beam spot P22C, and the beam spot P22D (see FIG. 27B), respectively.

Accordingly, like the optical pickup 36 according to the first embodiment, by switching the separation patterns of the reflected light beam L13, the detection sub-areas 52A to 52D of the photodetector 52 of the optical pickup 130 can directly generate the detection signals S31A to S31D for generating the tracking error signal STE31 used for the DPD method or the detection signals S32A to S32D for generating the tracking error signal STE32 used for the one-beam PP method.

Consequently, the optical pickup 130 can provide the same advantages as the optical pickup 36 according to the first embodiment.

In this case, in the optical pickup 130, the segments of the beam splitting light guides 66 and 67 in which a hologram is not formed and, therefore, whose light transmission are high (i.e., the light guide segments 133C, 133D, 133G, 133H, 134C, 134D, 134G, and 134H) transmit light beams of the reflected light beam L13 corresponding to the common irradiation segments. Thus, the light beam passes through the hologram formed in the light guide segment 135C, 135D, 135G, or 135H of the beam splitting light guide 135 only once.

Therefore, the optical pickup 130 can increase the transmission efficiency of the light beam compared with the optical pickup 36 of the first embodiment in which a light beam passes through the two holograms of the beam splitting light guides 66 and 67.

In the above-described structure according to the third embodiment, the optical pickup 130 changes the polarization direction of the reflected light beam L13 using the active wavelength plate 65 of the beam splitting light guide pattern switcher 131 according to the type of the optical disc 100. Thereafter, the optical pickup 130 selects the combination of the beam splitting light guides 133 and 135 or the combination of the beam splitting light guides 134 and 135 according to the polarization direction of the reflected light beam L13 so as to diffract the reflected light beam L13 part by part. Thus, like the optical pickup 36 of the first embodiment, the optical pickup 130 can separate the reflected light beam L13 into four light beams and input the four light beams to the detection sub-areas 52A to 52D. Accordingly, the detection sub-areas 52A to 52D of the photodetector 52 of the optical pickup 130 can directly generate the detection signals S31A to S31D for generating the tracking error signal STE31 used for the DPD method or the detection signals S32A to S32D for generating the tracking error signal STE32 used for the one-beam PP method.

5. Fourth Embodiment 5-1. Structure of Optical Pickup

According to a fourth embodiment, an optical integrated element 141 of an optical pickup 140 (see FIG. 9) is different from the optical integrated element 40 of the first embodiment. The other components are configured as in the optical pickup 36 of the first embodiment.

As shown in FIG. 10A, the structure of a polarization filter 142 of the optical integrated element 141 is partly different from that of the polarization filter 54 of the first embodiment. The other elements are similar to those of the polarization filter 54.

5-2. Structure of Polarization Filter

Figure 31:
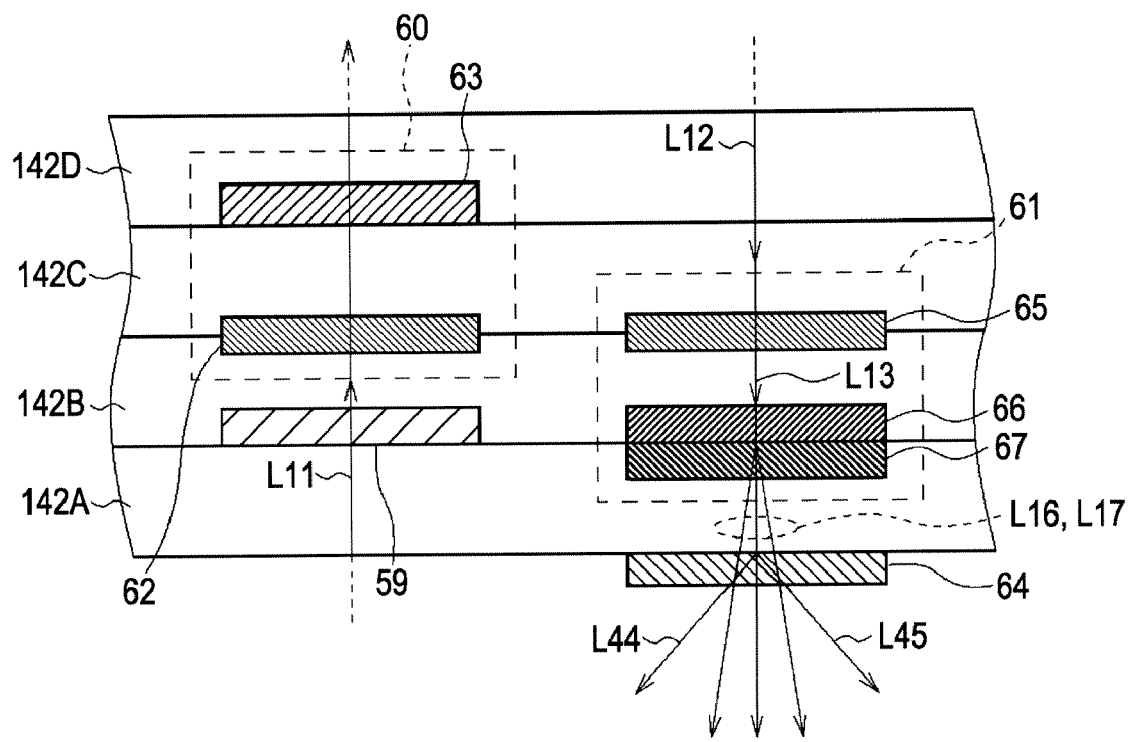
FIG. 31 is a schematic illustration of an exemplary structure of a polarization filter according to a fourth embodiment.

As shown in FIG. 31, in which the same elements as those illustrated and described in relation to FIG. 10B are designated by the same reference numerals, the polarization filter 142 includes stacked plate members 142A to 142D, each having a thin-plate shape, like the plate member 54A to 54D (see FIG. 10B). The polarization filter 142 is formed on the lower surface of the plate member 142A, not on the lower surface of the plate member 142D. This is the only difference from the polarization filter 54 (see FIG. 10B). The other structures are the same as those of the polarization filter 54.

Figure 32:
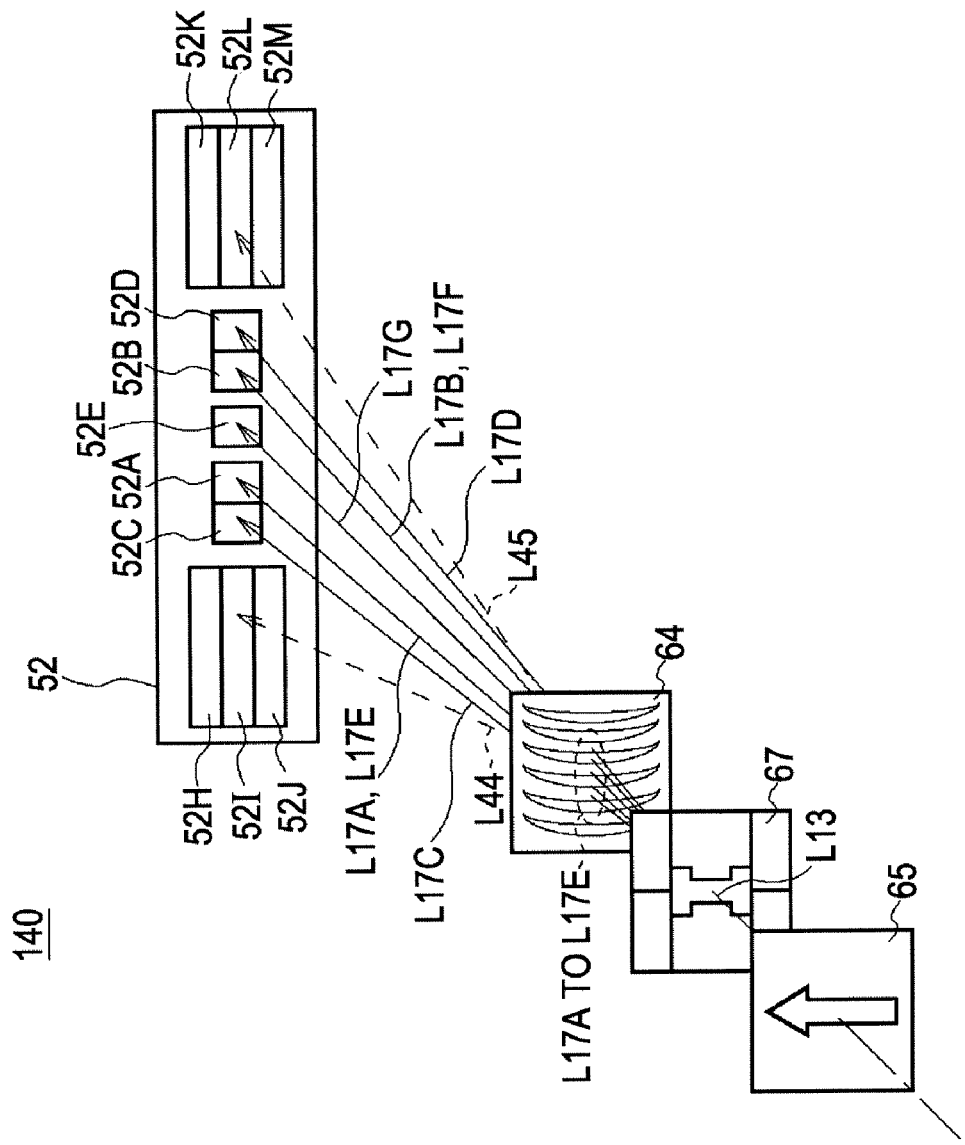
FIG. 32 is a schematic illustration of the separation and light guiding of a reflected light beam according to the fourth embodiment.

Accordingly, when, for example, the optical disc 100 (see FIG. 8) is a BD-RE, as shown in FIG. 32 which corresponds to FIG. 15B, the optical pickup 140 separates the reflected light beam L13 into the separate light beams L16A to L16D or the separate light beams L17A to L17G using the active wavelength plate 65 or the beam splitting light guide 67 of the polarization filter 142. Thereafter, the focus servo hologram 64 separates the light beams L17A to L17G to obtain reflected light beams L44 and L45 for focus servo. In practice, each of the reflected light beams L44 and L45 contains seven light beams.

Note that, even when the optical disc 100 (see FIG. 8) is a BD-ROM, the optical pickup 140 can prevent the accuracy of the focus error signal SFE from decreasing, as for the BD-RE discs.

5-3. Operations and Advantages

In the above-described structure according to the fourth embodiment, like the optical pickup 36 of the first embodiment, the optical pickup 140 changes the polarization direction of the reflected light beam L13 according to whether the type of the optical disc 100 is a BD-ROM or a BD-RE using the active wavelength plate 65. In this way, the optical pickup 140 activates the beam splitting light guide 66 or the beam splitting light guide 67 according to the polarization direction of the reflected light beam L13. Thus, the reflected light beam L13 is separated into the separate light beams L16A to L16D or the separate light beams L17A to L17G. Thereafter, the focus servo hologram 64 separates these separate light beams to obtain the reflected light beams L44 and L45, which are then input to the photodetector 52.

When the beam splitting light guide 66 is activated, the beam spots P11A to P11D (see FIG. 16A) are formed in the detection sub-areas 52A to 52D of the photodetector 52, respectively. In contrast, when the beam splitting light guide 67 is activated, beam spots P12A and R12E, beam spots P12B and R12F, a beam spot P12C, and a beam spot P12D are formed in the detection sub-areas 52A to 52D of the photodetector 52, respectively.

Accordingly, like the optical pickup 36 of the first embodiment, by switching between a separation pattern that separates the reflected light beam L13 into four separate beams and a separation pattern that separates the reflected light beam L13 into six separate beams, the detection sub-areas 52A to 52D of the photodetector 52 can directly generate the detection signals S21A to S21D for generating the tracking error signal STE21 used for the DPD method or the detection signals S22A to S22D for generating the tracking error signal STE22 used for the one-beam PP method.

As mentioned earlier, in the first embodiment, the reflected light beams L14 and L15 for focus servo are separated by the focus servo hologram 64. Thereafter, the reflected light beams L14 and L15 pass through the active wavelength plate 65 and the beam splitting light guides 66 and 67 so as to be separated into seven separate light beams, as shown by beam spots in FIG. 16B.

At that time, the transmission efficiencies of the reflected light beams L14 and L15 in the light guide segments of the beam splitting light guides 66 and 67 may be different due to some reason during fabrication. Accordingly, the final intensities of beam spots formed in the detection sub-areas 52H to 52J and 52K to 52M are not uniform, and therefore, the accuracy of the focus error signal SFE may be decreased in the optical pickup 36.

In contrast, according to the fourth embodiment, the reflected light beam L13 is separated into seven light beams by the active wavelength plate 65 and the beam splitting light guides 66 and 67. Thereafter, the focus servo hologram 64 having a substantially uniform pattern formed thereon generates the reflected light beams L44 and L45 for focus servo (in practice, each contains seven light beams).

Thus, the optical pickup 140 can reduce the possibility of non-uniform intensities of the beam spots formed in the detection sub-areas 52H to 52J and 52K to 52M, and therefore, the optical pickup 140 can reduce the decrease in the accuracy of the focus error signal SFE.

In the above-described structure according to the fourth embodiment, the optical pickup 140 changes the polarization direction of the reflected light beam L13 using the active wavelength plate 65 of the beam splitting light guide pattern switcher 61 according to the type of the optical disc 100. Thereafter, the optical pickup 140 separates the reflected light beam L13 into four light beams or seven light beams according to the polarization direction of the reflected light beam L13 using the beam splitting light guide 66 or 67. Thereafter, the reflected light beams L44 and L45 for focus servo are generated. Thus, like the optical pickup 36 of the first embodiment, the optical pickup 140 can separate the reflected light beam L13 into four light beams and input the four light beams to the detection sub-areas 52A to 52D of the photodetector 52. Accordingly, the detection sub-areas 52A to 52D can directly generate the detection signals S31A to S31D for generating the tracking error signal STE31 used for the DPD method or the detection signals S32A to S32D for generating the tracking error signal STE32 used for the one-beam PP method.

6. Fifth Embodiment 6-1. Structure of Optical Pickup

Figure 33:
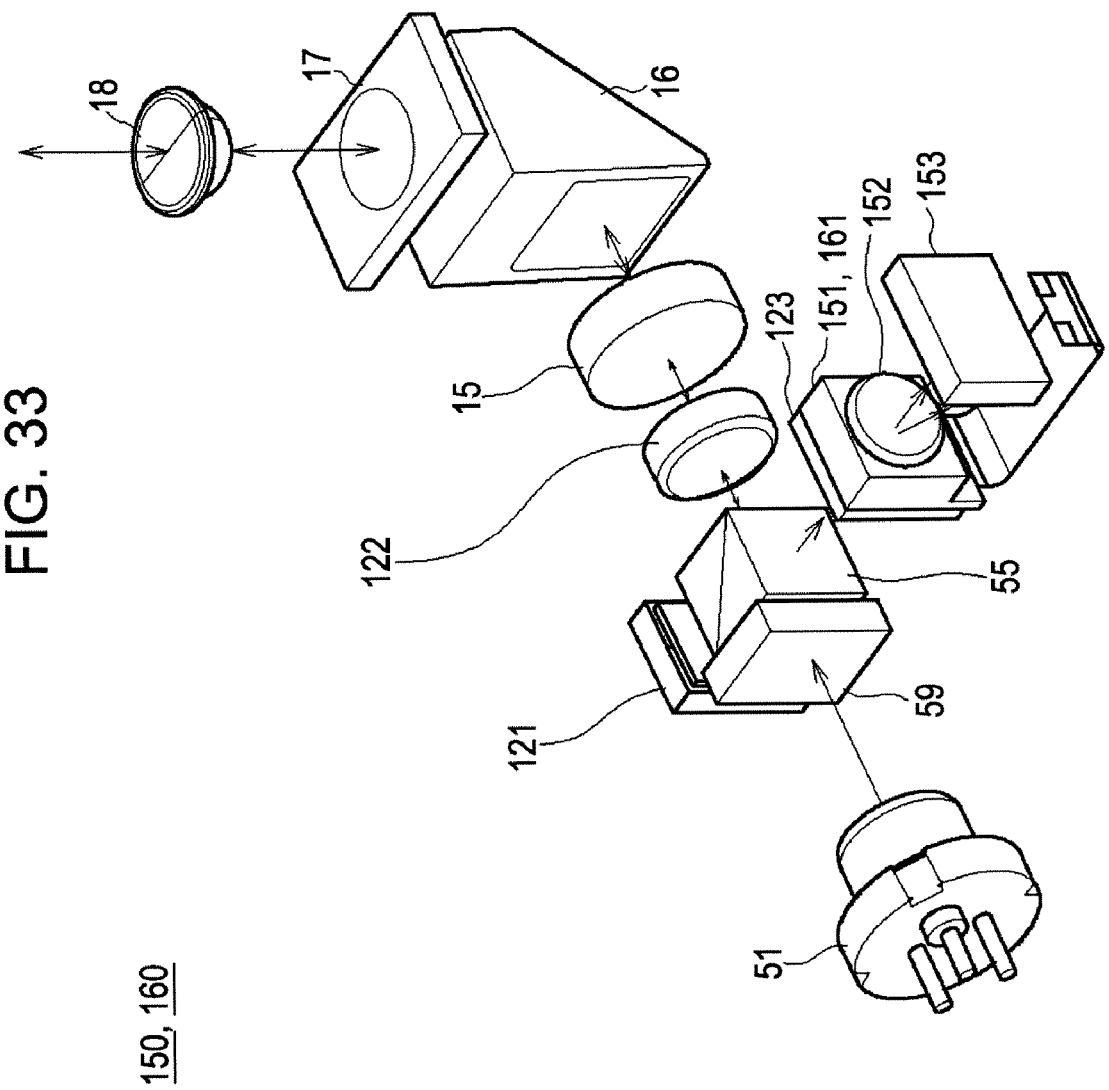
FIG. 33 is a schematic perspective view of an optical pickup.

According to a fifth embodiment, as shown in FIG. 33, in which the same elements as those illustrated and described in relation to FIG. 23 are designated by the same reference numerals, the structure of an optical pickup 150 is partly different from that of the optical pickup 120 of the second embodiment. The optical pickup 150 is different from the optical pickup 120 in that the optical pickup 150 includes a beam splitting light guide pattern switcher 151 and a photodetector 153 in place of the beam splitting light guide pattern switcher 124 and the photodetector 52. Furthermore, the optical pickup 150 includes a cylindrical lens 152. The other elements are similar to those of the optical pickup 120.

Figure 34:
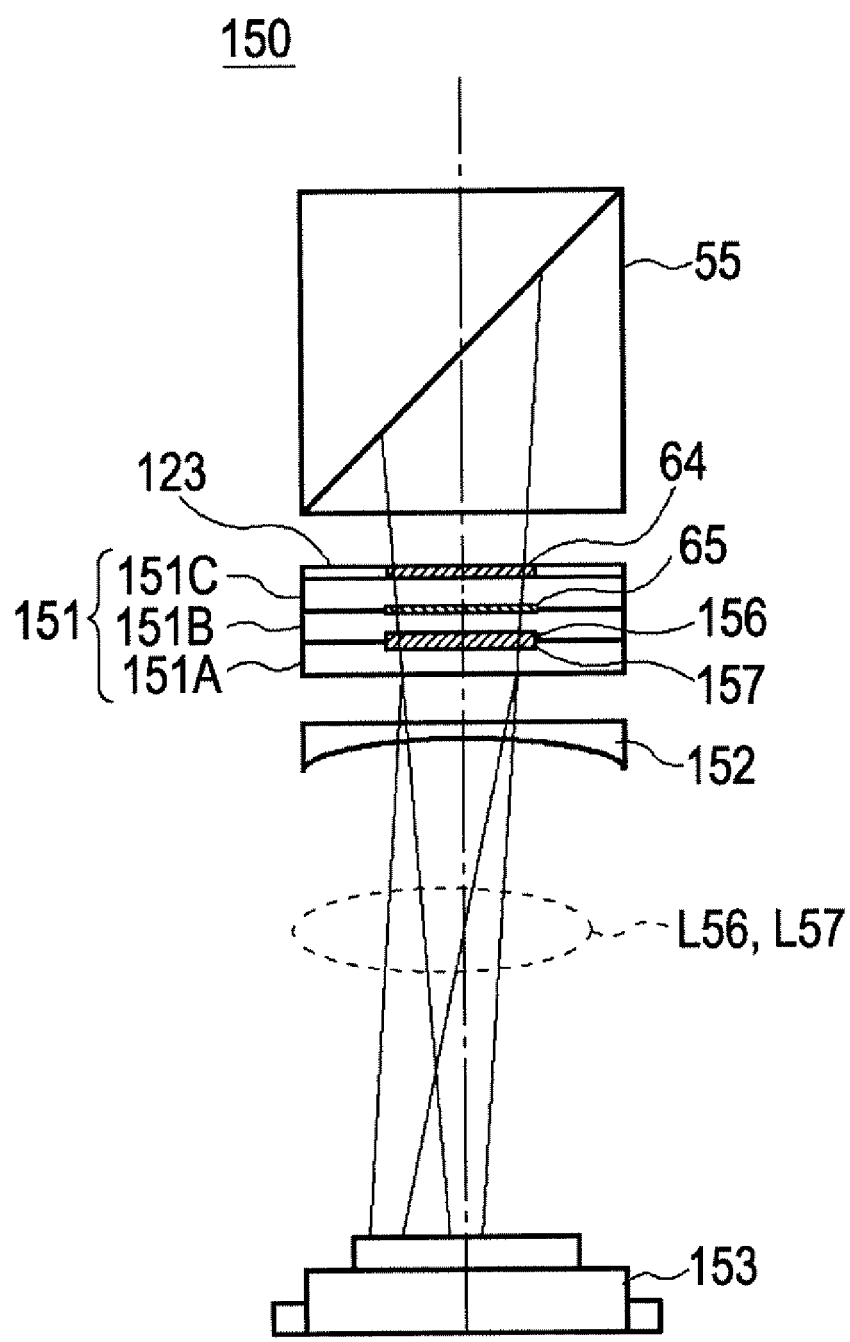
FIG. 34 is a schematic partial illustration of an optical pickup according to a fifth embodiment.

FIG. 34 is a partially enlarged view of the optical pickup 150. As shown in FIG. 34, in the optical pickup 150, the beam splitting light guide pattern switcher 151 has a structure similar to part of the polarization filter 54 of the first embodiment (see FIG. 10B). The optical pickup 150 includes three stacked plate members 151A to 151C, each having a thin-plate shape.

Like the first embodiment, the active wavelength plate 65 is disposed between the plate members 151C and 151B. The focus servo hologram 64 formed on the focus servo hologram plate 123 separates a light beam into a zeroth-order reflected light beam L13, a plus-first-order reflected light beam L14, and a minus-first-order reflected light beam L15. When the reflected light beams L13 to L15 are made incident on the active wavelength plate 65, the active wavelength plate 65 appropriately rotates the planes of polarization of the reflected light beams L13 to L15 and inputs the reflected light beams L13 to L15 to the plate member 151B.

A beam splitting light guide 156 which corresponds to the beam splitting light guide 66 is disposed on the lower surface of the plate member 151B whereas a beam splitting light guide 157 which corresponds to the beam splitting light guide 67 is disposed on the upper surface of the plate members 151A.

The cylindrical lens 152 expands a light beam input from the beam splitting light guide pattern switcher 151 in the left-right directions in FIG. 34. Thereafter, the expanded light beam is input to the photodetector 153.

6-2. Structure of Beam Splitting Light Guide 6-2-1. Structure of Beam Splitting Light Guide 156

Figure 35A:
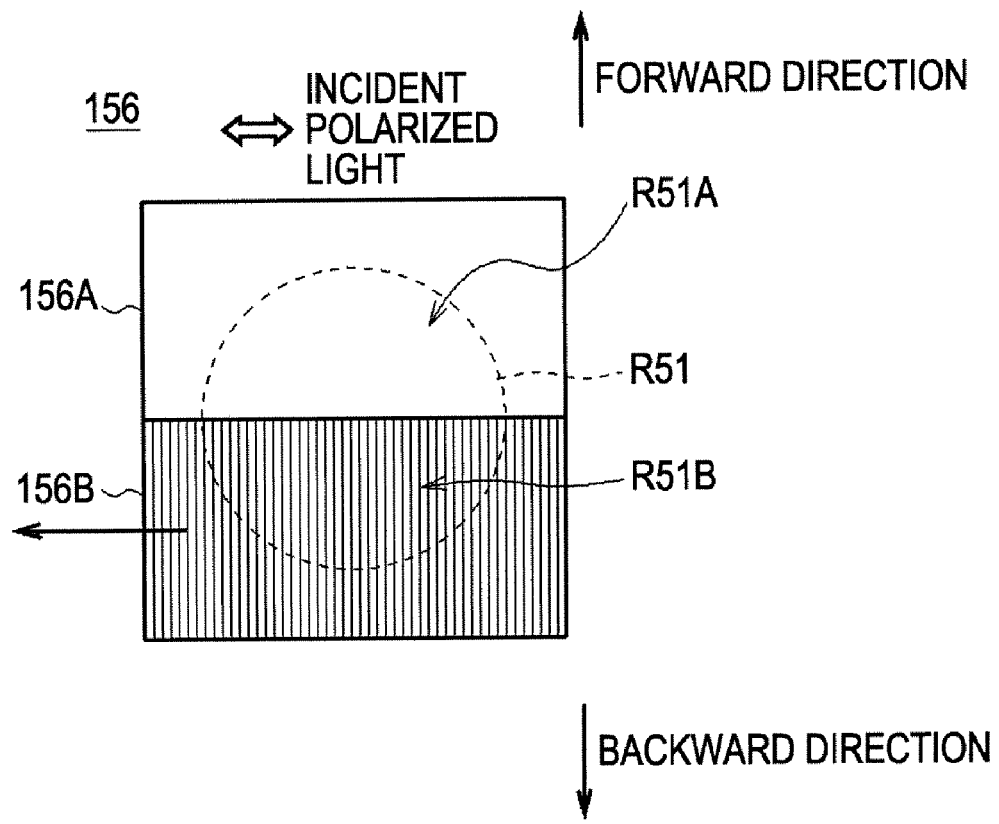
FIGS. 35A and 35B are schematic illustrations of a structure of a beam splitting light guide and beam spots formed by the beam splitting light guide according to the fifth embodiment.

Like the beam splitting light guide 66 (see FIG. 12A), the beam splitting light guide 156 is formed of a birefringent material. However, as shown in FIG. 35A, the hologram pattern is different from that of the beam splitting light guide 66. That is, the beam splitting light guide 156 include two light guide segments 156A and 156B. The light guide segment 156A corresponds to a combination of the light guide segments 66A and 66B of the beam splitting light guide 66 whereas the light guide segment 156B corresponds to a combination of the light guide segments 66C and 66D of the beam splitting light guide 66. A polarization hologram composed of a blazed HOE is formed only in the light guide segment 156B.

Like the light guide segment 66A (see FIG. 12A), the light guide segment 156B diffracts the partial reflected light beam L13 in the left direction. In contrast, since a polarization hologram is not formed in the light guide segment 156A, the light guide segment 156A transmits the partial reflected light beam L13.

In practical applications, when the optical disc 100 is a BD-ROM, the optical pickup 150 changes a voltage applied to a liquid crystal cell of the active wavelength plate 65 so that the active wavelength plate 65 transmits the reflected light beams L13 having the left-right polarization direction in FIG. 35A. The reflected light beam L13 that has passed through the active wavelength plate 65 is input to the beam splitting light guide 156.

The beam splitting light guide 156 (see FIG. 35A) diffracts the reflected light beam L13 having a cross section R51 according to the polarization direction of the reflected light beam L13. The beam splitting light guide 156 does not diffract a light beam having a cross section R51A (i.e., the beam splitting light guide 156 allows the light beam to propagate straight) and diffracts a light beam having a cross section R51B in the left direction of FIG. 35A. In addition, the cylindrical lens 152 expands each of the light beams that has passed through the beam splitting light guide 156 in the left-right directions of FIG. 35A and inputs the light beam to the photodetector 153.

Figure 35B:
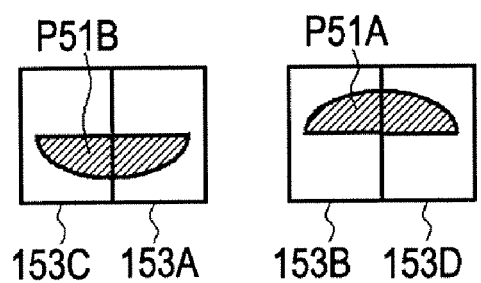

Subsequently, as shown in FIG. 35B, a semi-elliptical beam spot P51A, whose shape is generated by expanding the cross section R51A in the left-right directions, is formed so as to extend over detection sub-areas 153B and 153D of the photodetector 153. In addition, a semi-elliptical beam spot P51B, whose shape is generated by expanding the cross section R51B in the left-right directions, is formed so as to extend over detection sub-areas 153A and 153C of the photodetector 153.

Here, in the photodetector 153, the border line between the detection sub-areas 153B and 153D is substantially the center line of the beam spot P51A. In addition, the border line between the detection sub-areas 153A and 153C is substantially the center line of the beam spot P51B.

Thus, in the photodetector 153, beam spots having the left half of the cross section R51A, the right half of the cross section R51A, the left half of the cross section R51B, and the right half of the cross section R51B are formed in the detection sub-areas 153B, 153D, 153C, and 153A, respectively.

As a result, since the detection sub-area 153A detects the intensity of a light beam equivalent to the beam spot P21B (see FIG. 26B) according to the second embodiment, the photodetector 153 generates a detection signal S51A equivalent to the detection signal S21B.

Similarly, the other detection sub-areas 153B, 153C, and 153D generate detection signals S51B, S51C, and S51D equivalent to the detection signals S21C, S21A, and S21D according to the second embodiment, respectively.

Subsequently, the optical disc apparatus 30 (see FIG. 8) performs computation that is the same as the computation performed in the second embodiment. Thus, the optical disc apparatus 30 can compute a tracking error signal STE51 using phase differences among the detection signals S51A to S51D and can perform tracking control on the basis of the tracking error signal STE51 by the DPD method corresponding to the BD-ROM optical disc 100 (see FIG. 8).

6-2-2. Structure of Beam Splitting Light Guide 157

Figure 36A:
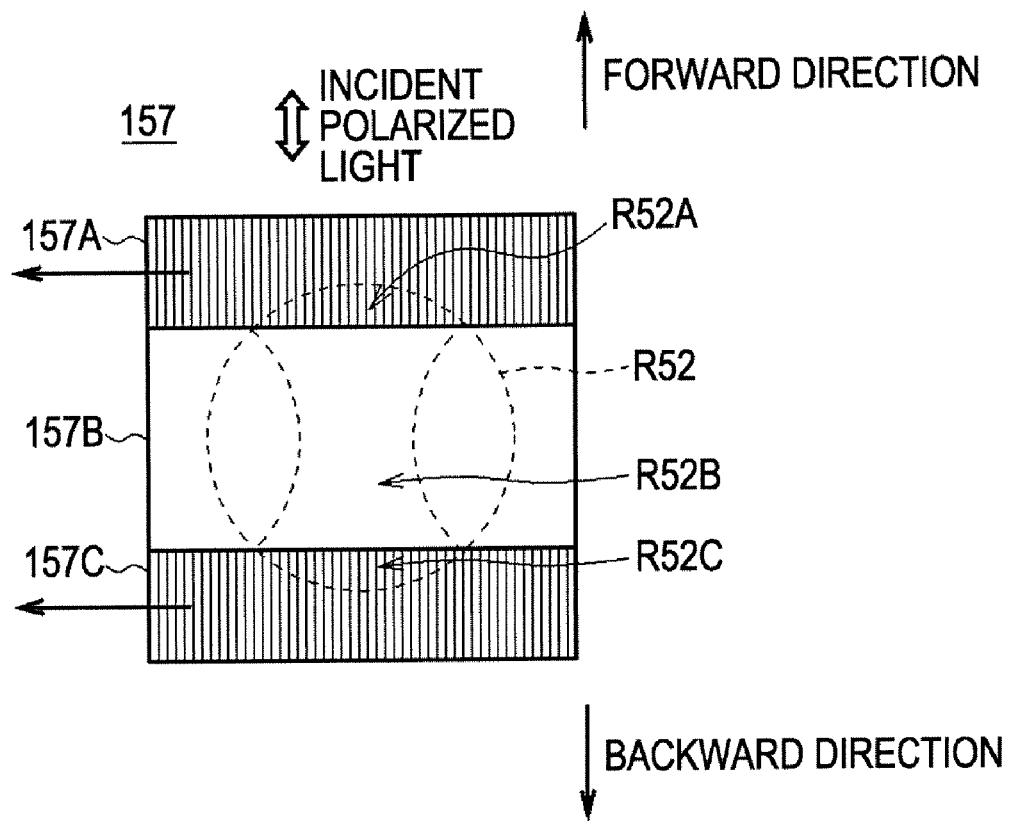
FIGS. 36A and 36B are schematic illustrations of a structure of a beam splitting light guide and beam spots formed by the beam splitting light guide according to the fifth embodiment.

Like the beam splitting light guide 67 (see FIG. 13A), the beam splitting light guide 157 is formed of a birefringent material. However, as shown in FIG. 36A, the pattern of the polarization hologram composed of a blazed HOE is different from that of the beam splitting light guide 67. That is, the beam splitting light guide 157 include three light guide segments 157A, 157B, and 157C. The light guide segment 157A corresponds to a combination of the light guide segments 67A and 67B of the beam splitting light guide 67. The light guide segment 157B corresponds to a combination of the light guide segments 67C, 67D and 67G of the beam splitting light guide 67. The light guide segment 157C corresponds to a combination of the light guide segments 67E and 67F of the beam splitting light guide 67. A polarization hologram composed of a blazed HOE is formed in the light guide segments 156A and 175C.

Like the light guide segment 156B (see FIG. 35A), the light guide segments 157A and 157C diffract the partial reflected light beam L13 in the left direction. In contrast, since a polarization hologram is not formed in the light guide segment 157B, the light guide segment 157B transmits the partial reflected light beam L13.

In practical applications, when the optical disc 100 is a BD-RE, the optical pickup 150 changes a voltage applied to a liquid crystal cell of the active wavelength plate 65 so that the active wavelength plate 65 transmits the reflected light beams L13 having the forward-backward polarization direction in FIG. 36A. The reflected light beam L13 that has passed through the active wavelength plate 65 is input to the beam splitting light guide 157.

The beam splitting light guide 157 (see FIG. 36A) diffracts the reflected light beam L13 having a circular cross section R52 according to the polarization direction of the reflected light beam L13. The beam splitting light guide 157 does not diffract a light beam having a cross section R52B (i.e., the beam splitting light guide 157 allows the light beam to propagate straight) and diffracts light beams having a cross section R52A and R52C in the left direction of FIG. 36A. In addition, the cylindrical lens 152 expands the light beam that has passed through the beam splitting light guide 157 in the left-right directions of FIG. 36A and inputs the light beam to the photodetector 153.

Figure 36B:
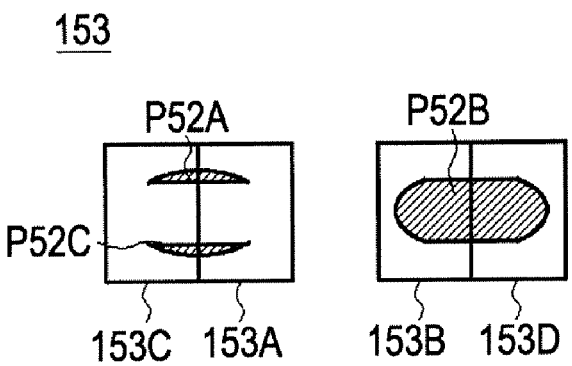

Subsequently, as shown in FIG. 36B, beam spots P52A and P52C, whose shapes are generated by expanding the cross sections R52A and R52C in the left-right directions, are formed so as to extend over detection sub-areas 153A and 153C of the photodetector 153. A beam spot P52B, whose shape is generated by expanding the cross section R52B in the left-right directions, is formed so as to extend over detection sub-areas 153B and 153D of the photodetector 153.

Here, in the photodetector 153, as in the case where the optical disc 100 is a BD-ROM, the border line between the detection sub-areas 153A and 153C is substantially the center line of the beam spots P52A and P52C. In addition, the border line between the detection sub-areas 153B and 153D is substantially the center line of the beam spot P52B.

Thus, in the photodetector 153, beam spots having the left half of the cross section R52A and the left half of the cross section R52C, beam spots having the right half of the cross section R52A and the right half of the cross section R52C, a beam spot having the left half of the cross section R52B, and a beam spot having the right half of the cross section R52B are formed in the detection sub-areas 153C, 153A, 153B, and 153D, respectively.

As a result, since the detection sub-area 153A detects the intensity of a light beam equivalent to the beam spots P22B and P22F (see FIG. 27B) according to the second embodiment, the photodetector 153 generates a detection signal S52A equivalent to the detection signal S22B.

In addition, since the detection sub-area 153B detects the intensity of a beam spot equivalent to that of the beam spots P22C (see FIG. 27B) according to the second embodiment, the photodetector 153 generates a detection signal S52B equivalent to the detection signal S22C.

Furthermore, the other detection sub-areas 153C and 153D generate detection signals S52C and S52D equivalent to the detection signals S22A and S22D according to the second embodiment, respectively.

As a result, the optical disc apparatus 30 (see FIG. 8) can compute a tracking error signal STE52 from the detection signals S52A to S52D using the following equation (11), which corresponds to equation (5):

$$STE52 = (S52D - S52B) - K(S52A - S52C) \quad (11)$$

Therefore, the optical disc apparatus 30 can perform tracking control by the one-beam PP method suitable for the BD-RE optical disc 100 (see FIG. 8) on the basis of the tracking error signal STE52.

As noted above, the optical pickup 150 according to the fifth embodiment separates the reflected light beam L13 in the forward-backward direction according to the type of the optical disc 100 using the beam splitting light guide 156 or 157. Like the optical pickup 36 according to the first embodiment, by partitioning each beam spot using border lines between the detection sub-areas, the optical pickup 150 can separate the reflected light beam L13 and emit the separate reflected light beams L13 into the four detection sub-areas 153A to 153D. Thus, the optical pickup 150 can detect the separate reflected light beams L13.

6-3. Operations and Advantages

In the above-described structure according to the fifth embodiment, like the first embodiment, the optical pickup 150 changes a voltage applied to the liquid crystal cell of the active wavelength plate 65 of the beam splitting light guide pattern switcher 151 (see FIG. 34) according to whether the type of the optical disc 100 is a BD-ROM or a BD-RE under the control of the system controller 31. In this way, the optical pickup 150 changes the polarization direction of the reflected light beam L13.

Subsequently, the optical pickup 130 diffracts or transmits the reflected light beam L13 part by part according to the polarization direction of the reflected light beam L13 using the beam splitting light guide 156 or 157. In addition, the cylindrical lens 152 expands each of the light beams in the left-right directions of FIG. 35A or 36A and inputs the light beams to the detection sub-areas 153A and 153C and the detection sub-areas 153B and 153D so that the light beams extend over these detection sub-areas.

Here, as shown in FIG. 35B, when the beam splitting light guide 156 is activated, the right half of the beam spots P51B, the left half of the beam spot P51A, the left half of the beam spot P51B, and the right half of the beam spot P51A are formed in the detection sub-areas 153A to 153D of the photodetector 153, respectively. The right half of the beam spots P51B, the left half of the beam spot P51A, the left half of the beam spot P51B, and the right half of the beam spot P51A correspond to the beam spots P21B, P21C, P21A, and P21D shown in FIG. 26B, respectively.

As shown in FIG. 36B, when the beam splitting light guide 157 is activated, the right half of the beam spot P52A and the right half of the beam spot P52C, the left half of the beam spot P52B, the left half of the beam spot P52A and the left half of the beam spot P52C, and the right half of the beam spot P52B are formed in the detection sub-areas 153A to 153D of the photodetector 153, respectively. The right half of the beam spot P52A and the right half of the beam spot P52C, the left half of the beam spot P52B, the left half of the beam spot P52A and the left half of the beam spot P52C, and the right half of the beam spot P52B correspond to the beam spots P22B and P22F, the beam spot P22C, the beam spots P22A and P22E, and the beam spot P22D shown in FIG. 27B, respectively.

Accordingly, in the optical pickup 150, like the optical pickup 36 of the first embodiment, by switching the separation patterns of the reflected light beam L13, the detection sub-areas 153A to 153D of the photodetector 153 can directly generate the detection signals S51A to S51D for generating the tracking error signal STE51 used for the DPD method or the detection signals S52A to S52D for generating the tracking error signal STE52 used for the one-beam PP method.

Consequently, the optical pickup 150 can provide the same advantages as the optical pickup 36 according to the first embodiment.

In this case, in the optical pickup 150, the beam splitting light guides 156 and 157 separate the reflected light beam L13 only in the forward-backward direction. Subsequently, each beam spot is separated in the left-right directions by using the border lines between the detection sub-areas of the photodetector 153. As a result, the four detection sub-areas 153A to 153D can directly generate the four detection signals S51A to S51D or the four detection signals S52A to S52D used for both the DPD method and the one-beam PP method.

In such a case, if the mounting position of the photodetector 153 of the optical pickup 150 is offset from the optical axis of the reflected light beam L13 in the left-right directions, the proportions of the beam spots formed in the detection sub-areas 153A and 153C and the detection sub-areas 153B and 153D are changed. Thus, the detection signals vary.

However, by using the variation ratio of the intensities of the beam spots, the optical pickup 150 can compute the amount of offset of the photodetector 153 with respect to the optical axis of the reflected light beam L13. Accordingly, for example, when finely adjusting the mounting position of the photodetector 153 in the fabrication step of the optical pickup 150, a user can align the photodetector 153 on the optical axis of the reflected light beam L13 by adjusting the position of the photodetector 153 in accordance with the variation ratio of the intensities of the beam spots.

In addition, the optical pickup 150 diffracts the partial reflected light beam L13 in the left direction using the beam splitting light guide 156 or 157. Furthermore, the optical pickup 150 allows the partial reflected light beam L13 to pass therethrough (i.e., allows the partial reflected light beam L13 to propagate straight). That is, the optical pickup 150 does not diffract the reflected light beam L13 in the right direction. Accordingly, the detection area of the photodetector 153 can be reduced in the left-right directions compared with the photodetector 52 (see FIG. 14) of the optical pickup 36 (see FIG. 9) that diffracts the reflected light beam L13 in both right and left directions. Therefore, the size and the weight of the optical pickup 150 can be reduced.

Furthermore, by expanding the reflected light beam L13 in the left-right directions of FIG. 34 using the cylindrical lens 152, the optical pickup 150 can expand the beam spots formed in the detection sub-areas 153A to 153D. Therefore, the optical pickup 150 can use the wide areas of the detection sub-areas 153A to 153D and increase the reliability of the detecting operation of the intensities of the beam spots compared with optical pickups without the cylindrical lens 152.

Still Furthermore, in the optical pickup 150, a polarization hologram is not formed in the light guide segment 156A of the beam splitting light guide 156 and the light guide segment 157A of the beam splitting light guide 157. Therefore, the beam splitting light guide 157 can increase the transmission efficiency of the light beam compared with the beam splitting light guide 126 of the second embodiment in which a hologram is formed on the entire surface on which the reflected light beam L13 is input.

In the above-described structure according to the fifth embodiment, the optical pickup 150 changes the polarization direction of the reflected light beam L13 using the active wavelength plate 65 of the beam splitting light guide pattern switcher 151 according to the type of the optical disc 100. Thereafter, the optical pickup 150 diffracts or transmits the reflected light beam L13 part by part according to the polarization direction of the reflected light beam L13 using the beam splitting light guide 156 or 157. Thus, the optical pickup 150 can separate the reflected light beam L13 in the forward-backward direction and separate each of the beam spots in the left-right directions by using the border lines between the detection sub-areas of the photodetector 153. Accordingly, like the optical pickup 36 of the first embodiment, the four detection sub-areas 153A to 153D of the photodetector 153 of the optical pickup 150 can directly generate the detection signals S51A to S51D for generating the tracking error signal STE51 used for the DPD method or the detection signals S52A to S52D for generating the tracking error signal STE52 used for the one-beam PP method.

7. Sixth Embodiment

7-1. Structure of Optical Pickup

According to a sixth embodiment, an optical pickup 160 (see FIG. 33) is different from the optical pickup 150 in that the optical pickup 160 includes a beam splitting light guide pattern switcher 161 in place of the beam splitting light guide pattern switcher 151 of the optical pickup 150. The other elements are configured as in the optical pickup 150.

Figure 37:
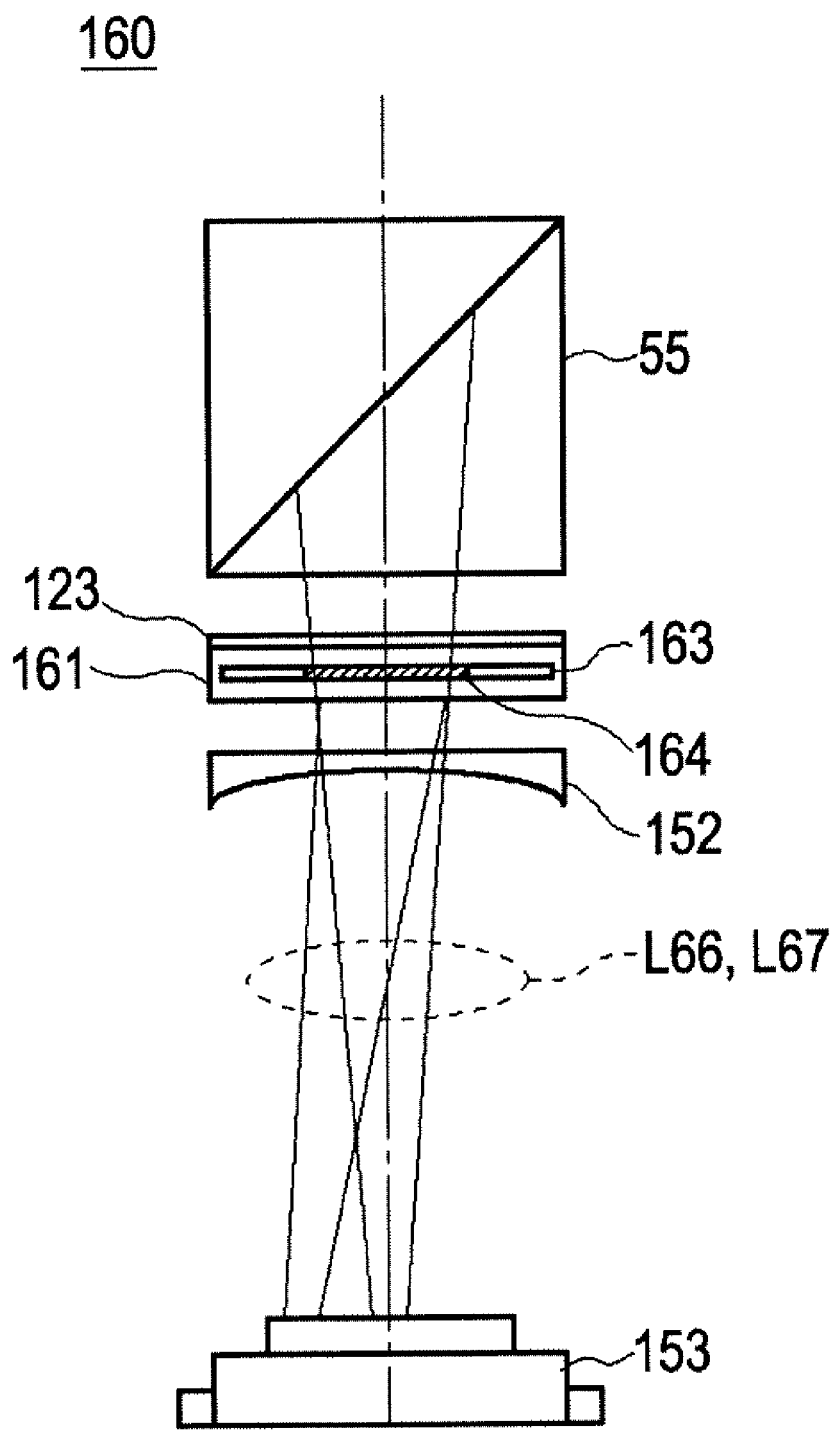
FIG. 37 is a schematic partial illustration of an optical pickup according to a sixth embodiment.

As shown in FIG. 37 which corresponds to FIG. 34, like the beam splitting light guide pattern switcher 124 of the second embodiment (see FIG. 24), the beam splitting light guide pattern switcher 161 can move a slide plate 163 having a beam splitting light guide 164 formed thereon in the forward or backward direction (i.e., a direction perpendicular to the plane of FIG. 37) by means of an actuator (not shown).

Thus, like the beam splitting light guide pattern switcher 124, the beam splitting light guide pattern switcher 161 can change the irradiation point of the reflected light beam L13 on the beam splitting light guide 164. As a result, the beam splitting light guide pattern switcher 161 can switch the separation patterns of the reflected light beam L13. In addition, like the optical pickup 150, the optical pickup 160 expands the separate reflected light beams in the left-right directions using the cylindrical lens 152 and inputs the separate reflected light beams to the photodetector 153.

7-2. Separation of Reflected Light Beam

Figure 38A:
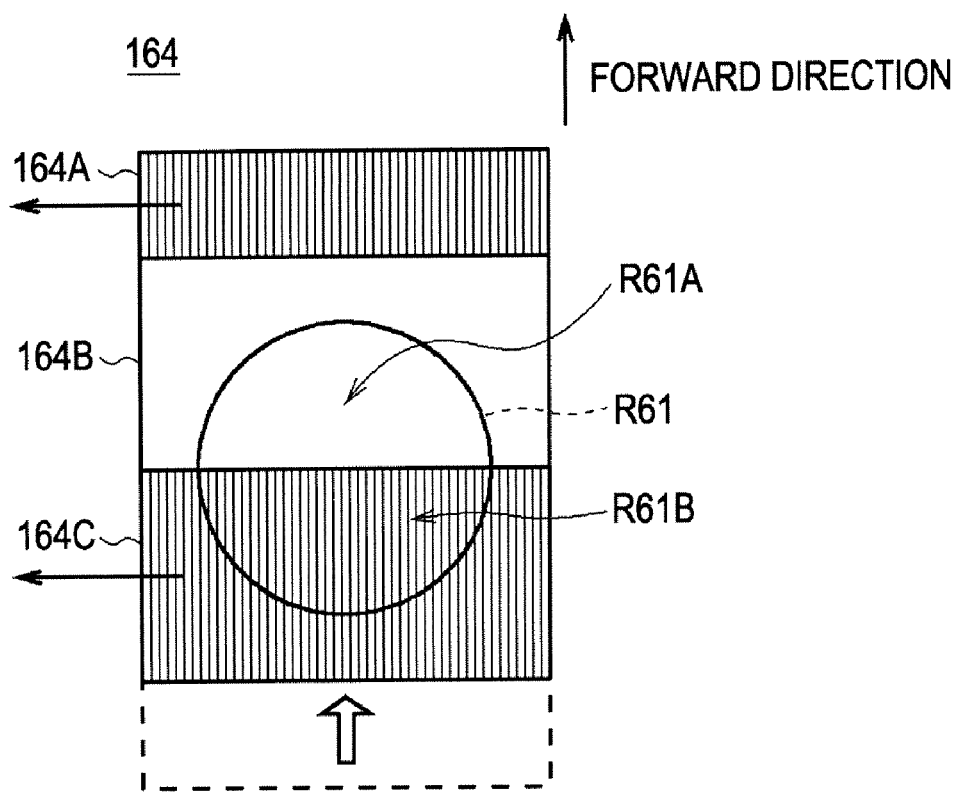
FIGS. 38A and 38B are schematic illustrations of a structure of a beam splitting light guide and beam spots formed by the beam splitting light guide according to the sixth embodiment.
Figure 39A:
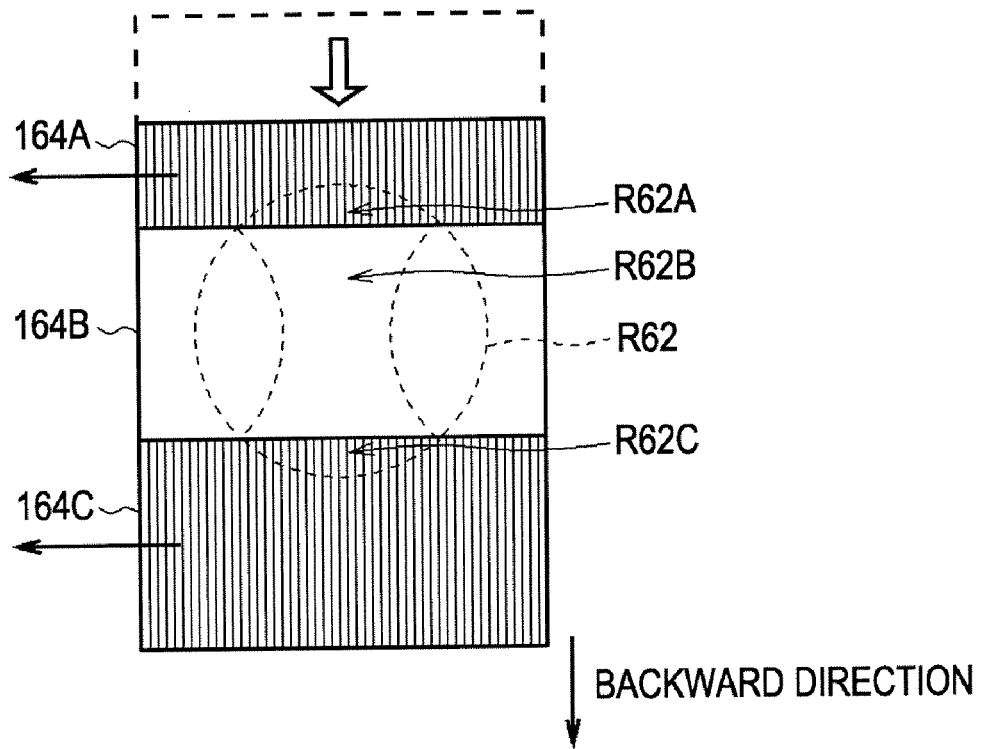
FIGS. 39A and 39B are schematic illustrations of a structure of a beam splitting light guide and beam spots formed by the beam splitting light guide according to the fifth embodiment.

As shown in FIGS. 38A and 39A, in contrast to the beam splitting light guide 126 of the second embodiment (see FIG. 25), the beam splitting light guide 164 is not separated in the left-right directions, but the beam splitting light guide 164 is separated into three segments in the forward-backward direction.

Light guide segments 164A and 164C of the beam splitting light guide 164 correspond to the light guide segments 157A and 157C of the beam splitting light guide 157, respectively. The light guide segments 164A and 164C are formed from blazed HOE holograms so as to diffract the partial reflected light beam L13 in the left direction. In contrast, a hologram is not formed on the light guide segment 164B. Accordingly, the light guide segment 164B transmits the partial reflected light beam L13.

7-2-1. Generation of Tracking Error Signal by DPD Method

In practical applications, when the optical disc 100 is a BD-ROM, the optical pickup 160 (see FIG. 33) moves the slide plate 163 in the forward direction using the beam splitting light guide pattern switcher 161 so that, as shown in FIG. 38A, the center of a cross section R61 formed when the reflected light beam L13 passes through the beam splitting light guide 164 is made coincident with substantially the center of the light guide segments 164B and 164C.

Thus, like the light guide segments 156A and 156B of the beam splitting light guide 156 of the fifth embodiment, the beam splitting light guide 164 does not diffract a light beam having a cross section R61A (i.e., allows the light beam to propagate straight) and diffracts a light beam having a cross section R61B in the left direction of FIG. 38A by using the two light guide segments 164B and 164C. In addition, the cylindrical lens 152 expands each of the light beams that has passed through the beam splitting light guide 164 in the left-right directions in FIG. 38A. The expanded light beams are input to the photodetector 153.

Figure 38B:
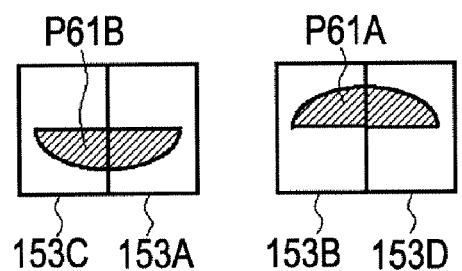

Accordingly, as shown in FIG. 38B, in the photodetector 153, a semi-elliptical beam spot P61A, whose shape is generated by expanding the cross section R61A in the left-right directions, is formed so as to extend over the detection sub-areas 153B and 153D. In addition, a semi-elliptical beam spot P61B, whose shape is generated by expanding the cross section R61B in the left-right directions, is formed so as to extend over the detection sub-areas 153A and 153C.

As a result, since the detection sub-area 153A detects the intensity of a light beam equivalent to that of the beam spot according to the fifth embodiment, the detection sub-area 153A can generate a detection signal S61A equivalent to the detection signal S21B according to the second embodiment.

Similarly, the other detection sub-areas 153B, 153C, and 153D can generate detection signals S61B, S61C, and S61D equivalent to the detection signals S21C, S21A, and S21D according to the second embodiment, respectively.

As a result, the optical disc apparatus 30 (see FIG. 8) can perform computation that is the same as the computation performed in the fifth embodiment. Thus, the optical disc apparatus 30 can compute a tracking error signal STE61 using phase differences among the detection signals S61A to S61D and can perform tracking control on the basis of the tracking error signal STE61 by the DPD method corresponding to the BD-ROM optical disc 100 (see FIG. 8).

7-2-2. Generation of Tracking Error Signal by One-Beam PP Method

In contrast, when the optical disc 100 is a BD-RE, the optical pickup 160 (see FIG. 33) moves the slide plate 125 in the backward direction using the beam splitting light guide pattern switcher 161 (see FIG. 37) so that, as shown in FIG. 39A, the center of a cross section R62 formed when the reflected light beam L13 passes through the beam splitting light guide 164 is made coincident with substantially the center of the light guide segment 164B.

Thus, like the light guide segments 157A to 157C of the beam splitting light guide 157 of the fifth embodiment, the beam splitting light guide 164 does not diffract a light beam having a cross section R62B (i.e., allows the light beam to propagate straight) and diffracts light beams having cross sections R62A and R62C in the left direction of FIG. 38A by using the three light guide segments 164A to 164C. In addition, the cylindrical lens 152 expands each of the light beams that has passed through the beam splitting light guide 164 in the left-right directions in FIG. 39A. The expanded light beams are input to the photodetector 153.

Figure 39B:
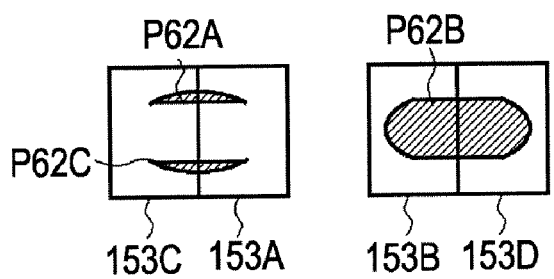

Accordingly, as shown in FIG. 39B, in the photodetector 153, beam spots P62A and P62C, whose shape is generated by expanding the cross section R62A in the left-right directions, are formed so as to extend over the detection sub-areas 153A and 153C. In addition, a beam spot P62B, whose shape is generated by expanding the cross section R62B in the left-right directions, is formed so as to extend over the detection sub-areas 153B and 153D.

As a result, since the detection sub-area 153A detects the intensity of a light beam equivalent to that of the beam spot according to the fifth embodiment, the detection sub-area 153A can generate a detection signal S62A equivalent to the detection signal S22B according to the second embodiment.

Similarly, the other detection sub-areas 153B, 153C, and 153D can generate detection signals S62B, S62C, and S62D equivalent to the detection signals S22C, S22A, and S22D according to the second embodiment, respectively.

As a result, like the fifth embodiment, the optical disc apparatus 30 (see FIG. 8) can compute a tracking error signal STE62 from the detection signals S62A to S62D using the following equation (12), which corresponds to equation (5):

$$STE62=(S62D-S62B)-K(S62A-S62C) \quad (12)$$

Therefore, the optical disc apparatus 30 can perform tracking control by the one-beam PP method suitable for the BD-RE optical disc 100 (see FIG. 8) on the basis of the tracking error signal STE62.

As noted above, according to the sixth embodiment, the beam splitting light guide pattern switcher 161 mechanically moves the slide plate 163 having the beam splitting light guide 164 formed thereon in the forward or backward direction. Thus, like the fifth embodiment, the reflected light beam L13 is separated and is made incident on the photodetector 153.

7-3. Operations and Advantages

In the above-described structure according to the sixth embodiment, like the optical pickup 120 according to the second embodiment, the optical pickup 160 moves the slide plate 163 of the beam splitting light guide pattern switcher 161 (see FIG. 37) in the forward or backward direction according to whether the type of the optical disc 100 is a BD-ROM or a BD-RE under the control of the system controller 31. Thus, the optical pickup 160 changes the irradiation point of the reflected light beam L13 on the beam splitting light guide 164.

In addition, the optical pickup 160 diffracts or transmits the reflected light beam L13 part by part according to the irradiation point of the reflected light beam L13 on the beam splitting light guide 164. In addition, the optical pickup 160 expands the separate reflected light beams in the left-right directions of FIG. 38A or 39A using the cylindrical lens 152 and inputs the separate reflected light beams 13 so that the reflected light beams L13 are emitted into the detection sub-areas 153A and 153C and in the detection sub-areas 153B and 153D.

Thus, like the optical pickup 150 according to the fifth embodiment, the detection sub-areas 153A to 153D of the photodetector 153 of the optical pickup 160 can directly generate the detection signals S51A to S51D for generating the tracking error signal STE51 used for the DPD method or the detection signals S52A to S52D for generating the tracking error signal STE52 used for the one-beam PP method.

In addition, the optical pickup 160 can provide the same advantages as the optical pickup 150 according to the fifth embodiment.

In the above-described structure according to the sixth embodiment, the optical pickup 160 can move the slide plate 163 of the beam splitting light guide pattern switcher 161 according to the type of the optical disc 100 so as to change the irradiation point of the reflected light beam L13 on the beam splitting light guide 164. Thus, the optical pickup 160 can separate the reflected light beam L13 in the forward-backward direction. In addition, the optical pickup 160 can separate each of the beam spots in the left-right directions by using the border lines between the detection sub-areas. Accordingly, like the optical pickup 36 according to the first embodiment, the four detection sub-areas 153A to 153D of the photodetector 153 of the optical pickup 160 can directly generate the detection signals S61A to S61D for generating the tracking error signal STE61 used for the DPD method or the detection signals S62A to S62D for generating the tracking error signal STE62 used for the one-beam PP method.

8. Other Embodiments

In the first embodiment, the active wavelength plate 65 composed of a liquid crystal element of the beam splitting light guide pattern switcher 61 changes the polarization direction of the reflected light beam L13. The plate members 54A and 54B are formed of a birefringent material, which diffracts light to provide a polarization direction. In addition, the plate members 54A and 54B are formed so that the polarization directions thereof are different from each other. In this way, separation patterns of the reflected light beam L13 are switched by using the beam splitting light guides 66 and 67 in which a blazed HOE is formed. However, the present invention is not limited thereto. The separation patterns of the reflected light beam L13 can be switched in a variety of ways.

For example, a combination of a segmented active wavelength plate and a Wollaston prism may separate the reflected light beam L13 and change the directions of the refraction of the separate reflected light beams L13. That is, by changing the optical characteristic of the reflected light beam L13, the separation patterns of the reflected light beam L13 may be switched.

Alternatively, for example, a combination of a segmented active wavelength plate and a Wollaston prism may separate the reflected light beam L13 and rotate the polarized reflected light beam L13 at certain areas. By changing the direction of the diffraction, the separation patterns of the reflected light beam L13 may be switched.

Alternatively, for example, a blazed HOE liquid crystal may be used. The blazed HOE liquid crystal separates the reflected light beam L13 and changes the propagation directions of the separate reflected light beam L13 by generating phase differences on optical paths using liquid crystal elements. By changing the pattern of the liquid crystal element, the separation patterns of the reflected light beam L13 can be switched. Alternatively, as shown in FIG. 1, by mechanically switching a plurality of beam splitting light guides, the separation patterns of the reflected light beam L13 may be switched.

While the first embodiment has been described with reference to the optical integrated element 40 of the optical pickup 36 including the active wavelength plate 65 and the beam splitting light guides 66 and 67 in an integrated fashion, the present invention is not limited to such an application. For example, the active wavelength plate 65 and the beam splitting light guides 66 and 67 may be disposed independently from the optical integrated element 40.

Additionally, while the first embodiment has been described with reference to a technique in which the separate light beams L16A to L16D and the separate light beams L17A to L17F are diffracted only in the left or right direction by the beam splitting light guides 66 and 67 in order to generate the focus error signal SFE for the SSD method, the present invention is not limited to such a technique. For example, when the focus error signal SFE is generated using another method, the separate light beams L16A to L16D and the separate light beams L17A to L17F may be diffracted in a variety of directions, as shown in FIGS. 6A and 6B.

That is, the separate light beams are input to detection sub-areas disposed at predetermined locations on a photodetector so that the detection sub-areas can directly generate detection signals used for generating a tracking error signal. The irradiation patterns of the separate light beams can be switched by using, for example, the beam splitting light guide pattern switcher 61.

Furthermore, while the first embodiment has been described with reference to the light guide segments 66A to 66D (see FIG. 12A) of the beam splitting light guide 66 and 67A to 67F (see FIG. 13A) of the beam splitting light guide 67 having blazed HOEs formed therein, the present invention is not limited to such a structure. For example, a widely used diffraction grating or a hologram that diffracts light in two directions may be used. In this case, the direction of diffraction is determined and the detection sub-areas of the photodetector 52 are arranged so that the detection sub-areas can detect the individual diffracted light beams.

Furthermore, in the first embodiment, when the optical disc 100 is a BD-ROM, the polarization direction of the reflected light beam L13 is the left-right direction. In contrast, when the optical disc 100 is a BD-RE, the polarization direction of the reflected light beam L13 is the forward-backward direction. However, the present invention is not limited thereto. Conversely, when the optical disc 100 is a BD-ROM, the polarization direction of the reflected light beam L13 may be the forward-backward direction. When the optical disc 100 is a BD-RE, the polarization direction of the reflected light beam L13 may be the left-right direction.

Figure 40:
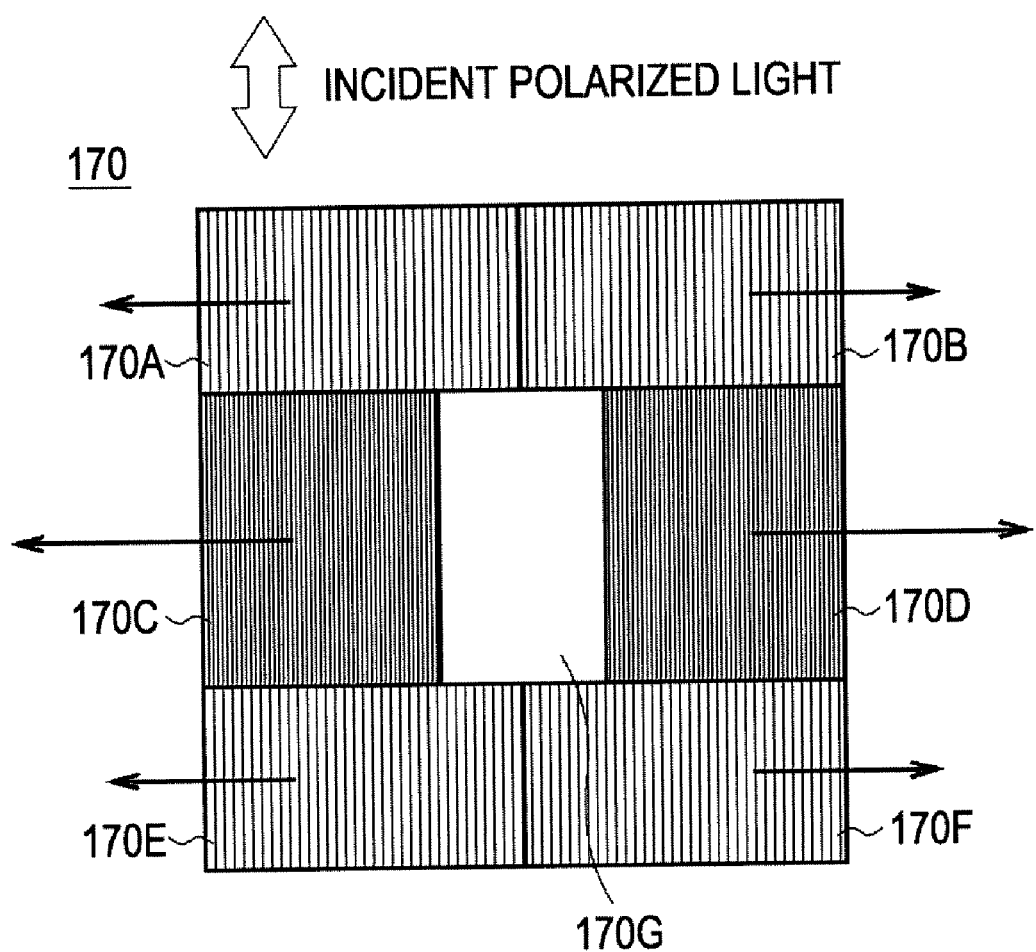
FIG. 40 is a schematic illustration of a structure of a beam splitting light guide according to another embodiment.

Furthermore, in the first embodiment, as shown in FIGS. 13A and 20, partial areas of the light guide segments 67C and 67D on the center side extend towards the center side to form protrusion segments 67CX and 67DX. However, the present invention is not limited thereto. For example, as shown in FIG. 40 which corresponds to FIG. 13A, if the interlayer stray light is negligible, a beam splitting light guide 170 having no protrusion segments 67CX and 67DX may be used in place of the beam splitting light guide 67. Alternatively, like the beam splitting light guide 21 (see FIG. 4C), a beam splitting light guide having no light guide segment 67G may be used. In addition, when another tracking control method is used, a beam splitting light guide that is partitioned according to the separation pattern suitable for that tracking control method may be used. Moreover, a beam splitting light guide that inputs the reflected light beam L13 to the photodetector 52 without separating the reflected light beam L13 may be used.

Furthermore, while the first embodiment has been described with reference to the beam splitting light guide pattern switcher 61 that switches between the two separation patterns, the present invention is not limited thereto. For example, three or more separation patterns may be switched if tracking control different from that for a BD-ROM or a BD-RE is performed for a DVD-R (digital versatile disc-recordable).

At that time, if a large number of separation patterns are present, the technique of changing the polarization direction of the reflected light beam L13 could not support all the separation patterns. In such a case, a plurality of beam splitting light guides may be mechanically switched as needed.

Furthermore, while the first embodiment has been described with reference to the optical disc apparatus 30 that switches the separation patterns of the beam splitting light guide pattern switcher 61 according to whether the optical disc 100 is a BD-ROM or a BD-RE, the present invention is not limited thereto. For example, the separation patterns of the beam splitting light guide pattern switcher 61 may be switched according to whether the optical disc 100 is a Blu-ray Disc™ or a DVD. Alternatively, the separation patterns of the beam splitting light guide pattern switcher 61 may be switched according to whether the optical disc 100 is a single layer disc or a dual layer disc. That is, the separation patterns of the beam splitting light guide pattern switcher 61 may be switched according to a variety of switching conditions.

Furthermore, while the first embodiment has been described with reference to the optical disc apparatus 30 that switches the separation patterns of the beam splitting light guide pattern switcher 61 according to whether the optical disc 100 is a BD-ROM or a BD-RE when detecting the type of the optical disc 100, the present invention is not limited thereto. For example, the separation patterns of the beam splitting light guide pattern switcher 61 may be switched according to a startup operation immediately after the optical disc 100 is loaded into the optical disc apparatus 30 and a calibration operation performed when a temperature is changed or a normal operation for recording and playing back information. That is, the separation patterns of the beam splitting light guide pattern switcher 61 may be switched according to a variety of switching conditions.

Furthermore, while the first embodiment has been described with reference to the beam splitting light guide pattern switcher 61 that switches the separation patterns of the reflected light beam L13 for generating detection signals needed for generating the tracking error signal STE, the present invention is not limited thereto. For example, when a plurality of focus control methods are switched, the beam splitting light guide pattern switcher 61 may switch the separation patterns of the reflected light beam L13 for generating detection signals needed for generating the focus error signal SFE. Alternatively, when a plurality of playback RF signal generation methods are switched, the beam splitting light guide pattern switcher 61 may switch the separation patterns of the reflected light beam L13 for generating detection signals needed for generating the playback RF signal. That is, to switch a plurality of signal generation methods for a variety of signals, the separation patterns may be switched.

Furthermore, while the foregoing embodiments have been described with reference to the optical disc apparatus 30 that generates a tracking error signal when playing back information on an optical recording medium, the present invention is not limited thereto. For example, the embodiments of the present invention are applicable when recording information onto the optical disc 100 and generating a tracking error signal.

Furthermore, while the foregoing embodiments have been described with reference to the optical disc apparatus 30 that employs the substantially disk-shaped optical disc 100 as an optical recording medium, the present invention is not limited thereto. For example, the embodiments of the present invention are applicable to an optical recording apparatus that employs, for example, a cylindrical optical drum, a rectangular plate-like optical chip, or an optical tape as an optical recording medium. That is, the embodiments of the present invention may be applied to an optical information apparatus that reads out information from a variety of optical recording media using a light beam.

Furthermore, while the foregoing embodiments have been described with reference to the optical pickup 36 including the photodetector 52 serving as a detector, the beam splitting light guides 66 and 67 serving as light guiding units, and the active wavelength plate 65 serving as a switching controller, the present invention is not limited thereto. For example, the optical pickup may include a detector, a light guide, and a switching controller having a variety of the other configurations.

Furthermore, while the foregoing embodiments have been described with reference to the optical disc apparatus 30 serving as an optical information apparatus including the photodetector 52 serving as a detector, the beam splitting light guides 66 and 67 serving as light guiding units, the active wavelength plate 65 serving as a switching controller, and the system controller 31 serving as an integrated controller, the present invention is not limited thereto. For example, the optical information apparatus may include a detector, a light guide, and a switching controller, and an integrated controller having a variety of the other configurations.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a detector for detecting, using a plurality of detection areas, a reflected light beam that is emitted from a predetermined light source to an optical recording medium and is reflected off the optical recording medium;
   a plurality of light guiding means, each having a specific light guide pattern, each of the light guiding means irradiating a predetermined detection area with predetermined part of the reflected light beam in accordance with the light guide pattern; and
   a switching controller that switches and selects the light guiding means that acts on the reflected light beam from among the plurality of light guiding means according to a predetermined switching condition.

2. The optical pickup according to claim 1, wherein each of the light guiding means is partitioned into a plurality of light guide segments to form the light guide pattern and wherein each of the light guiding means separates the reflected light beam into a plurality of separate light beams by guiding part of the reflected light beam incident on each of the light guide segments to the corresponding predetermined detection area.

3. The optical pickup according to claim 1, wherein the switching controller switches and selects the light guiding means that acts on the reflected light beam from among the plurality of light guiding means by changing the optical characteristic of the reflected light beam.

4. The optical pickup according to claim 1, wherein each of the light guiding means is composed of a birefringent material that acts on a specific polarization direction and the plurality of light guiding means are disposed so as to act on different polarization directions and wherein the switching controller selects the light guiding means that acts on the reflected light beam by controlling the polarization direction of the reflected light beam.

5. The optical pickup according to claim 1, wherein the switching controller selects the light guiding means that acts on the reflected light beam in accordance with the type of the optical recording medium.

6. The optical pickup according to claim 1, wherein the switching controller selects a segment of the light guiding means that acts on the reflected light beam by changing the irradiation point of the light beam on the light guiding means.

7. The optical pickup according to claim 1, wherein a hologram for diffracting the reflected light beam in one direction is formed in a segment of the light guiding means partitioned by the light guide pattern.

8. The optical pickup according to claim 1, wherein the light guiding means irradiates the detection areas with the predetermined part of the reflected light beam so that the predetermined part of the reflected light beam extends across the border between the detection areas.

9. The optical pickup according to claim 1, wherein the optical recording medium is an optical disc having a substantially a disc shape and having a pit string representing a recording signal formed thereon in a concentric or spiral pattern and wherein the detector includes four detection areas and wherein one of the light guiding means partitions a cross section of the reflected light beam formed when the reflected light beam passes therethrough into four portions by substantially bisecting the cross section using a dividing line substantially parallel to a moving direction of the pit string and substantially bisecting the cross section using a dividing line substantially perpendicular to a moving direction of the pit string, and wherein each of the separate reflected light beams is directed in a different direction so as to be input to the corresponding one of the four detection areas.

10. The optical pickup according to claim 1, wherein the optical recording medium includes an optical disc having substantially a disc shape and having a track groove for recording a signal formed thereon in a concentric or spiral pattern and wherein the detector includes four detection areas and wherein one of the light guiding means partitions a cross section of the reflected light beam formed when the reflected light beam passes therethrough into two portions on the inner periphery side and the outer periphery side by substantially bisecting the cross section using a dividing line substantially parallel to a moving direction of the track groove and further partitions the cross section into a portion including a plus-first-order light beam or a minus-first-order light beam diffracted by the track groove and a portion not including a plus-first-order light beam or a minus-first-order light beam diffracted by the track groove, and wherein the two separate reflected light beams including a plus-first-order light beam or a minus-first-order light beam and not including a plus-first-order light beam or a minus-first-order light beam on the inner periphery side and the two separate reflected light beams including a plus-first-order light beam or a minus-first-order light beam and not including a plus-first-order light beam or a minus-first-order light beam on the outer periphery side are input to the four detection areas, respectively.

11. The optical pickup according to claim 1, wherein one of the light guiding means inputs the reflected light beam to a predetermined detection area without separating the reflected light beam.

12. The optical pickup according to claim 1, wherein the optical recording medium includes a plurality of signal recording layers and wherein the light guiding means guides an interlayer stray light beam reflected off one of the signal recording layers other than the signal layer on which the light beam emitted from the light source is focused to an area other than the detection areas.

13. An optical information apparatus comprising:
- a detector for detecting, using a plurality of detection areas, a reflected light beam that is emitted from a predetermined light source to an optical recording medium and is reflected off the optical recording medium;
- a plurality of light guiding means, each having a specific light guide pattern, each of the light guiding means irradiating a predetermined detection area with a predetermined part of the reflected light beam in accordance with the light guide pattern;
- a switching controller that switches and selects the light guiding means applied to the reflected light beam from among the plurality of light guiding means; and
- an integrated controller that controls the switching controller to switch and select the light guiding means that acts on the reflected light beam according to a predetermined switching condition.

14. An optical pickup comprising:
- a detector configured to detect, using a plurality of detection areas, a reflected light beam that is emitted from a predetermined light source to an optical recording medium and is reflected off the optical recording medium;
- a plurality of light guiding units, each having a specific light guide pattern, each of the light guiding units irradiating a predetermined detection area with a predetermined part of the reflected light beam in accordance with the light guide pattern; and
- a switching controller configured to switch and select the light guiding unit that acts on the reflected light beam from among the plurality of light guiding units according to a predetermined switching condition.

15. An optical information apparatus comprising:
- a detector configured to detect, using a plurality of detection areas, a reflected light beam that is emitted from a predetermined light source to an optical recording medium and is reflected off the optical recording medium;
- a plurality of light guiding units, each having a specific light guide pattern, each of the light guiding units irradiating a predetermined detection area with a predetermined part of the reflected light beam in accordance with the light guide pattern;
- a switching controller configured to switch and select the light guiding unit applied to the reflected light beam from among the plurality of light guiding units; and
- an integrated controller configured to control the switching controller to switch and select the light guiding unit that acts on the reflected light beam according to a predetermined switching condition.

* * * * *